(12) United States Patent
Takayanagi et al.

(10) Patent No.: US 7,185,922 B2
(45) Date of Patent: Mar. 6, 2007

(54) ANTI-ROTATION DEVICE AND ANTI-ROTATION STRUCTURE FOR A PIPE AND A CONNECTOR

(75) Inventors: Akira Takayanagi, Aichi-ken (JP); Tomoki Inoue, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 6 days.

(21) Appl. No.: 10/674,727

(22) Filed: Sep. 30, 2003

(65) Prior Publication Data

US 2004/0061332 A1    Apr. 1, 2004

(30) Foreign Application Priority Data

Sep. 30, 2002 (JP) ............................. 2002-288166
Sep. 24, 2003 (JP) ............................. 2003-332577

(51) Int. Cl.
*F16L 37/00* (2006.01)

(52) U.S. Cl. ........................... 285/319; 285/81; 285/82

(58) Field of Classification Search ................ 285/80, 285/81, 82, 85, 86, 87, 88, 305, 308, 319, 285/921, 913, 914

See application file for complete search history.

(56) References Cited

U.S. PATENT DOCUMENTS

| | | | | |
|---|---|---|---|---|
| 808,446 | A | * | 12/1905 | Gill et al. ...................... 285/85 |
| 1,253,065 | A | * | 1/1918 | Looze ........................... 285/85 |
| 2,695,797 | A | * | 11/1954 | McCarthy et al. ............. 285/88 |
| 3,933,378 | A | | 1/1976 | Sandford et al. |
| 4,487,433 | A | * | 12/1984 | Miller .......................... 285/81 |
| 4,601,492 | A | * | 7/1986 | George ......................... 285/3 |
| 4,693,483 | A | * | 9/1987 | Valls ........................... 277/626 |
| 4,927,187 | A | * | 5/1990 | Sanford et al. ............... 285/80 |
| 5,072,971 | A | * | 12/1991 | Roman ......................... 285/88 |
| 5,401,063 | A | * | 3/1995 | Plosz ........................... 285/81 |
| 5,628,531 | A | * | 5/1997 | Rosenberg et al. ........... 285/81 |
| 5,823,702 | A | * | 10/1998 | Bynum ........................ 403/320 |
| 5,839,703 | A | | 11/1998 | Tesar |
| 5,931,509 | A | * | 8/1999 | Bartholomew ............... 285/93 |
| 6,116,658 | A | * | 9/2000 | Bohlen ........................ 285/330 |
| 6,290,264 | B1 | * | 9/2001 | Inoue ........................... 285/81 |

(Continued)

FOREIGN PATENT DOCUMENTS

DE    19713446 A1    10/1998

(Continued)

OTHER PUBLICATIONS

Patent Abstract of Germany DE 19713446 A1; Oct. 8, 1998.

(Continued)

*Primary Examiner*—James M. Hewitt
(74) *Attorney, Agent, or Firm*—Andrus, Sceales, Starke & Sawall, LLP

(57) ABSTRACT

Anti-rotation device for a pipe and a connector has a pipe connecting portion and a connector connecting portion constructed integrally on the pipe connecting portion. The anti-rotation device is mounted on the pipe and the connector while the pipe connecting portion clips a straight tubular inserting side portion of the pipe in anti-rotating relation and the connector connecting portion is connected to the connector in anti-rotating relation. Thereby the pipe is connected to the connector in anti-rotating relation.

5 Claims, 48 Drawing Sheets

U.S. PATENT DOCUMENTS

| | | | |
|---|---|---|---|
| 6,318,762 B2 * | 11/2001 | Inoue | 285/81 |
| 6,557,903 B2 * | 5/2003 | Walker | 285/305 |
| 6,860,515 B2 * | 3/2005 | Inoue | 285/93 |
| 2002/0163183 A1 * | 11/2002 | Ooi et al. | 285/93 |
| 2003/0057699 A1 * | 3/2003 | Persohn et al. | 285/39 |
| 2003/0218334 A1 * | 11/2003 | Takayanagi | 285/319 |
| 2004/0183300 A1 | 9/2004 | Iwasaki et al. | |

FOREIGN PATENT DOCUMENTS

| | | |
|---|---|---|
| JP | U 3-68695 | 7/1991 |
| JP | 09-269088 | 10/1997 |
| JP | 2002-213673 | 7/2002 |
| JP | 2002-276878 | 9/2002 |

OTHER PUBLICATIONS

Patent Abstract of Japan JP U 3-68695; Jul. 5, 1991.
Patent Abstract and English Translation of Japan Publication No. 2002-276878; Joint for Piping; Sep. 25, 2002.
Patent Abstract and English Translation of Japan Publication No. 2002-213673; Fitting-Sensing Device; Jul. 31, 2002.
Patent Abstract and English Translation of Japan Publication No. 09-269088; Pipe Connecting Structure; Oct. 14, 1997.

* cited by examiner

FIG.8
(a)
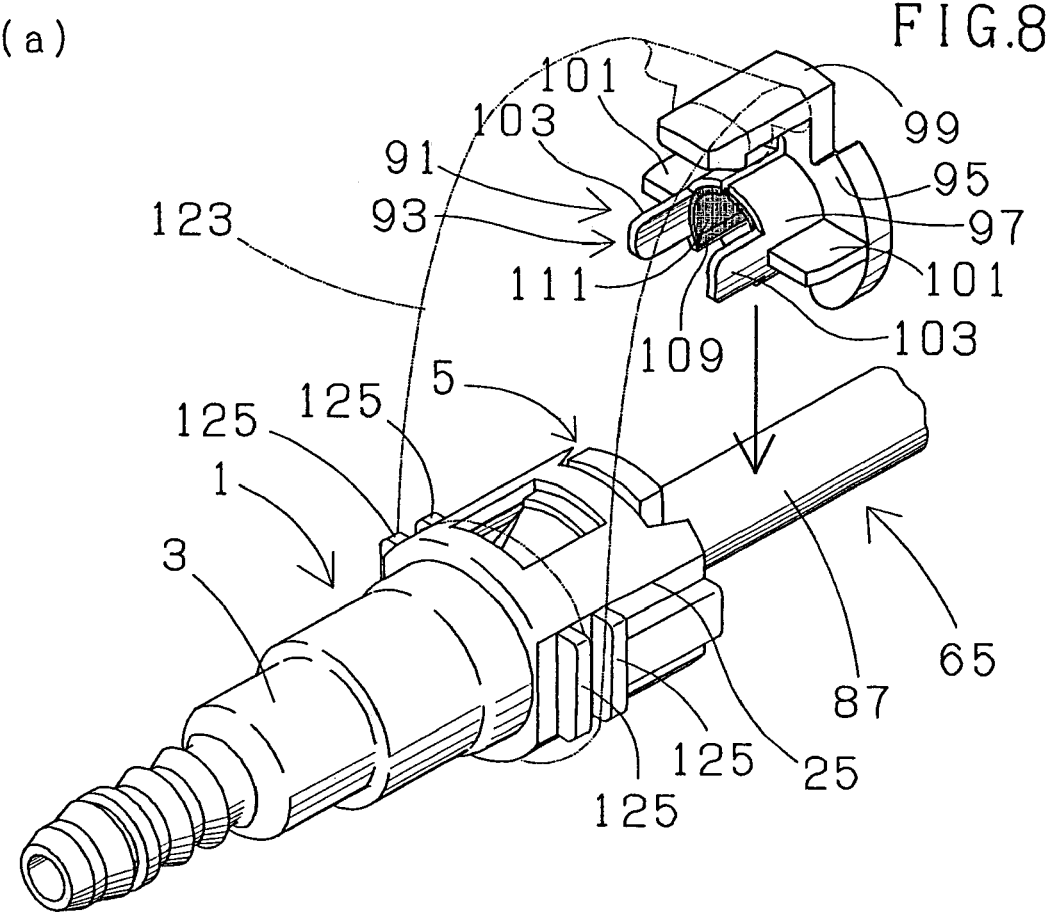
(b)
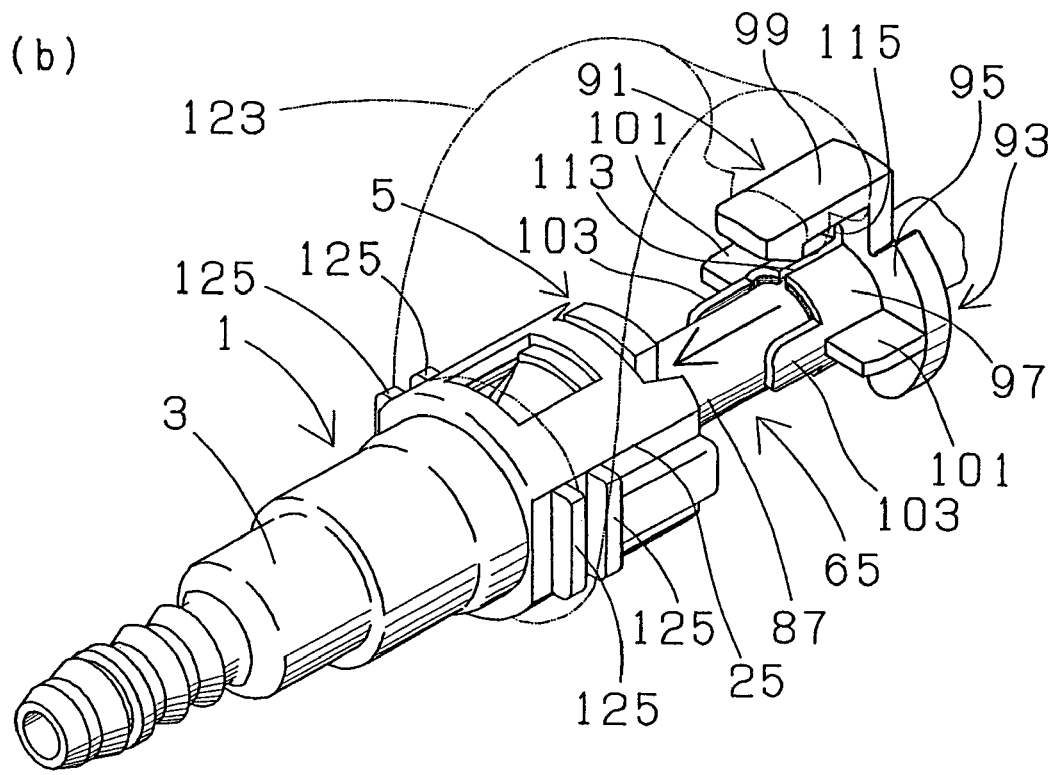

FIG.13
(a)
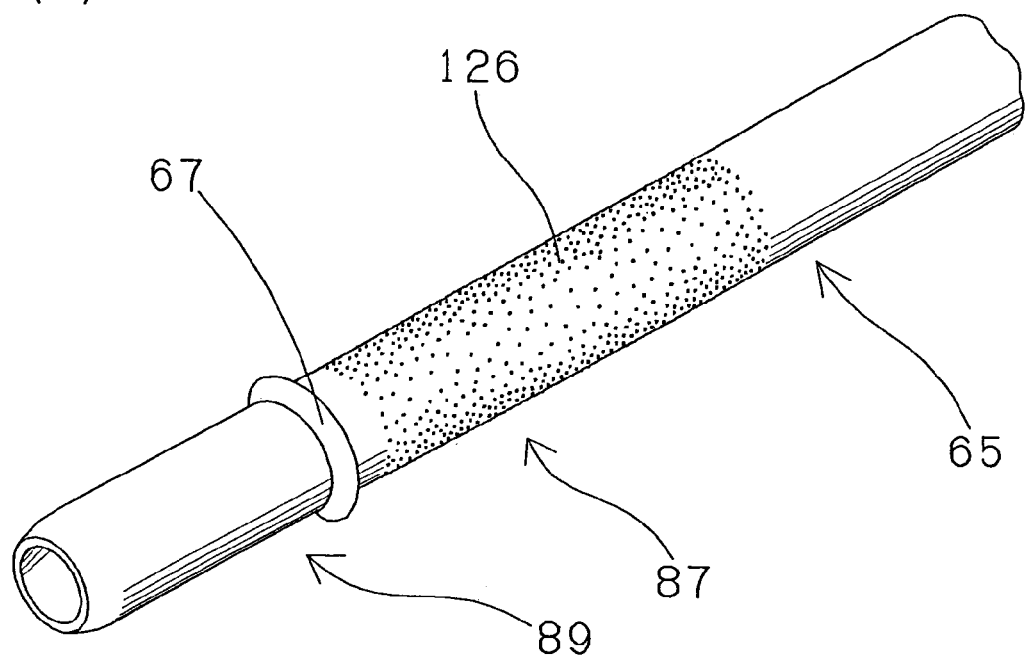
(b)
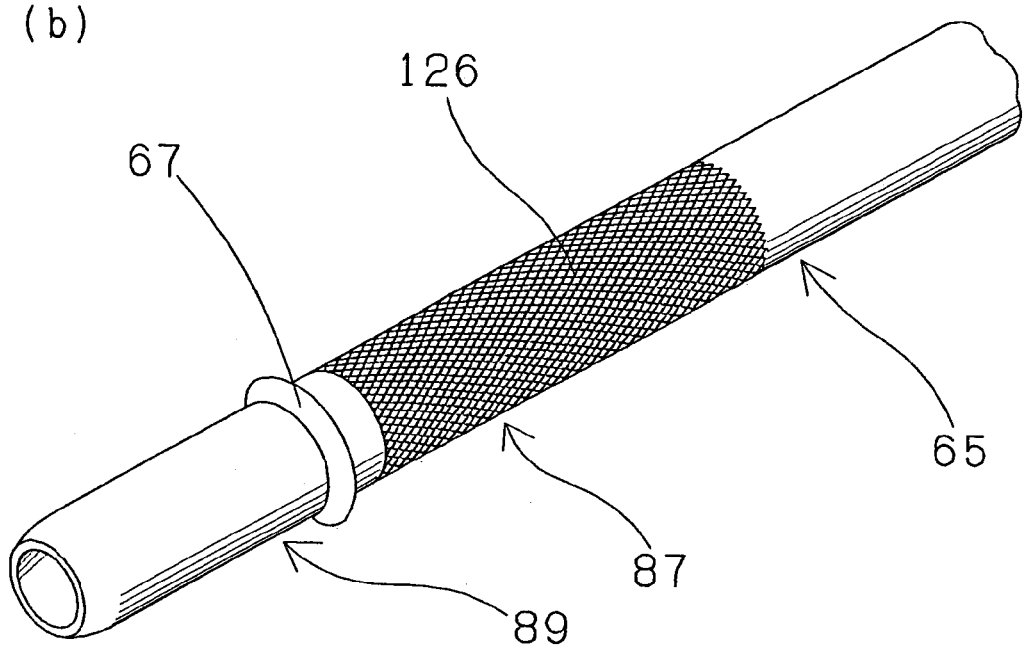

FIG. 19
(a)
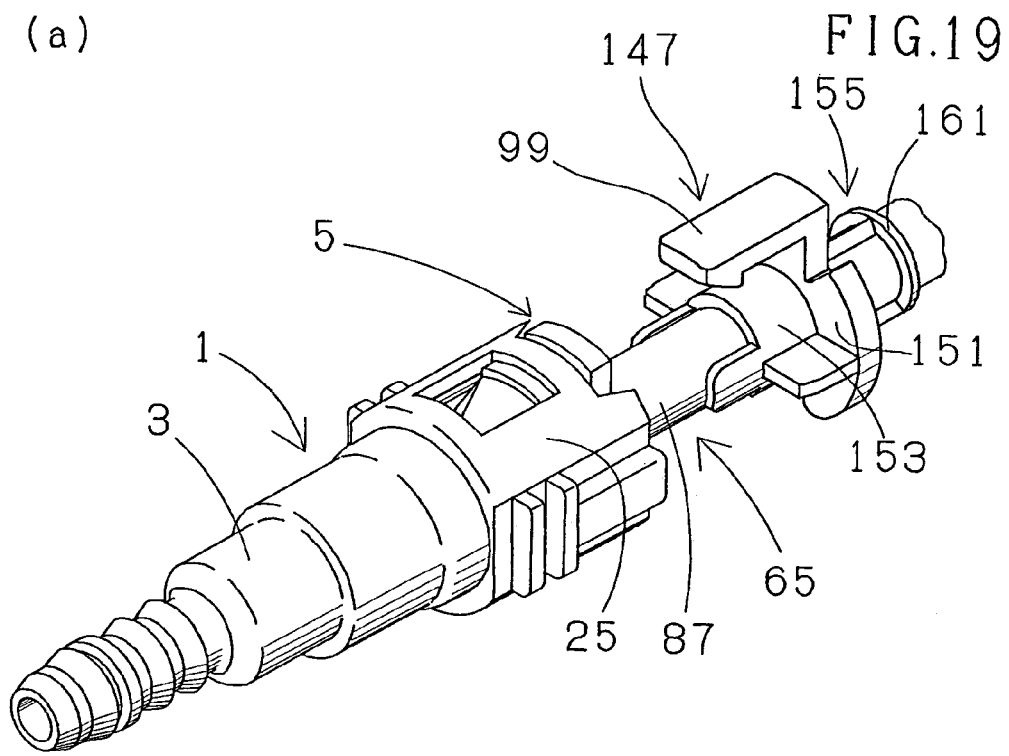
(b)
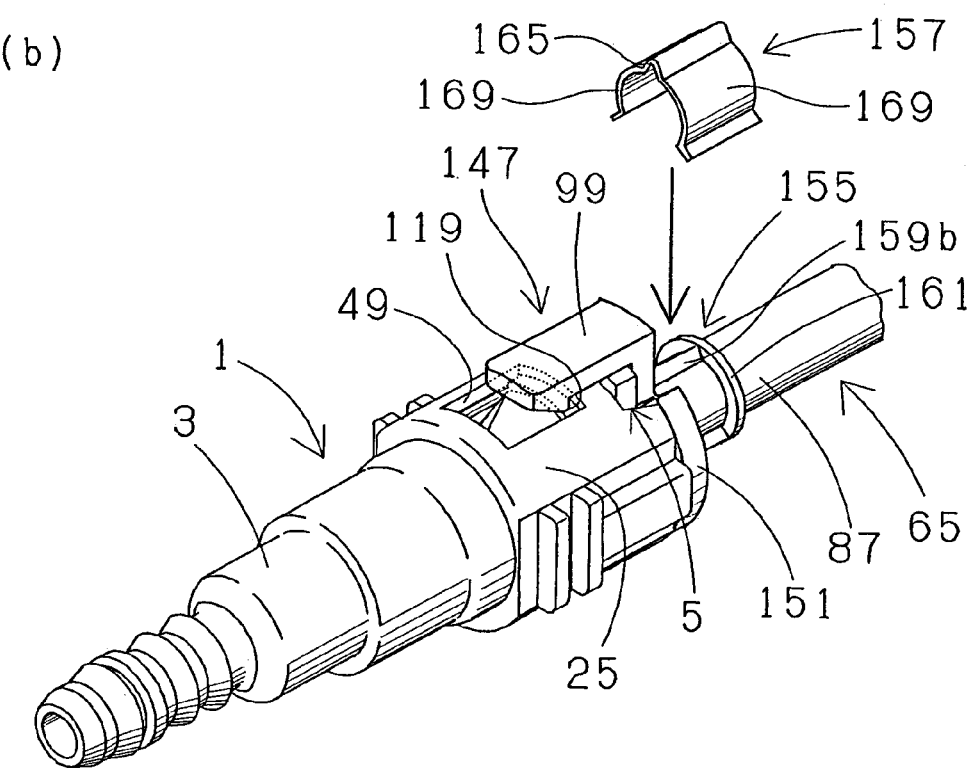

ANTI-ROTATION DEVICE AND ANTI-ROTATION STRUCTURE FOR A PIPE AND A CONNECTOR

BACKGROUND OF THE INVENTION

The present invention relates to an anti-rotation device and anti-rotation structure for a pipe and a connector to restrain or prevent a connector, for example, which is adapted for assembly in a gasoline fuel piping of an automobile, from relatively rotating with respect to a pipe which is inserted in and connected to the connector.

In a gasoline fuel piping for an automobile, a connector is used for connecting a pipe and a resin tube as a mating member. For example, the connector comprises a tubular connector housing and a retainer. The connector housing is formed with a tube connecting portion on one axial side and a retainer holding portion on the other axial end of the connector housing. The retainer is received or held by the retainer holding portion. In this structure, a resin tube is fitted to the tube connecting portion, the pipe is inserted in the connector housing through an opening of an opposite axial end of the connector housing or the retainer holding portion to be connected to or snap-fitted in the connector, and thereby the pipe is connected with the resin tube. The pipe to be connected to the connector is formed with an annular engagement projection on an inserting side portion of straight tubular shape to define an inserting end portion. The inserting end portion of the pipe is inserted in the connector housing, the annular engagement projection snap-engages with the retainer or a connecting engagement portion of the retainer, and thereby the pipe snap-fits in the connector or the connector housing.

A sealing member is fitted in the connector housing on one axial side from the retainer holding portion to provide a seal between the connector housing and the pipe inserted therein. The sealing member prevents leakage of gasoline fuel therebetween.

Meanwhile, for example, when a resin tube connected to a connector is continued to a gasoline engine of an automobile, the connector or a connector housing constantly rotates at a small angle with respect to a pipe by vibration transmitted from the gasoline engine to the connector via the resin tube, and thereby a sealing member which is disposed between the connector or the connector housing and the pipe is worn and a sealing property is deteriorated between the connector and the pipe. Therefore, it is preferred to construct an anti-rotation structure in an assembled unit of a pipe and a connector to prevent relative rotational movement of the connector or a connector housing with respect to the pipe.

Then there is a demand for an anti-rotation device for a pipe and a connector to restrain or prevent relative rotational movement of a connector with respect to a pipe. In this connection, for example, the following document 1 discloses an anti-rotating device to be fitted on a pipe and a connector so that one end portion thereof clips flat regions formed on diametrically symmetrical positions on an outer peripheral surface of the connector or a connector housing and U-shaped cutaway formed on an opposite end portion thereof receives therein a bent portion of the pipe formed to be bent with respect to a straight tubular portion of the pipe. By adapting this anti-rotation device, the pipe is connected to the connector in co-rotatable relation, and thereby relative rotational movement of the connector with respect to the pipe may be effectively prevented. And, the following document 2 also discloses another anti-rotation device utilizing a bent portion of a pipe. Further, on the other hand, there are other techniques known to prevent a connector from rotating relatively with respect to a pipe without an independent anti-rotation device. For example, the following document 3 discloses a connector provided with a large opening in a side wall of a retainer holding portion (connecting portion) of a connector housing. According to this disclosure, a pipe is inserted in the connector housing, then, a retainer member of U-shape in cross-section is fitted in the opening, and thereby the pipe is connected to the connector via the retainer member in locking relation against axial movement and in co-rotatable relation. Also the following document 4 discloses a technique that an inner periphery of a connector housing as female member is engaged directly with an outer periphery of a pipe as male member in co-rotatable relation.

| Document 1 | JP, A, 9-269088 | (specifically page 3, FIG. 1) |
| Document 2 | JP, A, 2002-213673 | (specifically page 4, FIG. 3) |
| Document 3 | JP, A, 2002-276878 | (specifically page 4, FIG. 1) |
| Document 4 | JP, U, 3-68695 | specification and drawings (specifically page 8, FIG. 3) |

However, if an anti-rotation device as disclosed in the document 1 or document 2 is adapted, piping design freedom is limited as a connector joining portion should be arranged near a bent portion of a pipe. And, the bent portion should be configured on the pipe with high bending accuracy, for example, with such accuracy as not to allow a portion of the pipe to be received in a cutaway of the anti-rotation device flattened. It is troublesome to configure the bent portion on the pipe with such high bending accuracy.

Also, anti-rotation structure disclosed concretely in the document 3 or 4 does not have sufficient range of applicability as no independent anti-rotation device is applied.

Accordingly, it is an object of the present invention to provide an anti-rotation device which can effectively prevent relative rotational movement of a connector with respect to a pipe by mounting on an assembled unit of the pipe and the connector without utilizing a bent portion of the pipe. It is another object of the present invention to provide an anti-rotation structure for a pipe and a connector adapting such an anti-rotation device. And it is yet another object of the present invention to provide an anti-rotation structure for a pipe and a connector which can effectively prevent relative rotational movement of a connector with respect to a pipe without utilizing a bent portion of the pipe, and has sufficient application flexibility.

SUMMARY OF THE INVENTION

In order to achieve a foregoing object, according to the present invention, there is provided a novel anti-rotation device for a pipe and a connector or a novel anti-rotation structure for a pipe and a connector.

An anti-rotation device for a pipe and a connector according to the present invention functions to restrain relative rotational movement of a pipe having a straight tubular inserting side portion and a connector. The connector has a connector housing formed with a connecting portion for a mating member to be connected with the pipe on one axial end of the connector housing. The inserting side portion of the pipe is inserted in the connector housing through an opening of an opposite axial end thereof and connected to the connector housing. Here, a term "axial" means an axial direction of a relevant member, a connector housing or a pipe.

The anti-rotation device comprises a pipe connecting portion to be connected to the pipe, for example, the inserting side portion of the pipe in anti-rotating relation. The anti-rotation device also comprises a connector connecting portion which is constructed on, for example, constructed integrally on, or is constructed integrally with the pipe connecting portion. The connector connecting portion is connected to the connector in anti-rotating relation. As the pipe connecting portion is connected to the pipe in anti-rotating relation and the connector connecting portion is connected to the connector in anti-rotating relation, the pipe is connected or joined to the connector in co-rotatable relation by the anti-rotation device.

The pipe connecting portion may be configured to be connected not to a bent portion of a pipe but to the straight tubular inserting side portion of the pipe. According to the present invention, the anti-rotation device constructs an anti-rotation structure between the pipe and the connector, for example, without utilizing a bent portion of the pipe. When the pipe is inserted in and connected to the connector or the connector housing, the other axial end of the inserting side portion of the pipe usually extends from an opening of an opposite axial end of the connector housing in an opposite axial direction or axially outwardly.

In many cases, adapted is a pipe formed with an annular engagement projection on an inserting side portion thereof to define an inserting end portion. On the occasion of connecting thus configured pipe to a connector or a connector housing, the inserting end portion is inserted in the connector housing and the annular engagement projection is snap-engaged, for example, with a connecting engagement portion of a retainer means. In such case, an anti-rotation device for a pipe and a connector may be formed with a verification means having an engagement portion for verification and abutment fingers extending in one axial direction, and may be mounted on the connector and the pipe so that the abutment fingers are inserted in the connector housing or the connector through an opening of an opposite axial end thereof and the engagement portion for verification of the verification means engages in an opposite axial direction with an engageable portion formed on an axially fixed position of the connector or the connector housing. Here, the abutment fingers are formed such that one axial ends thereof are located slightly on the other axial end from the connecting engagement portion of the retainer means when the engagement portion for verification of the verification means engages with the engageable portion of the connector, and the verification means is configured such that the engagement portion for verification is located on the other axial end from the engageable portion of the connector when the abutment fingers abut the annular engagement projection of the pipe which does not engage with the connecting engagement portion of the retainer means. This configuration allows the anti-rotation device for a pipe and a connector to function to verify connection of the pipe and the connector, without adapting double-bead-construction for a pipe by forming annular verification projection on the pipe as disclosed in the document 2.

A connector connecting portion may be configured to be arranged between the other axial end of a connector housing and a pipe, to engage with an inner surface side of the connector housing, namely, an inner surface of the connector housing or a retainer held in the connector housing non-rotatably and thereby to be connected to a connector in anti-rotating relation. Here, a whole of the connector connecting portion is not necessarily arranged between the other axial end of the connector housing and the pipe.

A pipe connecting portion may be configured to be connected to the inserting side portion of the pipe while clipping and pressing the inserting side portion, namely an outer peripheral surface of the inserting side portion in anti-rotating relation. This configuration allows the pipe connecting portion to be connected to the inserting side portion of the pipe in anti-rotating relation, even if the inserting side portion is formed round or of circle in cross-section. In this configuration, there is no longer need that an outer peripheral surface of the inserting side portion of the pipe is modified in shape, for example, by providing flat regions on diametrically symmetrical positions thereon. Further, there is no longer need that the pipe and the pipe connecting portion should be circumferentially aligned prior to mounting of the anti-rotation device.

A pipe connecting portion may be formed of C-shape or C-shape in cross-section. Moreover, the pipe connecting portion may be constructed so as to be inserted in an opposite axial end portion of a connector housing through an opening of an opposite axial end, at that time, and so as to be radially pressed by an inner surface of an opposite axial end portion of the connector housing to be narrowed in diameter, and thereby to be connected to an inserting side portion of a pipe while clipping and pressing the inserting side portion of the pipe in anti-rotating relation. This construction allows the pipe connecting portion to clip and press the inserting side portion of the pipe firmly. The pipe connecting portion of C-shape or C-shape in cross-section is fitted on or is mounted, for example, with a snap action, on an inserting side portion of the pipe, namely an outer peripheral surface of the inserting side portion. Typically, the pipe connecting portion is fitted on the inserting side portion of the pipe, before it is inserted in an opposite axial end portion of the connector housing.

An elastic material layer may be formed between a pipe connecting portion, for example, an inner surface of the pipe connecting portion and an inserting side portion of a pipe. Here, the pipe connecting portion clips and presses the inserting side portion of the pipe via the elastic member layer which is compressed sufficiently. In this manner, non-rotatable connection force between the pipe connecting portion and the pipe can be enhanced by increasing friction therebetween.

And a pipe connecting portion may be configured to have a resin or metal spring member or clip member of C-shape or C-shape in cross-section and a spring engageable portion to engage with the spring member non-rotatably. The spring member is mounted on an inserting side portion of a pipe and connected thereto or fitted thereon while clipping or clamping the inserting side portion non-rotatably. The spring member is typically mounted on, connected to, or fitted on the inserting side portion of the pipe extending from an opposite axial end of the connector housing in an opposite axial direction.

In order to increase friction between a pipe connecting portion and a pipe, and thereby to enhance non-rotatable connection therebetween, the pipe connecting portion may be formed of C-shape or C-shape in cross-section and knurls may be adapted in an inner surface of the pipe connecting portion and/or on an outer surface or outer peripheral surface of the inserting side portion of the pipe for a circumferential range. Knurls formed so as to extend in an axial direction enables the pipe connecting portion to slide or move along the pipe smoothly.

A pipe connecting portion may be formed in a pipe cap portion, for example, of U-shape in cross section, which fits on an inserting side portion of a pipe extending from an opening of an opposite axial end of a connector housing in an opposite axial direction so as to be connected in anti-rotating relation thereto, while a connector connecting portion may be formed in a connector cap portion, for example, of U-shape in cross-section, which fits on a connector housing so as to be connected thereto non-rotatably. In this manner, an anti-rotation device for a pipe and a connector may be configured so as to be connected easily to an assembled unit of the pipe and the connector in anti-rotating relation. The pipe cap portion and the connector cap portion are configured, for example, so as to form a single cap unit or body of U-shape in cross-section. As the connector cap portion and the pipe cap portion are fitted, for example, on an outer side of the assembled unit of the pipe and the connector, there is no difficulty to mount it thereon.

The connector cap portion may be configured to fit on the connector housing so as to clip flat regions formed on diametrically symmetrical positions on an outer peripheral surface of the connector housing. Here, the connector cap portion is formed with flat sections or flat inner sections so as to correspond to the flat regions of the connector housing. This construction allows the connector cap portion not to rotate with respect to the connector housing. Also, the pipe cap portion may be configured to fit on the pipe so as to clip flat surfaces formed on diametrically symmetrical positions on an outer peripheral surface of the inserting side portion of the pipe. Here, the pipe cap portion is formed with flat portions or flat inner portions so as to correspond to the flat surfaces of the inserting side portion of the pipe. This construction brings the pipe cap portion in anti-rotating relation with respect to the pipe.

Or, the pipe cap portion may be constructed not to rotate with respect to the inserting side portion of the pipe by engaging circumferentially with a stay formed on the pipe or the inserting side portion so as to project outwardly. Here, the pipe can be constructed in simple operation such that a stay is fixed on an outer peripheral surface of the pipe, for example, by welding. It contributes to the small and compact sized pipe connecting portion that an engagement structure between the pipe cap portion and the stay formed on the pipe is adapted. Then the anti-rotation device with such configuration can be connected while verifying visually engagement of the pipe cap portion and the stay.

In a preferred configuration, if the pipe is insufficiently inserted in the connector housing, the pipe cap portion cannot be fitted on the inserting side portion due to interference with the pipe, for example, with the annular projection or the stay formed on an outer periphery of the inserting side portion of the pipe. This configuration allows an operator to easily verify or find incomplete connection between the pipe and the connector, or a half-fitting relation of the pipe with respect to the connector, and prevents that piping system is subject to operation with the pipe and the connector in half-fitting relation. The connector cap portion and the pipe cap portion fit, for example, on an outer side of an assembled unit of the pipe and the connector. Therefore, when the pipe cap portion cannot fit on the inserting side portion, there is little fear that an operator cannot judge whether the cause is that the pipe and the connector are in half-fitting relation or any other reason, for example, a stay is not located so as to circumferentially correspond to a cutaway.

An anti-rotation device for a pipe and a connector according to the present invention may be adapted in order to restrain rotational movement of a pipe having a straight tubular inserting side portion and a connector having a connector housing provided with a connecting portion for a mating member to be connected with the pipe on one axial end of the connector housing and a retainer holding portion on the other axial end of the connector housing. A retainer is held in or by the retainer holding portion. The inserting side portion of the pipe is inserted in and connected to the connector housing through an opening of an opposite axial end thereof. The inserting side portion of the pipe engages with, for example, snap-engages with the retainer and thereby is connected to the connector housing. The retainer engages with an engagement window formed in the retainer holding portion and is thereby held by the retainer holding portion. The anti-rotation device for a pipe and a connector includes a pipe connecting portion which is connected to the inserting side portion of the pipe in anti-rotating relation, and a connector connecting portion which is constructed on or constructed integrally with the pipe connecting portion and is connected to the connector or the connector housing in anti-rotating relation. The connector connecting portion may be configured to be connected to the connector or the connector housing in anti-rotating relation by engagement with the engagement window of the retainer holding portion. If a retainer is provided in a connector for engagement with a pipe, in many cases, an engagement window is formed in a retainer holding portion of a connector housing and the retainer is held by the retainer holding portion via engagement with the engagement window. Therefore, if the connector connecting portion is designed to be connected to the connector housing in anti-rotating relation by utilizing the engagement window, it eliminates the need for modifying a design of a connector or a connector housing.

A retainer may be held in or by a retainer holding portion in anti-rotating relation, for example, via engagement with an engagement window formed on the retainer holding portion. And, a connector connecting portion of the anti-rotation device for a pipe and a connector may be configured to be connected to the connector in anti-rotating relation by engagement with the retainer. In many cases, a retainer is held in or by a retainer holding portion in anti-rotating relation. Therefore, if the connector connecting portion is engaged with the retainer non-rotatably, the pipe and the connector or the connector housing are connected in co-rotatably via the connector connecting portion and the pipe connecting portion.

An anti-rotation structure for a pipe and a connector according to the present invention may include an anti-rotation device for a pipe and a connector. The anti-rotation device for a pipe and a connector has a pipe connecting portion which is connected to a pipe having an inserting side portion, for example, of straight tubular shape, in anti-rotating relation, and a connector connecting portion which is constructed on or constructed integrally with the pipe connecting portion and is connected to a connector housing in anti-rotating relation. The connector connecting portion may be configured to be located between the other axial end of the connector housing and the pipe and to be connected to a connector in anti-rotating relation by engagement with an inner surface side of the connector housing, namely an inner surface of the connector housing or a retainer held by the connector housing. However, the connector connecting portion does not need to be located therebetween entirely. Further, the connector connecting portion may be configured to be connected to the connector in anti-rotating relation by engagement with a rotation preventive engagement protrusion or a rotation preventive engagement recess formed on or in the connector housing. The rotation preventive engagement recess may be formed as a rotation preventive engagement slot or a rotation preventive engagement hole. The connector connecting portion may be formed with a recess for engagement with the rotation preventive engagement protrusion or a protrusion for engagement in the rotation preventive engagement recess.

An anti-rotation structure for a pipe and a connector according to the present invention may include a connector having a connector housing formed with a rotation preventive slit, and a pipe having an inserting side portion formed with a stay projecting outwardly to be fitted in the rotation preventive slit in anti-rotating relation. Such anti-rotation structure for a pipe and a connector is applicable for wide variety of combination of a pipe and a connector.

The anti-rotation device and the anti-rotation structure for a pipe and a connector according to the present invention have beneficial effects as stated.

Now, the preferred embodiments of the present invention will be described in detail with reference to the drawings.

BRIEF DESCRIPTION OF THE DRAWINGS

FIG. 8a is a view explaining that the first anti-rotation device is mounted on an assembled unit of the first quick connector and the first pipe, and showing that the first anti-rotation device is mounted on an inserting side portion of the first pipe.

FIG. 8b is a view explaining that the first anti-rotation device is mounted on the assembled unit of the first quick connector and the first pipe, and showing that the first anti-rotation device is connected to a connector housing.

FIG. 13a is a view showing the first pipe formed with satin-finish.

FIG. 13b is a view showing the first pipe formed with cross-knurled finish.

FIG. 19a is a view explaining that the third anti-rotation device is mounted on the assembled unit of the first quick connector and the first pipe and showing that abutment plates, a fit-on portion and a receiving frame to receive a metal fitting are fitted on the inserting side portion of the first pipe.

FIG. 19b is a view explaining that the third anti-rotation device is mounted on the assembled unit of the first quick connector and the first pipe and showing that an anti-rotation fitting is connected to the receiving frame to receive a metal fitting.

DETAILED DESCRIPTION OF THE PREFERRED EMBODIMENTS

Figure 1:
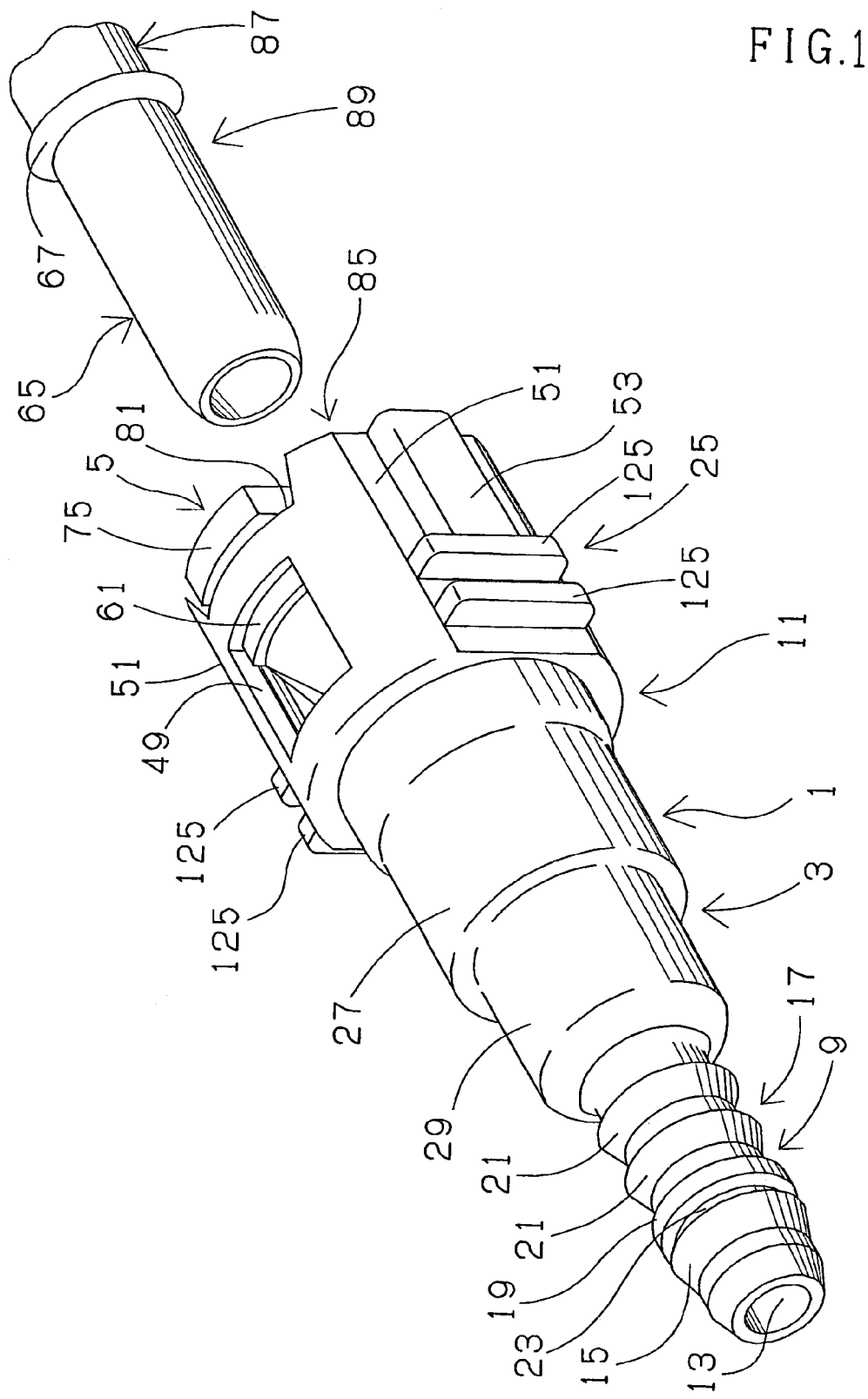
FIG. 1 is a perspective view of a first quick connector and a first pipe adapted in a first anti-rotation structure for a pipe and a connector according to the present invention.

A first anti-rotation structure for a pipe and a connector is explained with reference to FIGS. 1 to 13. A first quick connector 1, which is adapted for assembly in a gasoline fuel piping of an automobile and adapted in the first anti-rotation structure comprises a tubular connector housing 3, a generally annular retainer 5 and sealing means 7 as well shown in FIGS. 1 and 2. The connector housing 3 made of glass fiber reinforced polyamide (PA•GF), integrally comprises a cylindrical resin tube connecting portion 9 on one axial end of the connector housing and a generally cylindrical pipe inserting portion 11 on the other axial end of the connector housing, and is provided with a through-bore 13 through from one axial end to an opposite axial end thereof. The resin tube connecting portion 9 comprises one axial side portion 15 having an outer peripheral surface generally expanding gently in diameter toward the other axial end, and an opposite axial side portion 17 having an outer peripheral surface extending like a simple cylindrical shape on the other axial end from the one axial side portion 15. The opposite axial side portion 17 is provided on an outer peripheral surface with an annular projecting stop portion 19 of rectangular in cross-section and two annular projecting stop portions 21, 21 of right-angle triangle in cross-section expanding in diameter toward the other axial end. The annular projecting stop portions 19, 21, 21 are arranged in axially spaced relation sequentially from one axial end to the other axial end of the opposite axial side portion 17. A resin tube (not shown) or a mating member is tightly fitted on and connected to an outer periphery or an outer peripheral surface of the resin tube connecting portion 9. An outer peripheral surface 23 on one axial end portion of the opposite axial side portion 17, namely a portion between the one axial side portion 15 and the annular projecting stop portion 19 is formed in small diameter or in relatively deep annular groove. A sealing ring (not shown) is fitted around the outer peripheral surface 23 on one axial end portion of the opposite axial side portion 17 when the resin tube is fitted on the resin tube connecting portion 9.

The pipe inserting portion 11 of the connector housing 3 integrally comprises a retainer holding portion 25 of large diameter on the other axial end, a seal holding portion 27 and a link portion 29. The seal holding portion 27 is smaller in diameter than the retainer holding portion 25 and is located halfway between the retainer holding portion 25 and the link portion 29. The link portion 29 is further smaller in diameter than the seal holding portion 27 and is located in one axial end therefrom. Within the seal holding portion 27 on one axial end of the seal holding portion 27, a first O-ring 31 (sealing member) of one axial end and a second O-ring 33 (sealing member) of the other axial end are fitted axially spaced in side by side relation with intervening a collar 35 therebetween, and on the other axial end thereof a resin bush 37 is fitted. The resin bush 37 is formed in a short tubular shape, and has an inner diameter generally identical to an inner diameter of the link portion 29. The resin bush 37 is provided integrally with low annular projecting portions 39, 41 at an opposite axial end portion and an axial mid portion on an outer peripheral surface thereof respectively. The annular projecting portions 39, 41 are formed so as to project somewhat radially outwardly. An opposite axial end portion of an inner peripheral surface of the seal holding portion 27 is shaped so as to correspond to an outer peripheral surface of the resin bush 37 in shape. The resin bush 37 is fitted in an opposite axial end portion of the seal holding portion 27 so that an annular end surface 43 of the other axial end of the resin bush 37 is co-planer with an annular stepped end surface or radial surface 45 which is formed in inner side of the retainer holding portion 25 on one axial end thereof so as to expand radially inwardly with narrow width. The first O-ring 31 and the second O-ring 33 are axially maintained between the resin bush 37 and an annular stepped surface or radial surface 47 which is defined on one axial end of inside of the seal holding portion 27. The first O-ring 31 is, for example, made of fluoro-rubber (FKM) of excellent waterproof property, excellent dust-proof property, high-gasoline resistance and ozone-resistance. The second O-ring 33 is, for example, made of fluoro-silicon-rubber (FVMQ,) of excellent water-proof property, excellent dust-proof property, high low-temperature resistance and ozone-resistance.

Figure 2:
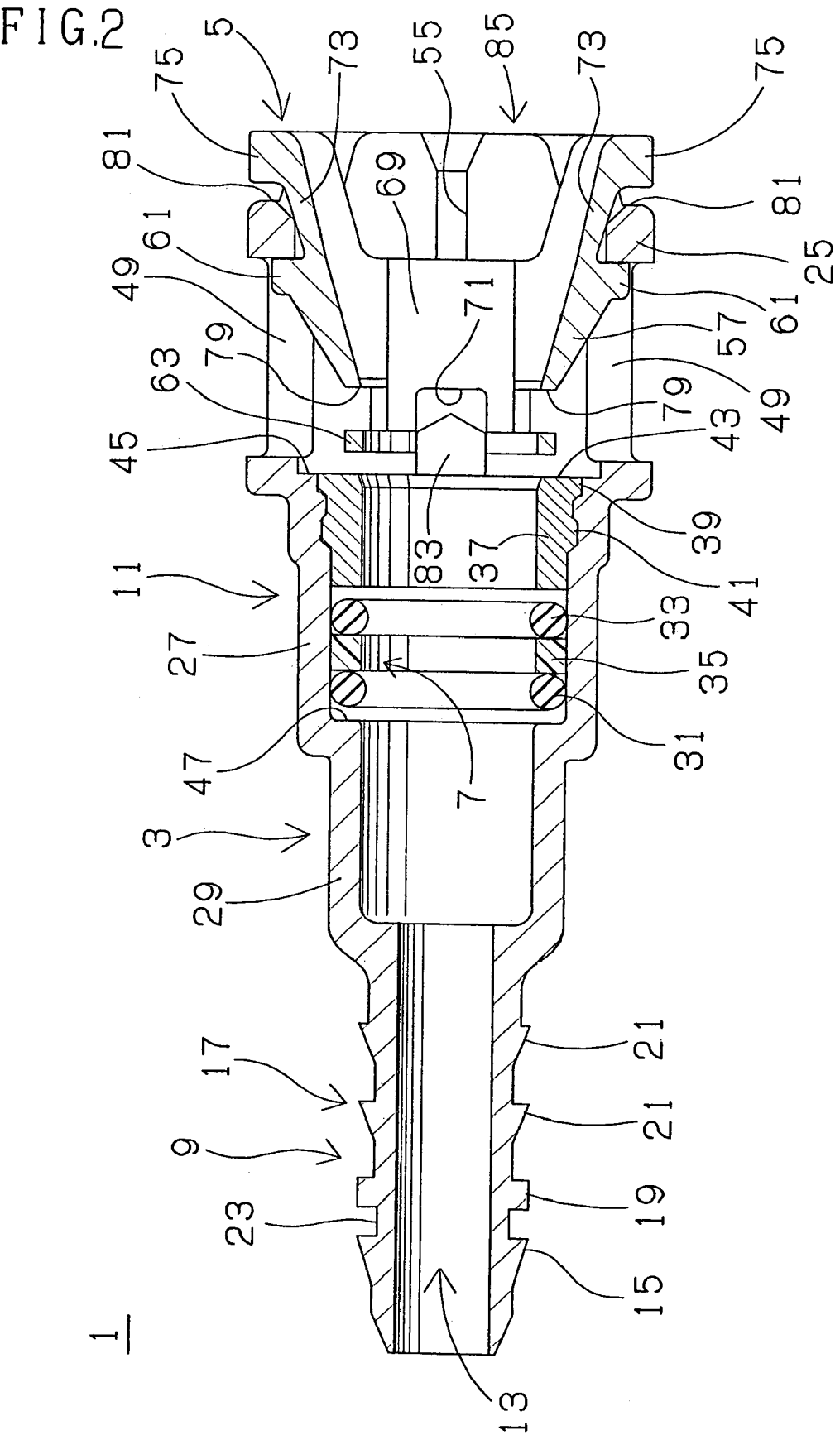
FIG. 2 is a sectional view of the first quick connector.
Figure 4:
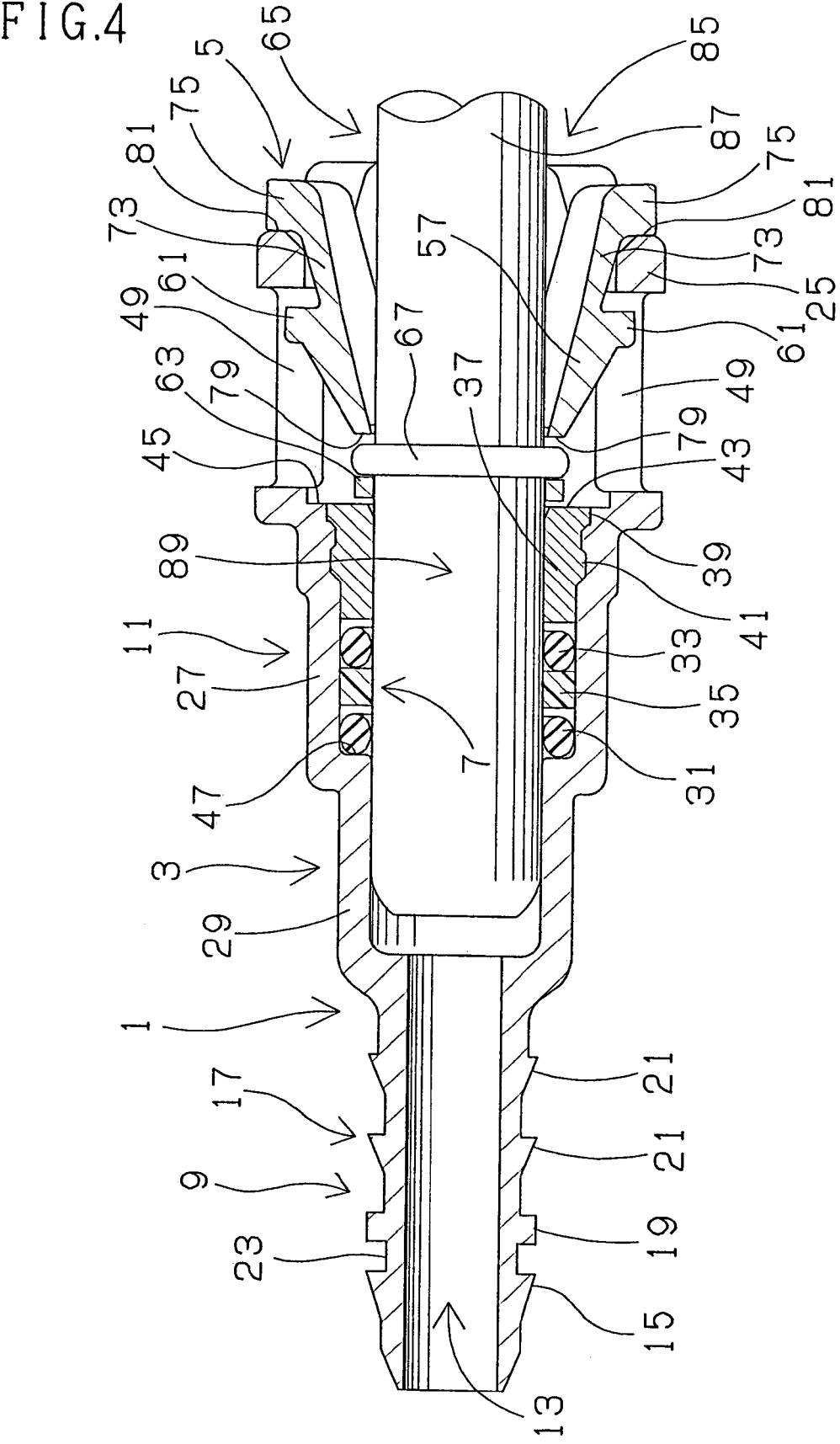
FIG. 4 is a sectional view showing that the first quick connector and the first pipe are connected.

As well shown in FIGS. 1, 2 and 4, the generally cylindrical retainer holding portion 25 of the pipe inserting portion 11 is provided with engagement windows 49, 49 in diametrically symmetrical positions and in opposed relation with one another, and flat regions 51, 51 on outer peripheral surfaces respectively between the engagement windows 49, 49 in diametrically symmetrical positions. Each of the flat regions 51, 51 is formed so as to extend, for example, generally for entire length of the retainer holding portion 25. The flat regions 51, 51 of the retainer holding portion 25 are provided with raised portions 53, 53 respectively at a widthwise center portion on the other axial end thereof (also refer to FIG. 5). The raised portion 53 extends in an axial direction from an opposite axial end of the flat region 51 to a position beyond an axial center of the retainer holding portion 25. In an inner peripheral surface of the retainer holding portion 25, rotation preventive engagement recesses 55, 55 of trapezoid widening radially outwardly in cross-section are formed at positions of the raised portions 53, 53 respectively so as to extend along the raised portions 53, 53 from an opposite axial end of the retainer holding portion 25 to one axial end portions of the raised portions 53, 53 (also refer to FIG. 5).

Figure 3:
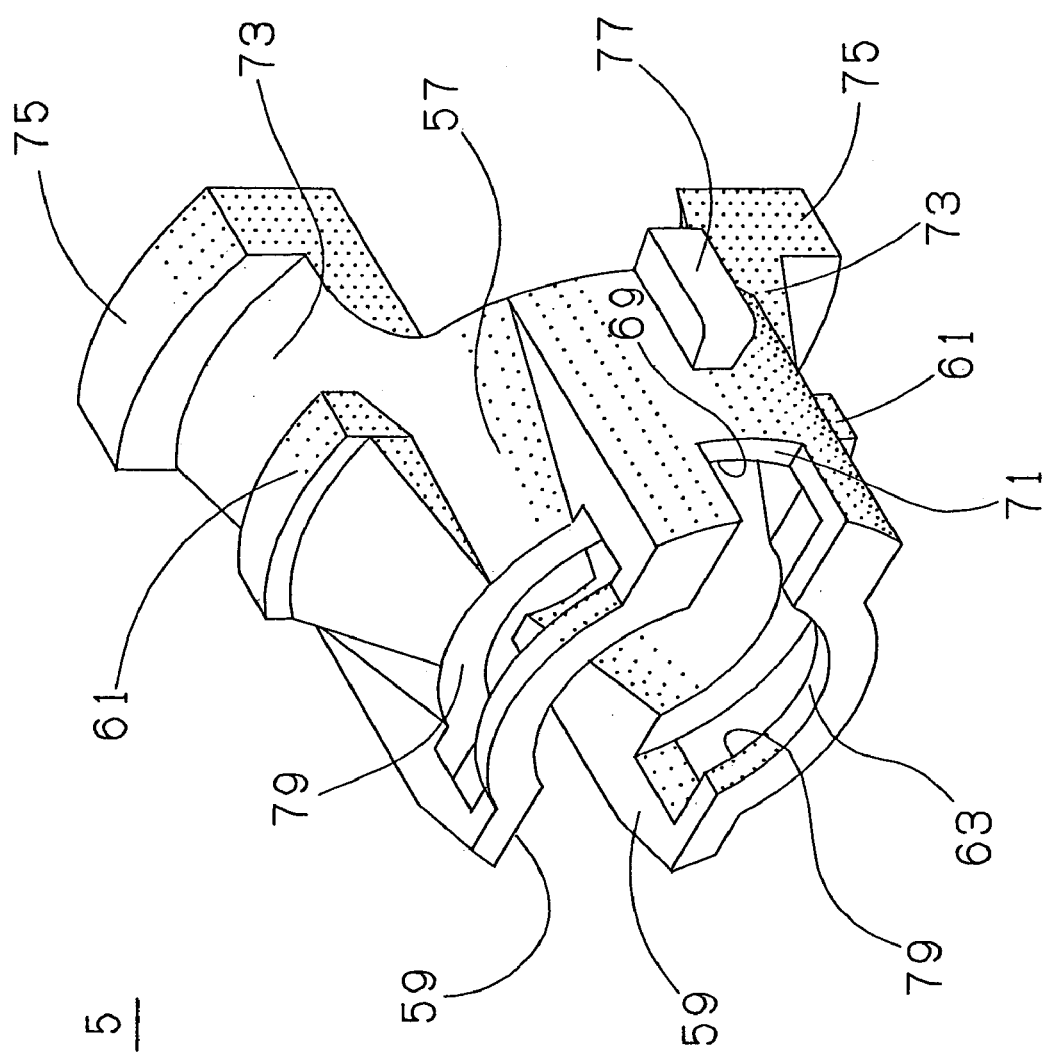
FIG. 3 is a perspective view of a retainer.

As well shown in FIGS. 1, 3 and 4, the retainer 5 made of PA is received and fitted in the retainer holding portion 25. This retainer 5 is relatively flexible, and is formed so as to be resiliently deformable. The retainer 5 has a main body 57 of C-shape in cross-section, wherein a relatively large space for deformation is defined between circumferential opposite end portions 59, 59 thereof. The main body 57 is provided with a pair of engagement tabs 61, 61 projecting radially outwardly in diametrically symmetrical positions of an opposite axial end portion thereof. An inner surface of the main body 57, except the circumferential opposite end portions 59, 59 and a portion diametrically opposed to the space for deformation, is tapered generally in the direction toward one axial end thereof so as to reduce gradually an inner diameter thereof. And, apart from the circumferential opposite end portions 59, 59 and a portion diametrically opposed to the space for deformation, one axial end portion 63 of the main body 57 is formed generally with an inner diameter almost identical to a first pipe 65 or a body of the first pipe 65, and smaller than an annular engagement projection 67 (the body of the first pipe 65 indicates a pipe portion excluding an annular engagement projection 67 of the first pipe 65). A portion diametrically opposed to the space for deformation of the main body 57 has an inner surface 69 like a portion of a cylindrical inner surface shape and slightly recessed, and also has an outer surface like a portion of a cylindrical outer surface shape (also refer to FIG. 5). One axial end portion 63 of a portion diametrically opposed to the space for deformation of the main body 57 is formed with an indent 71.

Figure 5:
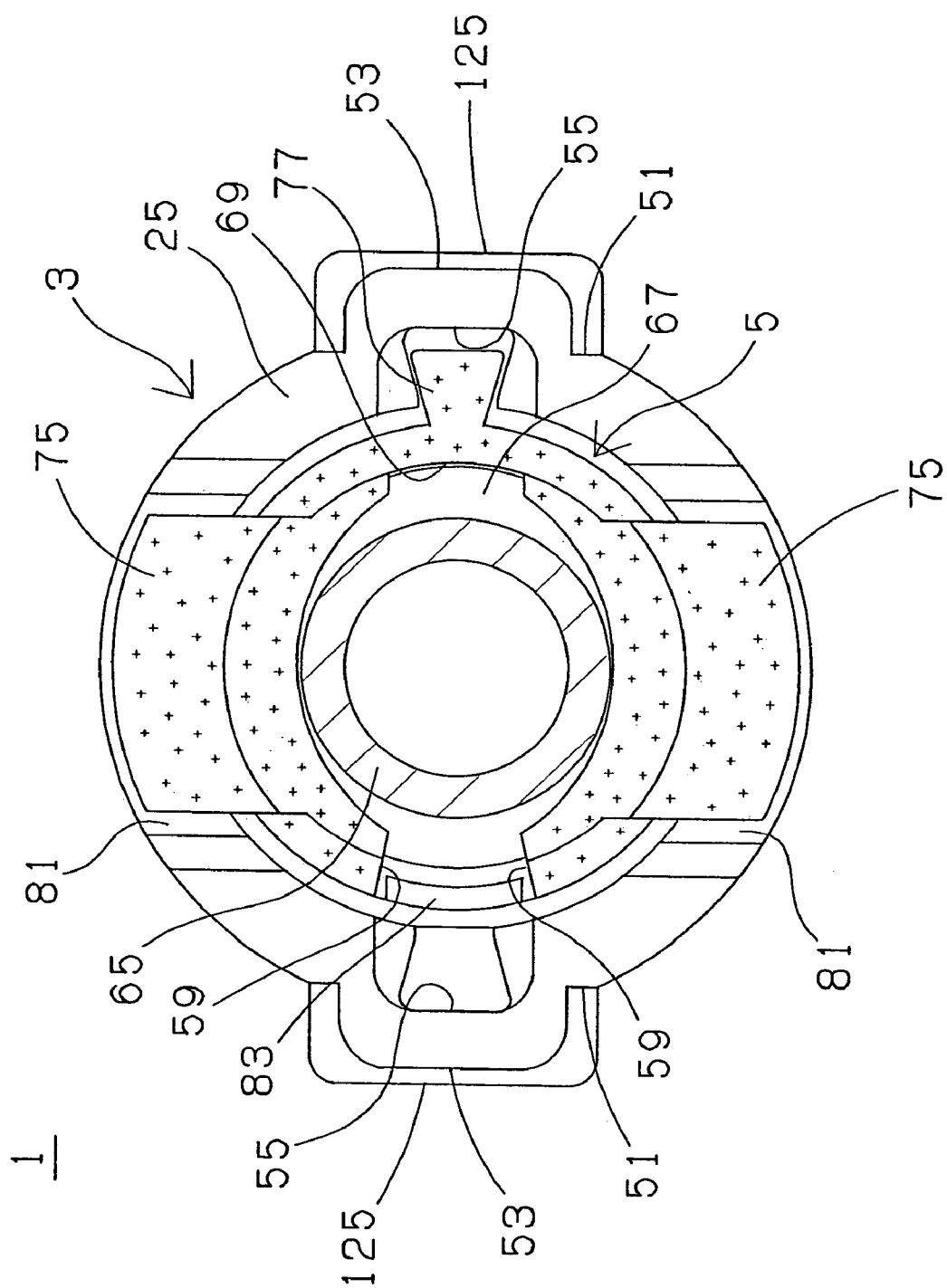
FIG. 5 is a side elevation view of the first quick connector on a side of a retainer holding portion.

A pair of operation arms 73, 73 are formed integrally on an opposite axial end portion of the main body 57 of the retainer 5 so as to extend inclining radially outwardly in an opposite axial direction from respective circumferential positions corresponding to the engagement tabs 61, 61. The operation arm 73 respectively, has a latching end 75 projecting radially outwardly on an opposite axial end portion thereof. On an outer surface of the other axial end of the main body 57, an engagement rib 77 of trapezoid widening radially outwardly in cross-section is formed at position opposed to the space for deformation so as to extend relatively short in an axial direction. The engagement rib 77 is formed in circumferential thickness smaller than or generally identical to the rotation preventive engagement recess 55. The one axial end portion 63 of the main body 57 is provided with engagement slits 79, 79 (connecting engagement portions) extending circumferentially in opposed relation with one another. Thus configured retainer 5 is inserted and fitted in the retainer holding portion 25, so that the engagement rib 77 slidingly moves to and fits in one axial end of the rotation preventive engagement recess 55, the engagement tabs 61, 61 seat in the engagement windows 49, 49 of the retainer holding portion 25 and the latching ends 75, 75 seat in a pair of receiving recessed portions 81, 81 formed in radially symmetrical positions of an opposite axial end portion of the retainer holding portion 25. A reference numeral 83 of FIG. 2 indicates a rotation preventive projection which is formed integrally on an inner peripheral surface of the retainer holding portion 25, and is configured to be located in the indent 71 of the main body 57 of the retainer 5 so as to restrain rotational movement of the retainer 5. As shown in FIG. 5, the other rotation preventive projection 83 of similar configuration is also formed on an inner peripheral surface of the retainer holding portion 25 in a position diametrically opposed to the one rotation preventive projection 83 so as to be located between the circumferential opposite end portions 59, 59.

The retainer 5 is restrained from escape from the retainer holding portion 25 as the engagement tab 61 respectively engages with an opposite axial end of the engagement window 49, and is restrained from rotational movement with respect to the connector housing 3 or the retainer holding portion 25 as the engagement tab 61 respectively engages with a circumferentially opposite ends of the engagement window 49 and a pair of rotation preventive projections 83, 83 seat in the indent 71 and between the circumferential opposite end portions 59, 59 of the retainer 5 respectively (the drawing often shows a slight gap in a rotation preventive mechanism, but preferably no gap is defined in a rotation preventive mechanism). Additionally, the retainer 5 is firmly and elaborately restrained from rotational movement as the engagement rib 77 is fitted in the rotation preventive engagement recess 55 in engagement relation with one another circumferentially and radially.

As well shown in FIGS. 4 and 5, the first pipe 65 which is made of metal, is inserted in the first quick connector 1 through an opening 85 of an opposite axial end of the retainer holding portion 25, more specifically, in the main body 57 of the retainer 5 from a side of the latching ends 75, 75 of the operation arms 73, 73, and is fitted in the first quick connector 1. The first pipe 65, which is adapted in the first anti rotation structure, has an inserting side portion 87 of straight tubular shape. One axial end of the inserting side portion 87 is configured as inserting end portion 89 which is provided with the annular engagement projection 67 on an outer peripheral surface thereof. The first pipe 65 is pushed, and fittingly inserted into the first quick connector 1 or the connector housing 3 so that the annular engagement projection 67 progresses radially expanding inner surface of the main body 57 of the retainer 5 until the annular engagement projection 67 seats in the engagement slits 79, 79 in snap-engagement relation therewith and the inserting end portion 89 is accommodated an entire length thereof in the pipe inserting portion 11 of the connector housing 3. One axial end of the inserting end portion 89 of the first pipe 65 reaches in link portion 29 through the second O-ring 33 and the first O-ring 31, and thereby a seal is formed by the first and second O-rings 31, 33 between an outer periphery surface of the first pipe 65 or the inserting end portion 89 of the first pipe 65 and an inner peripheral surface of the first quick connector 1. Inner diameters of the resin bush 37 and the link portion 29 are generally identical to an outer diameter of the inserting end portion 89 of the first pipe 65, and one axial end from the annular engagement projection 67 of the inserting end portion 89 of the first pipe 65 is inserted in the resin bush 37 and the link portion 29 substantially without play.

Figure 6:
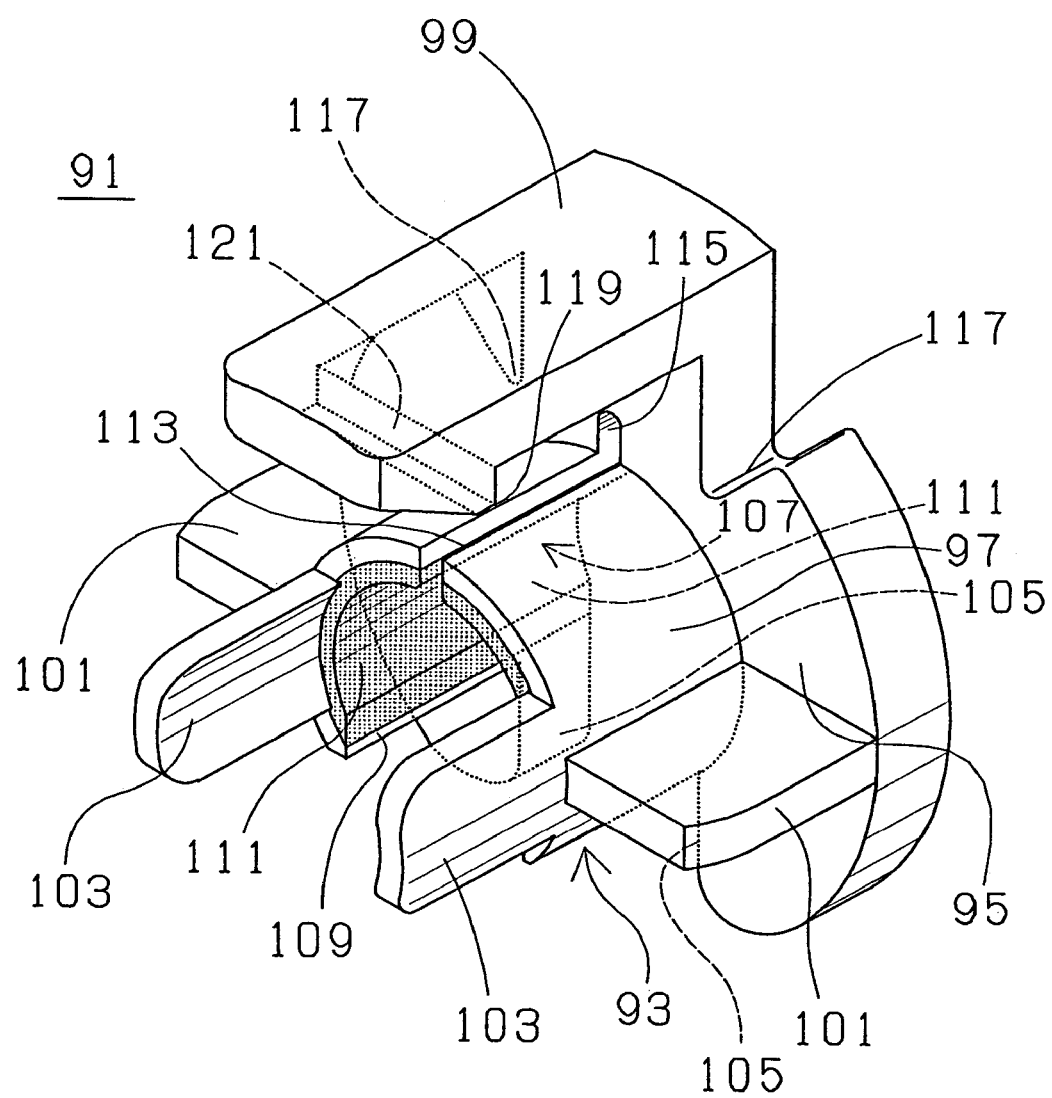
FIG. 6 is a perspective view of a first anti-rotation device for a pipe and a connector adapted in the first anti-rotation structure.
Figure 7:
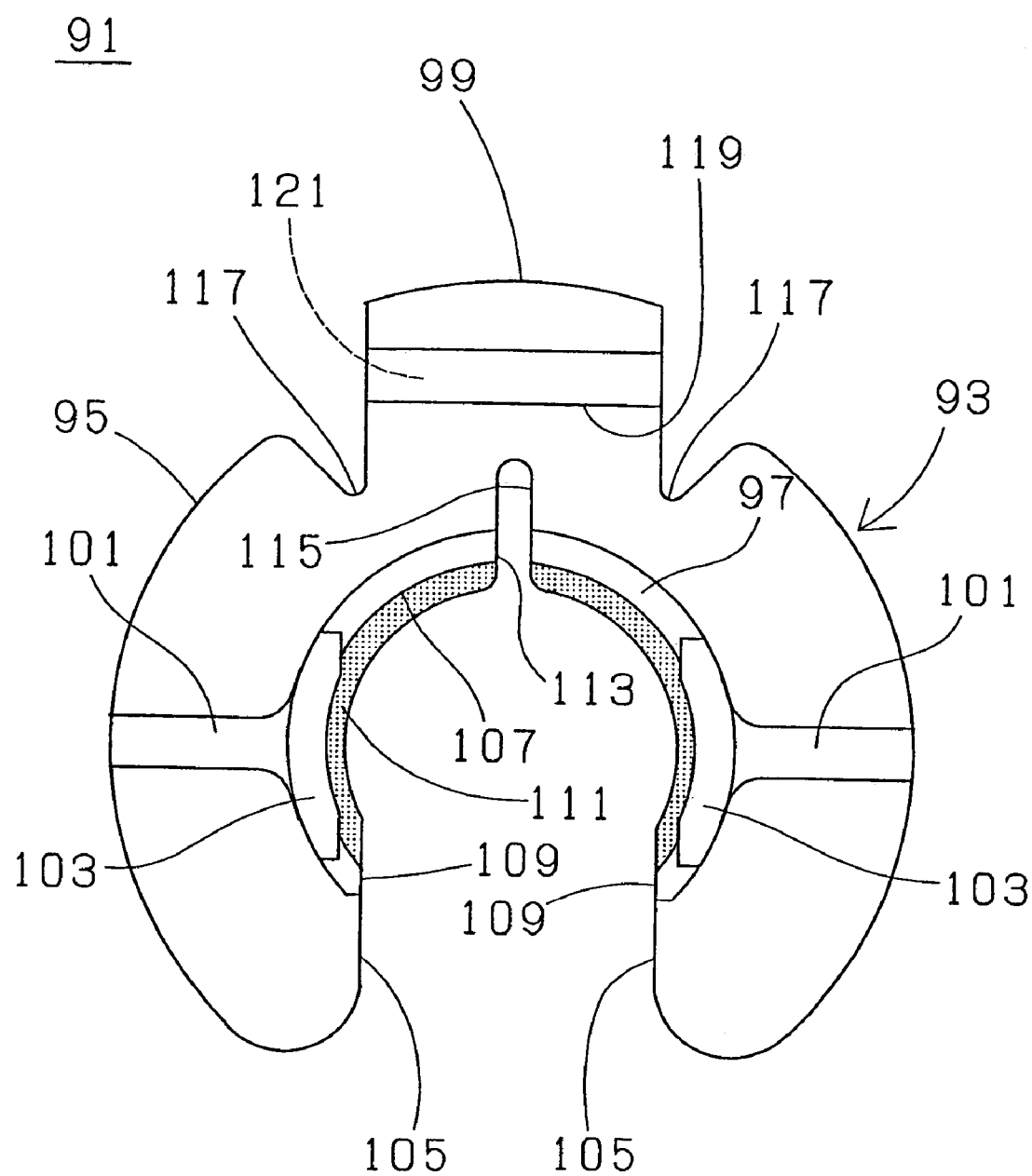
FIG. 7 is a side elevation view of the first anti-rotation device.

As well shown in FIGS. 6 and 7, a first anti-rotation device for a pipe and a connector 91 which is adapted in the first anti-rotation structure comprises a pipe connecting portion 93. The pipe connecting portion 93 includes a C-shaped abutment plate 95 and a clip or fit-on portion 97 of C-shape in cross-section which is formed integrally on the abutment plate 95 so as to project short from one axial side surface of the abutment plate 95 in one axial direction. The first anti-rotation device 91 also comprises an escape prevention verification arm or stop and verification arm 99 (verification means) with narrow width. The stop and verification arm 99 is formed integrally on the abutment plate 95 so as to extend somewhat long from an outer periphery of the abutment plate 95 in one axial direction. The first anti-rotation device 91 further comprises a pair of rotation preventive plates 101, 101 (connector connecting portion) generally of rectangular shape and a pair of abutment fingers 103, 103 (connector connecting portion). The rotation preventive plates 101, 101 are formed integrally on the clip portion 97 so as to extend radially outwardly from diametrically symmetrical positions on an outer peripheral surface of the clip portion 97 respectively. The abutment fingers 103, 103 are also formed integrally on the clip portion 97 so as to extend from one axial end of the clip portion 97 in one axial direction respectively. The abutment plate 95 has an opening portion 105 with a width somewhat smaller than an outer diameter of the first pipe 65, and a clip or fit-on recess 107 formed inside the opening portion 105. The fit-on recess 107 is shaped of about three-quarter arc with diameter generally identical to an outer diameter of the first pipe 65. The clip portion 97 is formed in tubular shape of about three-quarter arc in cross-section with an opening portion 109 identical to the opening portion 105 of the abutment plate 95 in width, and integrally on one axial side surface of the abutment plate 95 so as to be along the fit-on recess 107 thereof. The fit-on recess 107 of the abutment plate 95 and an inner surface of the clip portion 97 define a continuous clipping inner surface without step or stepped portion, to which a thin elastic material layer 111 made of rubber is overall bonded. The clip portion 97 is formed with a narrow slit 113 for entire length thereof on a position opposed to the opening portion 109, and the fit-on recess 107 of the abutment plate 95 is formed with a narrow slot 115 continuous with the narrow slit 113 identical to the narrow slit 113 in width and extending radially outwardly beyond the slit 113 on a position opposed to the opening portion 105. The elastic material layer 111 is separated circumferentially at the position of the narrow slit 113 and the narrow slot 115.

Each of the rotation preventive plates 101, 101 is formed so as to extend for entire length of the clip portion 97 in an axial direction, and at the same time radially outwardly up to a position of a radially outer edge of the abutment plate 95, and integrally connected to one axial side surface of the abutment plate 95 at an opposite axial end thereof. A corner portion between one axial end and radially outer end of the rotation preventive plate 101 is configured in curved line or curved surface bulging outwardly to define a guiding surface. Further, each of the rotation preventive plates 101, 101 is formed so that a distance between radially outer ends thereof is somewhat longer than a distance between bottom surfaces of a pair of the rotation preventive engagement recesses 55, 55 formed in an inner surface of the retainer holding portion 25 of the connector housing 3, and a thickness of the rotation preventive plate 101 is designed generally identical to a width of the rotation preventive engagement recess 55 at the narrowest portion thereof.

An outer peripheral surface of the abutment plate 95 is formed with a pair of notch-like recesses 117, 117 with the narrow slot 115 therebetween on a diametrically symmetrical position with respect to the opening portion 105. The stop and verification arm 99 is formed integrally on a portion between the notch-like recesses 117, 117 at radially outer end portion thereof. The stop and verification arm 99 is provided with a hook portion 119 (engagement portion for verification) on a radially inner side of one axial end portion. An axial length of the stop and verification arm 99, namely an axial distance from one axial side surface of the abutment plate 95 to an engagement surface 121 of the hook portion 119 is designed generally identical to an axial distance from an opposite axial end of the connector housing 3 to an opposite axial end (engageable portion) of the engagement window 49.

And, each of the abutment fingers 103, 103 is configured so that an axial distance from one axial side surface of the abutment plate 95 to one axial end of the abutment finger 103 is generally identical to an axial distance from an opposite axial end of the connector housing 3 to a position somewhat toward the other axial end from the annular stepped end surface 45 of the retainer holding portion 25, that is an axial distance from an opposite axial end of the connector housing 3 to a position slightly toward the other axial end from the engagement slit 79 of the retainer 5 in which the first pipe 65 is inserted correctly.

The first anti-rotation device 91 is fitted on an assembled unit of the first quick connector 1 and the first pipe 65 in following manner. First, the abutment plate 95 and the clip portion 97 are fitted via the opening portion 105 and the opening portion 109 on an outer periphery of the straight tubular inserting side portion 87 of the first pipe 65 which extends axially outwardly or in an opposite axial direction from an opposite axial end of the first quick connector 1 so that the inserting side portion 87 of the first pipe 65 is fitted in the fit-on recess 107 of the abutment plate 95 and the clip portion 97 to which the elastic material layer 111 is bonded (refer to FIG. 8a). Although width of the opening portion 105 of the abutment plate 95 and the opening portion 109 of the clip portion 97 is configured slightly smaller than an outer diameter of the first pipe 65, the notch-like recesses 117, 117 and the narrow slot 115 formed in the abutment plate 95, and the narrow slit 113 formed in the clip portion 97 allow the abutment plate 95 and the clip portion 97 to readily deform so as to open when the first anti-rotation device 91 is fitted on the first pipe 65. After the first anti-rotation device 91 is fitted on an outer periphery of the inserting side portion 87 of the first pipe 65, the first anti-rotation device 91 is slid and moved over the inserting side portion 87 of the first pipe 65 in one axial direction toward the first quick connector 1 until one axial side surface of the abutment plate 95 abuts an opposite axial end of the first quick connector 1 or the connector housing 3 (refer to FIG. 8b).

As the first anti-rotation device 91 progresses, the clip portion 97 and the abutment fingers 103, 103 are to be received or inserted in the retainer holding portion 25 of the connector housing 3 accordingly. In preparation for the clip portion 97 to be received, the clip portion 97 is adjusted relative to the retainer holding portion 25 so that the rotation preventive plates 101, 101 correspond in position to the rotation preventive engagement recesses 55, 55 formed in an inner peripheral surface of the retainer holding portion 25. Although a distance between radially outer ends of the rotation preventive plates 101, 101 is slightly longer than a distance between bottom surfaces of the rotation preventive engagement recesses 55, 55, as a guiding surface is defined on a corner portion between one axial end and radially outer end of the rotation preventive plate 101, each of the rotation preventive plates 101, 101 seats in the rotation preventive engagement recess 55 with narrowing the clip portion 97 and the abutment plate 95 in diameter, and progresses in one axial direction in the rotation preventive engagement recess 55. The abutment plate 95 and the clip portion 97 are readily narrowed in diameter and deformed by the notch-like recesses 117, 117 and the narrow slot 115 formed in the abutment plate 95 and the slit 113 formed in the clip portion 97. The abutment plate 95 and the clip portion 91 are required to have a clipping and pressing force with respect to the first pipe 65, when the rotation preventive plates 101, 101 seat in the rotation preventive engagement recesses 55, 55 respectively, but the clipping and pressing force required is only to such an extent as to hold the first pipe 65 against slight rotational movement caused by vibration. Therefore, a difference between a distance from one to the other radially outer end of the rotation preventive plates 101, 101 and a distance from one to the other bottom surface of the rotation preventive engagement recesses 55, 55 are designed very small. That means, as a sliding resistance or friction between the rotation preventive plate 101 and the rotation preventive engagement recess 55 is not so large, the first anti-rotation device 91 is slidable over the first pipe 65 even after the rotation preventive plate 101 seats in the rotation preventive engagement recess 55.

Figure 9:
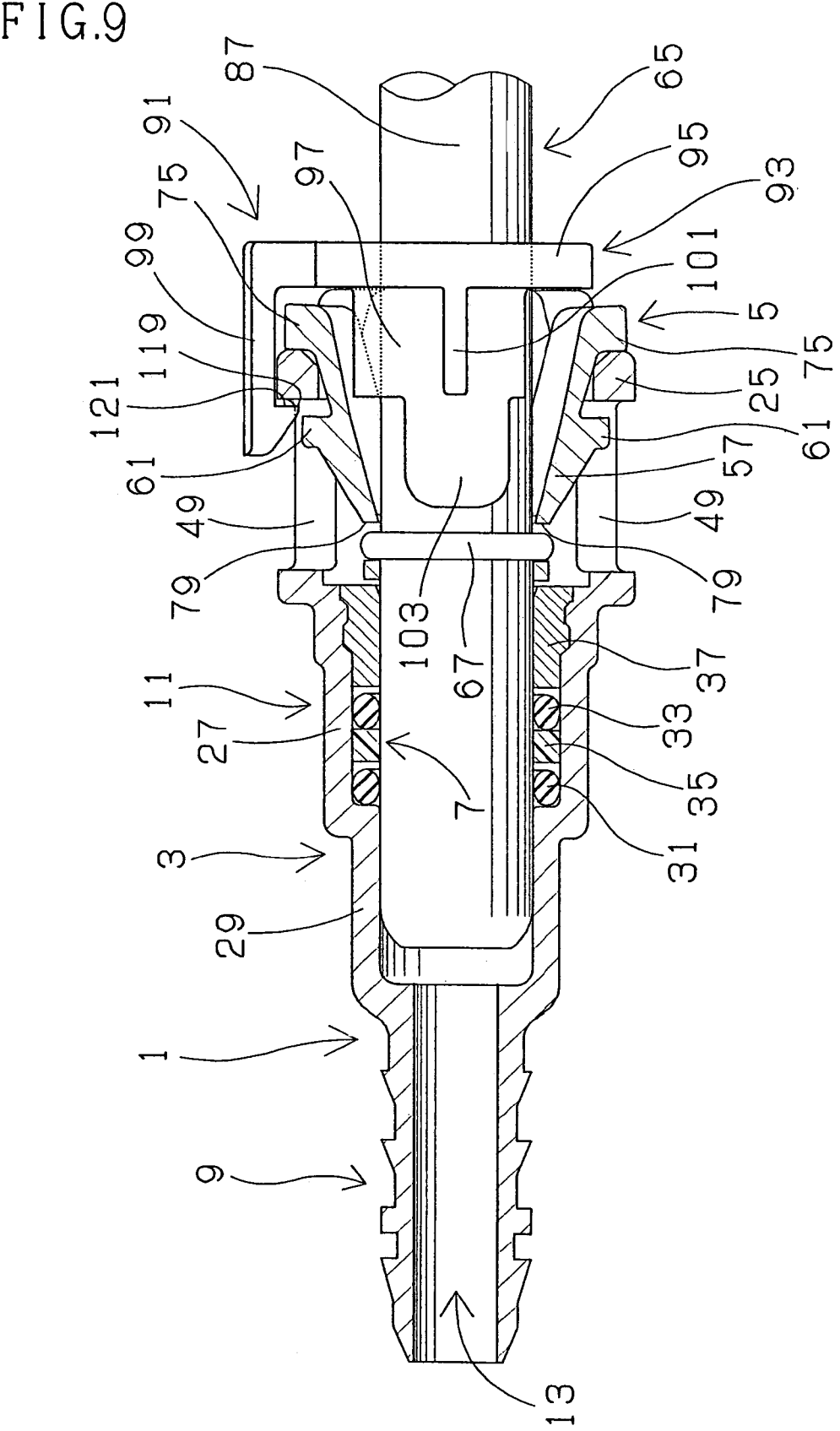
FIG. 9 is a sectional view of the first anti-rotation structure.
Figure 10:
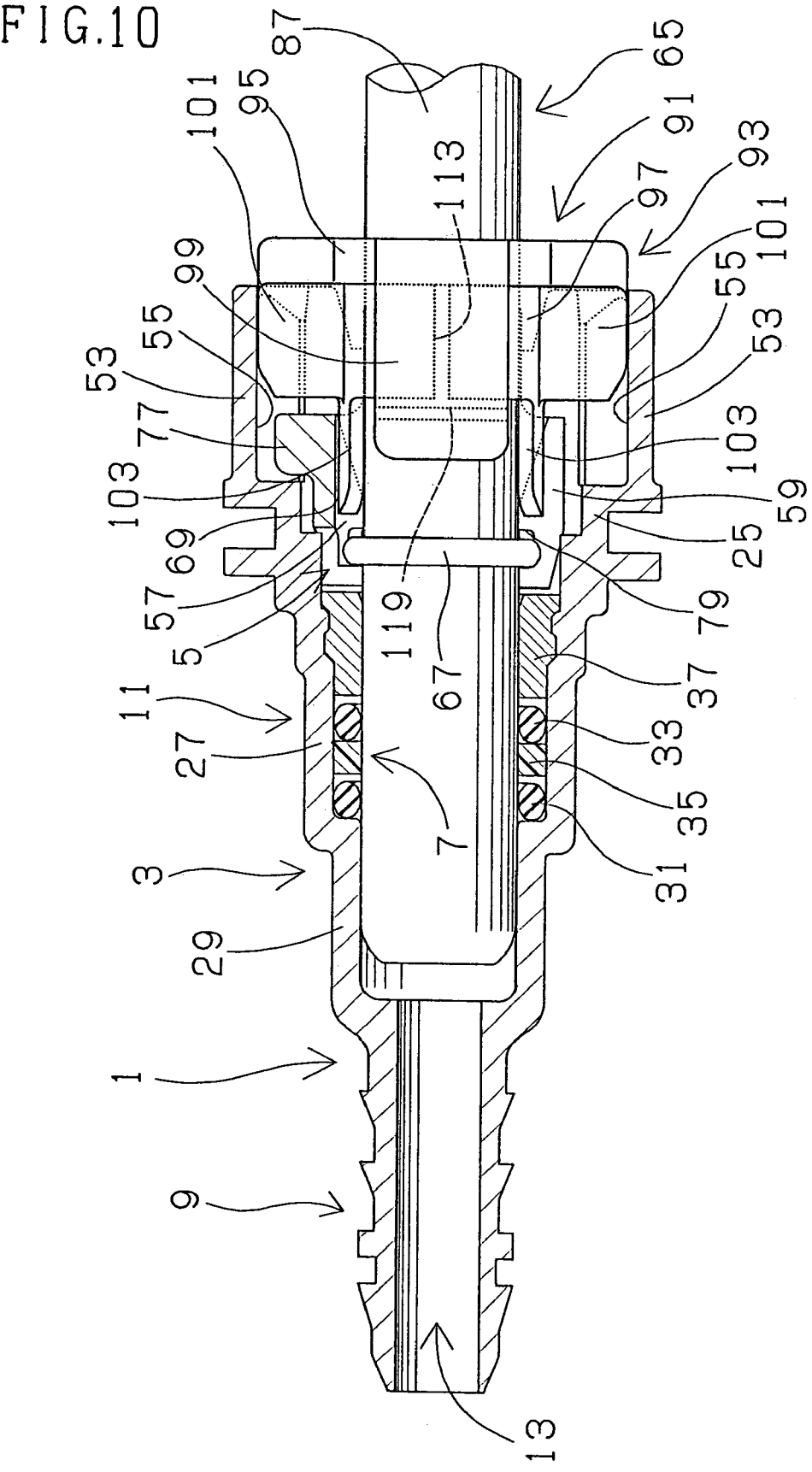
FIG. 10 is another sectional view of the first anti-rotation structure.
Figure 11:
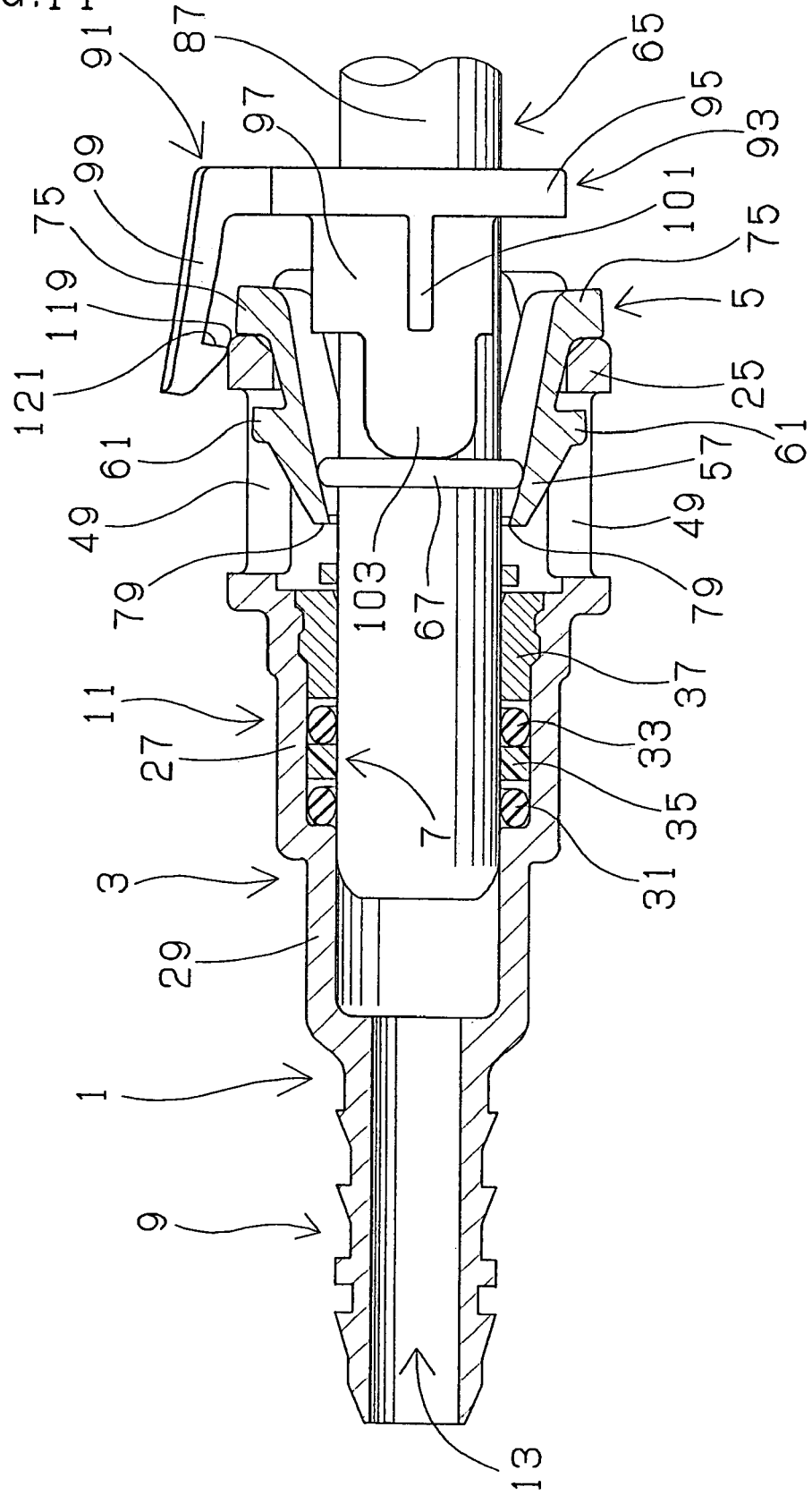
FIG. 11 is a view showing the first anti-rotation device is mounted when the first quick connector and the first pipe are in half-fitting relation.

Then one axial side surface of the abutment plate 95 is abutted to an opposite axial end of the connector housing 3, the hook portion 119 or the engagement surface 121 of the hook portion 119 of the stop and verification arm 99 is engaged with an opposite axial end of the engagement window 49 (engageable portion). In this manner, as shown in FIGS. 9 and 10, the first anti-rotation device 91 is completely mounted. The first anti-rotation device 91 is mounted on the assembled unit of the first quick connector 1 and the first pipe 65 so as not to be displaced with respect to the first quick connector 1 in the other axial direction by engagement of the hook portion 119 of the stop and verification arm 99 with the engagement window 49, not to rotate with respect to the first quick connector 1 by fit-engagement of the rotation preventive plate 101 in the rotation preventive engagement recess 55, and not to rotate with respect to the first pipe 65 by clipping and pressing the first pipe 65 with the clip portion 97 and the abutment plate 95. When the first anti-rotation device 91 is mounted on the assembled unit, the clip portion 97 is received in the retainer holding portion 25 on the other axial end from the main body 57 of the retainer 5, while the abutment fingers 103, 103 are received between circumferentially opposite ends 59, 59 and in the recessed inner surface 69 (in a recess including the recessed inner surface 69) of the main body 57 respectively. Therefore, the abutment fingers 103, 103 engage non-rotatably with the retainer 5 which is fitted in the retainer holding portion 25 of the connector housing 3 in anti-rotating relation therewith. That means, non-rotatable engagement of the abutment finger 103 with the retainer 5, and with the first quick connector 1 also allows the first anti-rotation device 91 to mount on the first quick connector 1 so as not to rotate with respect to the first quick connector 1. And, if a width of the stop and verification arm 99 or the hook portion 119 is sized so as to correspond to a width of the engagement window 49, the stop and verification arm 99 engages non-rotatably with connector housing 3 or the first quick connector 1. Non-rotatable engagement relation between the stop and verification arm 99 (connector connecting portion) and the first quick connector 1 further also allows the anti-rotation device 91 to be mounted on the first quick connector 1 in anti-rotating relation therewith. In this embodiment, three types of connector connecting portions are defined in order to enhance restraint effects against rotation of the anti-rotation device 91. However, one or two types of connector connecting portions may be adapted to mount the first anti-rotation device 91 on the first quick connector 1.

By the way, when the rotation preventive plate 101 seats in the rotation preventive engagement recess 55, the clip portion 97 and the abutment plate 95 clip and press the first pipe 65, and thereby the first anti-rotation device 91 is loosely fixed on the first pipe 65. Therefore, if the annular engagement projection 67 of the first pipe 65 does not snap-engage in the engagement slit 79 of the retainer 5 in half fitting relation, and the first anti-rotation device 91 is moved in one axial direction, or the first anti-rotation device 91 is pulled or pushed toward the first quick connector 1, the annular engagement projection 67 is relatively moved in retainer 5 in one axial direction and finally snap-engages in the engagement slit 79 of the retainer 5. Meanwhile, clipping force on the first pipe 65 exerted by the clip portion 97 and the abutment plate 95 is only to such an extent as to restrain slight rotational movement of the first pipe 65 and the first anti-rotation device 91 caused by vibration, and is not so large. Hence, even if the first anti-rotation device 91 is pulled or pushed in one axial direction or toward the first quick connector 1, there is a possibility that the annular engagement projection 67 does not immediately snap-engage in the engagement slit 79 of the retainer 5. However, even in this case, one axial end of the abutment finger 103 abuts the annular engagement projection 67 before the hook portion 119 of the stop and verification arm 99 engages with the engagement window 49 refer to FIG. 11). If the first anti-rotation device 91 is forcedly pulled or pushed toward one axial direction so as to engage the hook portion 119 with the engagement window 49, the annular engagement projection 67 is relatively moved in one axial direction and consequently snap-engages in the engagement slit 79. In case that the abutment finger 103 abuts the annular engagement projection 67 of the first pipe 65 before the clip portion 97 and the abutment plate 95 clip and press the first pipe 65, the annular engagement projection 67 is pushed with the abutment finger 103, relatively moved in one axial direction by pulling or pushing the first anti-rotation device 91 in one axial direction, and consequently snap-engages in the engagement slit 79. That is, the first anti-rotation device 91 has a connection assist function to assist correct fit-in connection of a pipe. In this state, if the hook portion 119 cannot be engaged with the engagement window 49 by forcedly pulling or pushing the first anti-rotation device 91 in one axial direction, first, the first pipe 65 is forcedly relatively pushed and inserted into the connector housing 3, then the first anti-rotation device 91 is pulled or pushed again. Then, the hook portion 119 can be engaged with the engagement window 49. As such, as long as the annular engagement projection 67 does not snap-engage in the engagement slit 79 of the retainer 5, as the abutment finger 103 abuts the annular engagement projection 67 which is located relatively toward the other axial end compared to a position thereof under the state of complete connection of the first pipe 65 and the first quick connector 1, the anti-rotation device 91 cannot be moved relatively toward the first quick connector 1 so that the hook portion 119 of the stop and verification arm 99 reaches the engagement window 49 and the hook portion 119 engages with the engagement window 49. Thus, the stop and verification arm 99 or the first anti-rotation device 91 has a function to verify correct connection between the first pipe 65 and the first quick connector 1.

In the event of removing the first anti-rotation device 91 from the assembled unit, first, engagement of the hook portion 119 of the stop and verification arm 99 with the engagement window 49 is released, and then the first anti-rotation device 91 is pulled out of the retainer holding portion 25 of the connector housing 3. The first anti-rotation device 91 which is removed may be again fitted on the assembled unit of the first quick connector 1 and the first pipe 65.

As shown with chain double-dashed lines in FIG. 8, a strip or strap 123 for combining purpose may be fitted to an outer periphery of the retainer holding portion 25 at one end portion thereof and to the stop and verification arm 99 at the other end portion thereof so as to always keep the first quick connector 1 and the first anti-rotation device 91 in combination relation with one another. The strap 123 is fitted or mounted to an outer periphery of the retainer holding portion 25, for example, by way of a raised or recessed portion formed on the retainer holding portion 25 for purpose of an additional function or the like, for example, the elongate rib 125.

Figure 12:
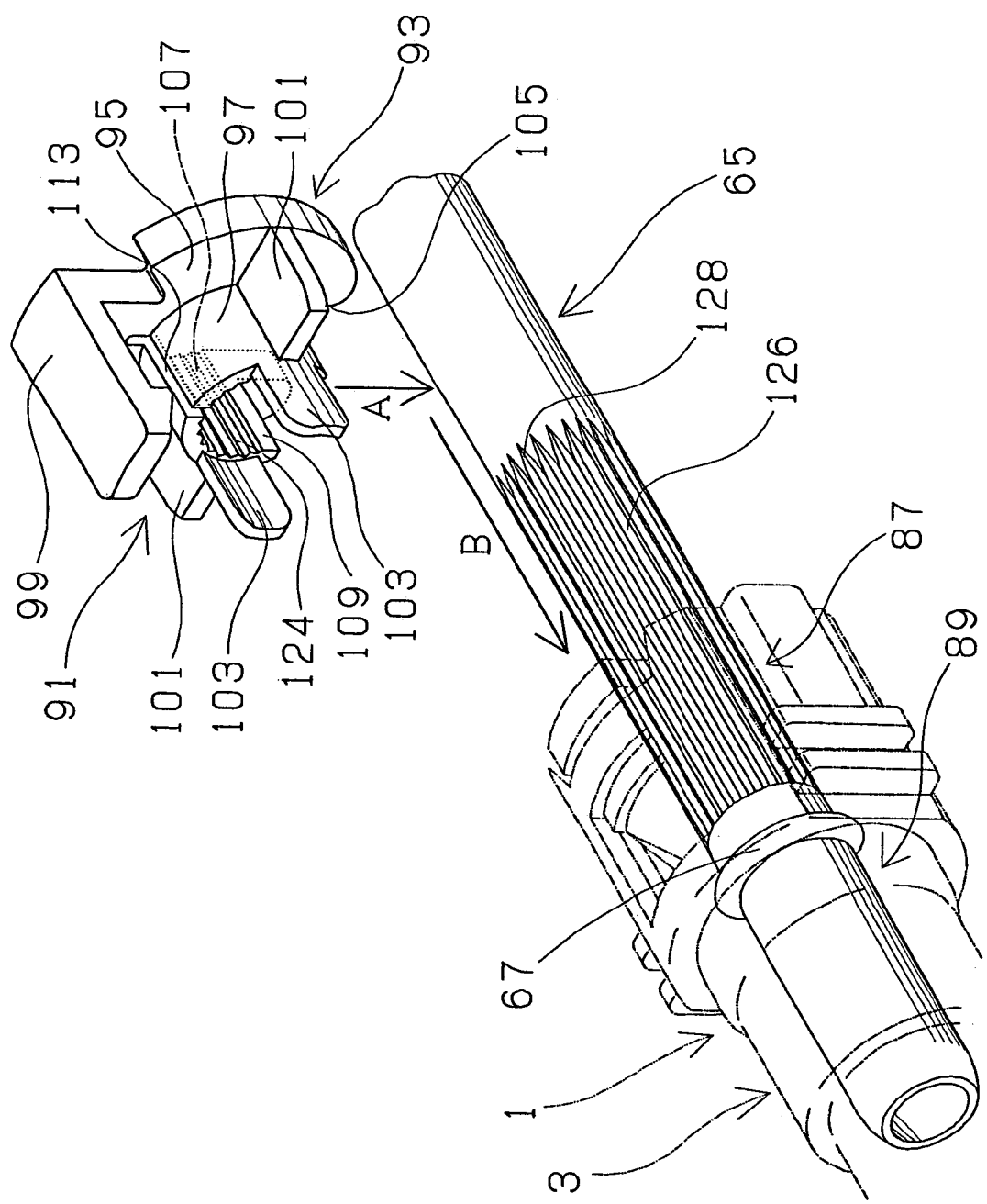
FIG. 12 is a view showing that knurls are formed in the first anti-rotation device and the first pipe.

As shown in FIG. 12, the first anti-rotating device 91 may be formed with knurls for a device 124 (a series of ridge lines or groove lines) extending in an axial direction on an inner surface thereof, while the inserting side portion 87 of the first pipe 65 may be formed with knurls for a pipe 126 (a series of ridge lines or groove lines) extending in an axial direction on an outer peripheral surface thereof. Here, the first anti-rotating device 91 is mounted on an assembled unit of the first quick connector 1 and the first pipe 65 so that the knurls for a device 124 engage with the knurls for a pipe 126 circumferentially. Although the first anti-rotation device 91 is mounted on the assembled unit of the first quick connector 1 and the fist pipe 65 so that the clip portion 97 and the abutment plate 95 clip and press the first pipe 65 in anti-rotating relation, if the knurls for a device 124 and the knurls for a pipe 126 are configured to engage each other circumferentially, a firm anti-rotating engagement is ensured. Preferably, an opposite axial end portion of the knurls for a pipe 126 is sloped to define sloped surface 128 continuous with an outer peripheral surface of the first pipe 65, which does not create a step or stepped portion between the knurls for a pipe 126 and the other axial end from the knurls for a pipe 126 of an outer peripheral surface of the first pipe 65. In this configuration, any inconvenience is avoided to sliding operation of the first anti-rotation device 91. As for knurled finish, satin finish as shown with numeral reference 126 in FIG. 13a or cross-knurled finish as shown with numeral reference 126 in FIG. 13b is also applicable. In this case, it is possible not to provide the knurls for a device 124 in the first anti-rotation device 91.

In this embodiment, the elastic material layer 111 is eliminated on a clipping inner surface defined by the fit-on recess 107 of the abutment plate 95 and an inner surface of the clip portion 97. Instead, the fit-on recess 107 of the abutment plate 95 and an inner surface of the clip portion 95, namely a clipping inner surface is formed slightly small in diameter, and provided with the knurls for a device 124 for entire length thereof and for a circumferential range thereof excluding the opening portion 105 and the opening portion 107. The knurls for a pipe 126 are formed on the first pipe 65 on the other axial end from the annular engagement projection 67 for a circumferential range so as to extend for an axial length generally three times longer than that of the knurls for a device 124.

The first anti-rotation device 91 with knurls is fitted on an assembled unit of the first quick connector 1 and the first pipe 65 in following manner as shown in FIG. 12. First, the abutment plate 95 and the clip portion 97 are fitted via the opening portion 105 and the opening portion 109 on an outer periphery of the straight tubular inserting side portion 87 of the first pipe 65 which extends axially outwardly or an opposite axial direction from an opposite axial end of the first quick connector 1 so that the other axial end from the knurls for pipe 126 of the inserting side portion 87 of the first pipe 65 is fitted in the fit-on recess 107 of the abutment plate 95 and the clip portion 97 which are provided with the knurls for a pipe 126 (refer to an arrow A of FIG. 12). Then, the first anti-rotation device 91 with knurls is slid and moved over the inserting side portion 87 of the first pipe 65 in one axial direction toward the first quick connector 1 until one axial side surface of the abutment plate 95 abuts an opposite axial end of the first quick connector 1 or the connector housing 3 (refer to an arrow B of FIG. 12). As for others, the anti-rotation device 91 with knurls is generally same with regard to configuration, functions and mounting manner as the anti-rotation device 91 without knurls before modification. Therefore, as to portions of configuration and functions identical to the anti-rotation device 91 without knurls, identical numeral references are almost given and explanations are almost omitted herein. And, as the knurls for a device 124 and the knurls for a pipe 126 are formed so as to extend in an axial direction, a clipping inner surface defined by the fit-on recess 107 of the abutment plate 95 and an inner surface of the clip portion 97 can be slid over the knurls for a pipe 126 relatively smoothly in an axial direction. In this configuration, any inconvenience is avoided to sliding of the first anti-rotation device 91 with knurls over the first pipe 65.

A second anti-rotation structure for a pipe and a connector according to the present invention is explained with reference to FIGS. 14 to 17. The second anti-rotation structure is constructed by modifying the first quick connector 1 and the first anti-rotation device 91 in the first anti-rotation structure. Therefore, as to portions of configuration and functions identical to the first quick connector 1 and the first anti-rotation device 91, identical numeral references are almost given and explanations are almost omitted herein.

Figure 14:
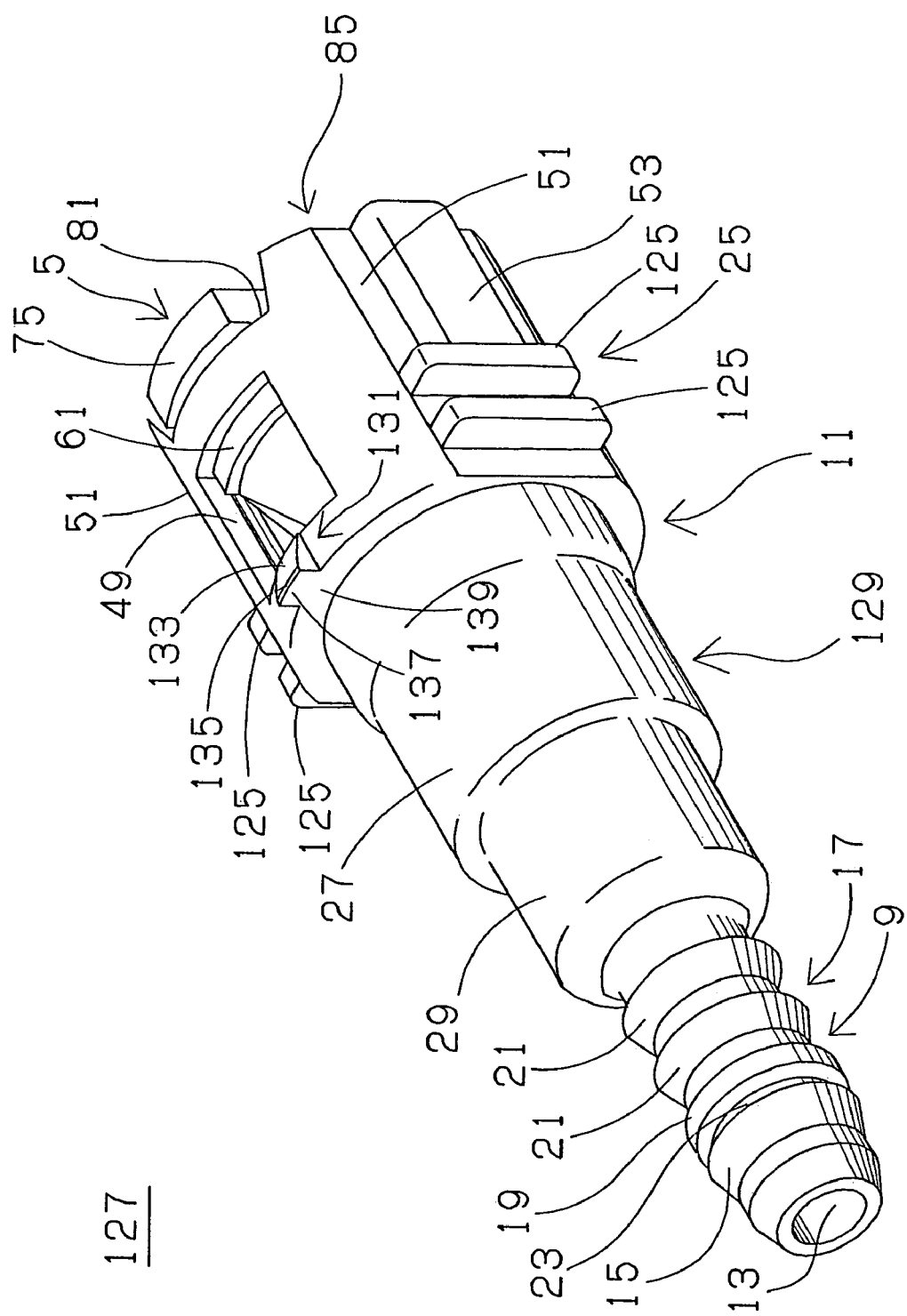
FIG. 14 is a perspective view of a second quick connector adapted in a second anti-rotation structure for a pipe and a connector according to the present invention.
Figure 16:
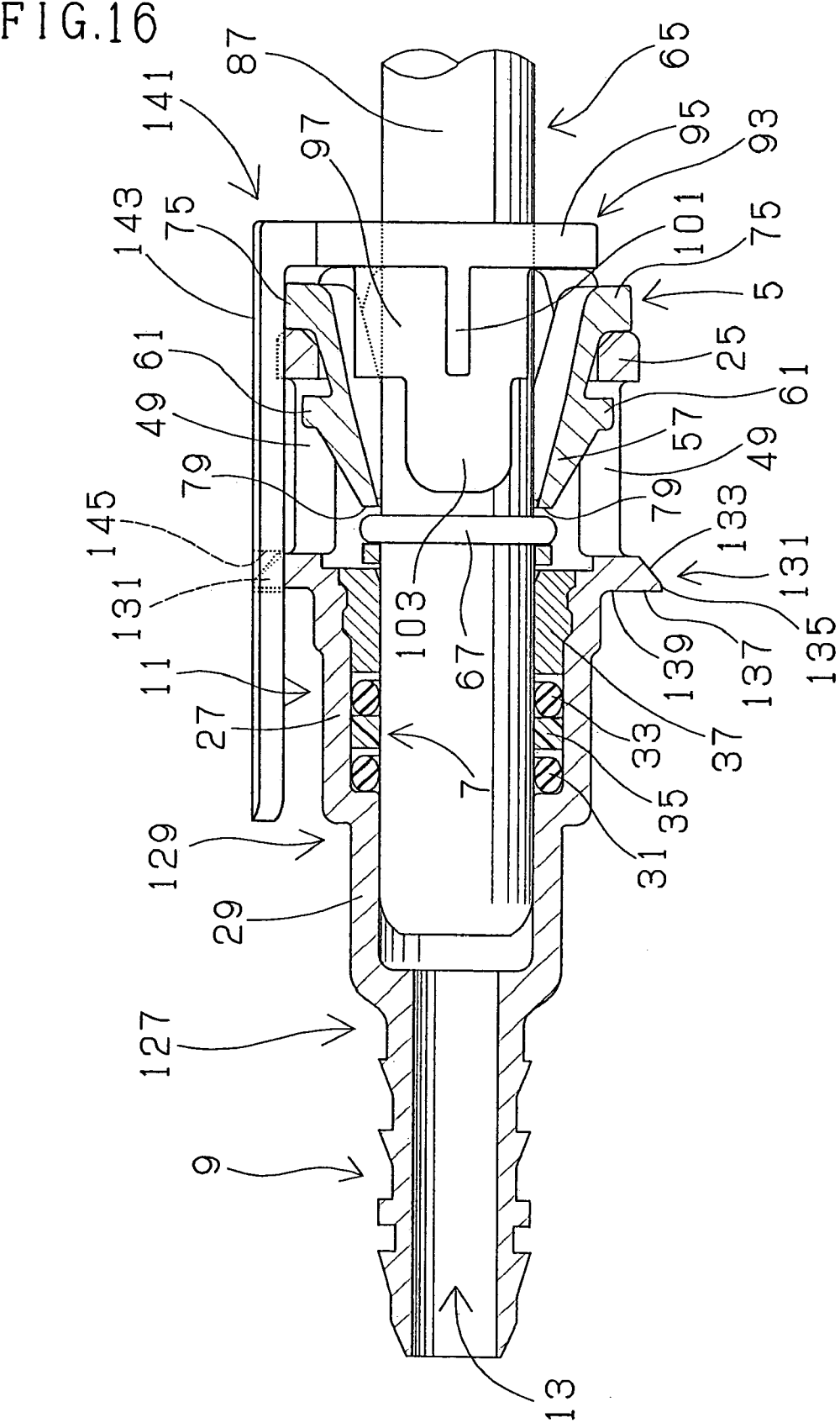
FIG. 16 is a sectional view of the second anti-rotation structure.
Figure 17:
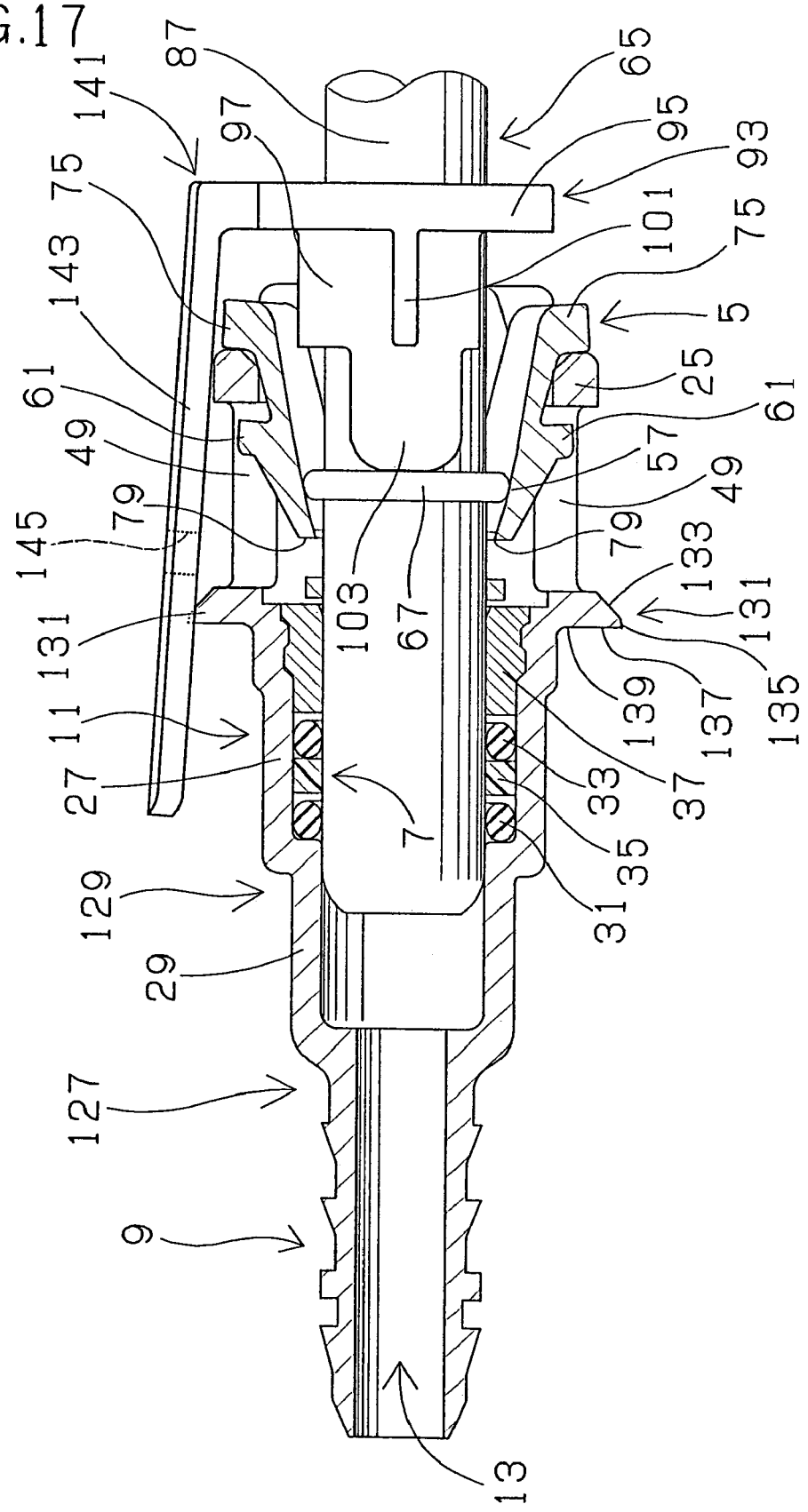
FIG. 17 is a view showing the second anti-rotation device is mounted when the second quick connector and the first pipe are in half-fitting relation.
Figure 18:
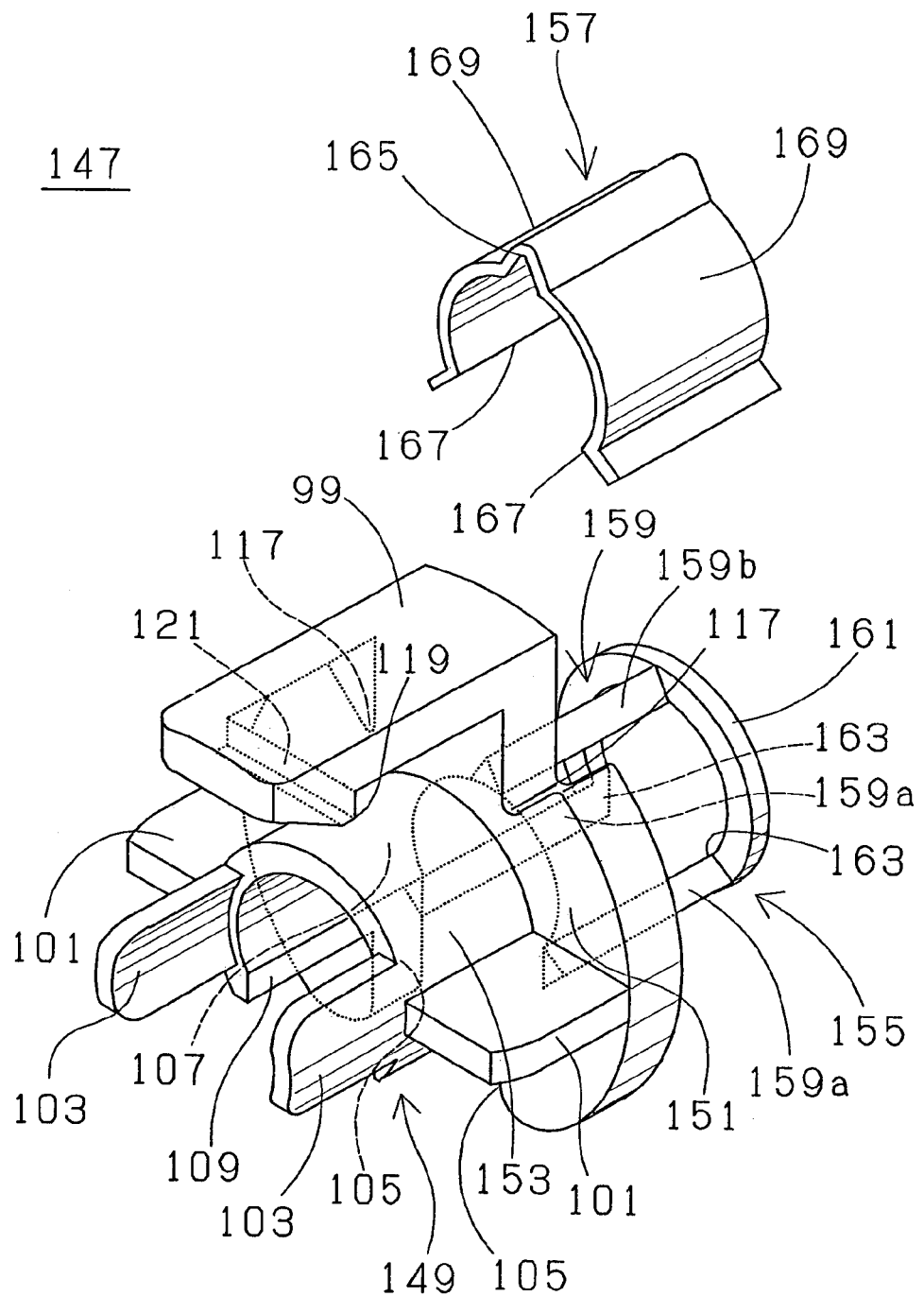
FIG. 18 is a perspective view of a third anti-rotation device for a pipe and a connector adapted in a third anti-rotation structure for a pipe and a connector according to the present invention.
Figure 20:
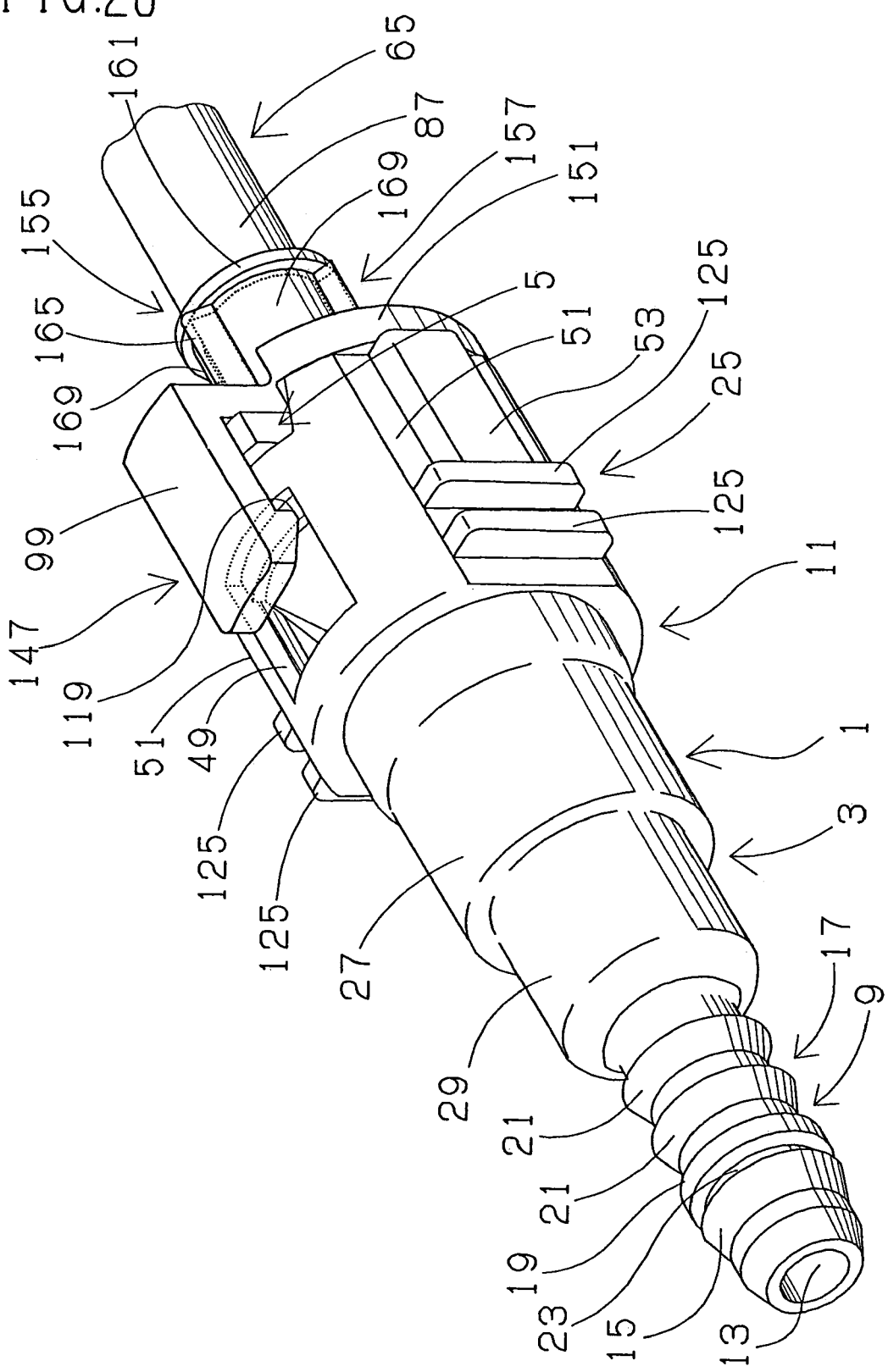
FIG. 20 is a perspective view of the third anti-rotation structure.
Figure 21:
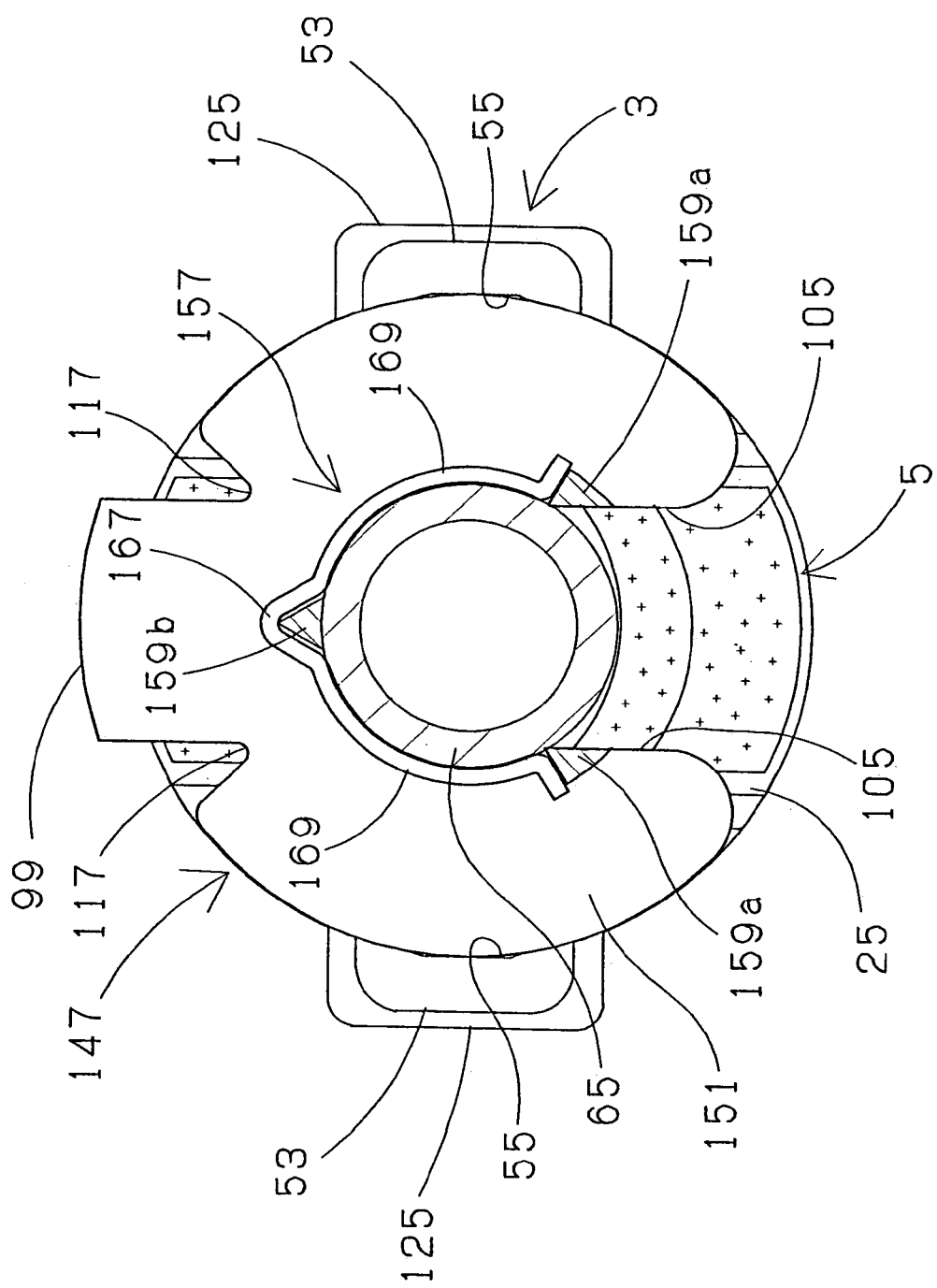
FIG. 21 is a sectional view showing connecting state of the anti-rotation fitting.

As well shown in FIGS. 14 and 16, the second quick connector 127, which is adapted in the second anti-rotation structure, has a modified configuration with respect to the connector housing 3 of the first quick connector 1. The retainer holding portion 25 of the connector housing 129 is provided with engagement protrusions 131, 131 (engageable portion) between one axial end thereof and the engagement windows 49, 49 on an outer peripheral surface thereof respectively. Each of the engagement protrusions 131, 131 includes a radially outer surface defined by a ramped outer surface 133 and a slide outer surface 135. The ramped outer surface 133 extends inclining radially outwardly from one axial end of the engagement window 49 in one axial direction, and the slide outer surface 135 extends short from one axial end of the ramped outer surface 133 in one axial direction. The engagement protrusion 131 further includes an engagement outer surface 137 extending radially inwardly from one axial end of the slide outer surface 135 and is continuous with an outer end surface 139 of one axial end of the retainer holding portion 25. The engagement outer surface 137 is coplanar with the outer end surface 139 of one axial end of the retainer holding portion 25. The radially outer surface of the engagement protrusion 131 is formed in arc expanding radially outwardly in cross-section taken perpendicular to an axis.

Figure 15:
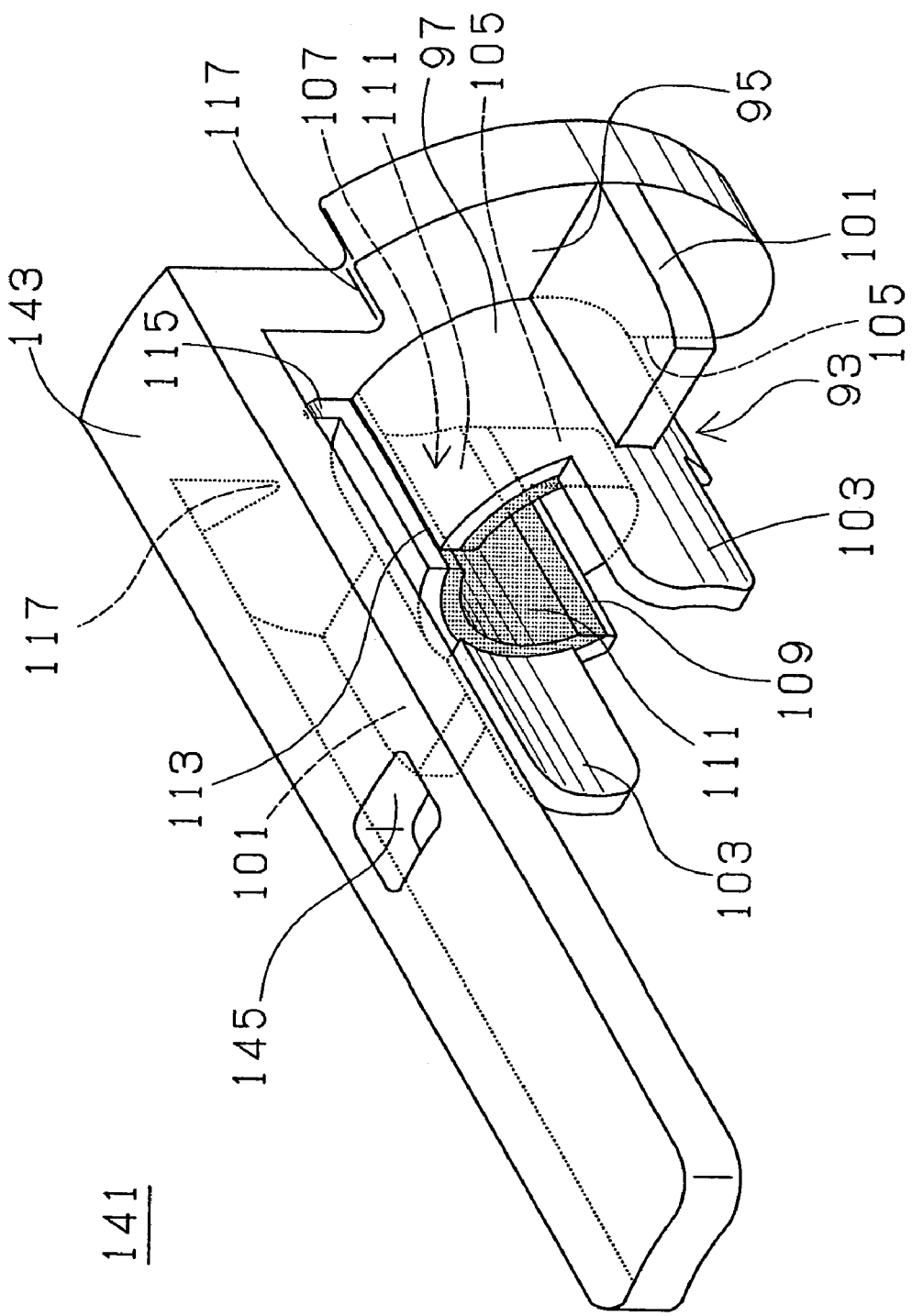
FIG. 15 is a perspective view of a second anti-rotation device for a pipe and a connector adapted in the second anti-rotation structure.

A second anti-rotation device for a pipe and a connector 141, which is adapted in the second anti-rotation structure, is configured by modifying the stop and verification arm 99 of the first anti-rotation device 91. As shown in FIG. 15, in the second anti-rotation device 141, a stop and verification arm 143 (verification means) extends long from an outer periphery of the abutment plate 95 in one axial direction, is formed with an engageable hole 145 (engagement portion for verification) bored through radially on an axial center portion thereof. An axial distance from one axial side surface of the abutment plate 95 to one axial end of the engageable hole 145 is designed generally identical to an axial distance from an opposite axial end of the connector housing 129 to the engagement outer surface 139 of the engagement protrusion 131. A radially inner surface of the stop and verification arm 143 is formed in arc recessed or concaved radially outwardly in cross-section taken perpendicular to an axis so as to correspond to a radially outer surface of the engagement protrusion 131 and an outer peripheral surface of the retainer holding portion 25.

The second anti-rotation device 141 is fitted on an assembled unit of the second quick connector 127 and the first pipe 65 in a following manner. Just like the first anti-rotation device 91, first, the abutment plate 95 and the clip portion 97 are fitted on an outer periphery of the straight tubular inserting side portion 87 of the first pipe 65. Then the second anti-rotation device 141 is slid and moved over the inserting side portion 87 of the first pipe 65 in one axial direction toward the second quick connector 127 until one axial side surface of the abutment plate 95 abuts an opposite axial end of the second quick connector 127 or the connector housing 129 so that the engagement protrusion 131 is engaged in the engageable hole 145 of the stop and verification arm 143. In process of mounting the second anti-rotation device 141, as the second anti-rotation device 141 is moved in one axial direction, one axial end of the stop and verification arm 143 contacts or abuts the ramped outer surface 133 of the engagement protrusion 131. As the second anti-rotation device 141 is moved further in one axial direction, one axial end of the stop and verification arm 143 is guided by the ramped outer surface 133 and progresses along the ramped outer surface 133, then a radially inner surface of the stop and verification arm 143 contacts the slide outer surfaces 135 or opposite axial end of the slide outer surfaces 135. And, the stop and verification arm 143 is further slid and moved over the slide outer surfaces 135 or opposite axial end thereof until the second anti-rotation device 141 is completely mounted on the assembled unit. Similarly to the stop and verification arm 99, the stop and verification arm 143 has functions as stopper and as checker to verify correct connection. However, the stop and verification arm 143 is configured so that one axial end thereof extends long beyond the engagement protrusion 131. Thereby engagement between the engageable hole 145 and the engagement protrusion 131 is easily released by moving the stop and verification arm 143 so as to lift up one axial end portion thereof radially outwardly. If the engageable hole 145 and the engagement protrusion 131 (rotation preventive engagement protrusion) are sized in width corresponding to each other, the stop and verification arm 143 defines a connector connecting portion similarly to the stop and verification arm 99. And, similarly to the first anti-rotation device 91, the second anti-rotation device 141 has functions to assist and verify the complete connection (refer to FIG. 17).

The third anti-rotation structure for a pipe and a connector according to the present invention is explained with reference to FIGS. 18 to 21. The third anti-rotation structure is configured by modifying the first anti-rotation device 91 in the first anti-rotation structure. Therefore, as to portions of configuration and functions identical to the first anti-rotation device 91, identical numeral references are almost given and explanations are almost omitted herein. As well shown in FIGS. 18, 20 and 21, the third anti-rotation device for a pipe and a connector 147 which is adapted in the third anti-rotation structure comprises a pipe connecting portion 149. The pipe connecting portion 149 includes a C-shaped abutment plate 151, a fit-on portion 153 of C-shape in cross-section which is formed integrally on the abutment plate 151 so as to project relatively short from one axial side surface thereof in one axial direction, a receiving frame 155 (spring engageable portion) and a rotation preventive fitting 157 (spring member). The receiving frame 155 is formed integrally on the abutment plate 151 so as to project relatively short from an opposite axial side surface thereof in an opposite axial direction and receives the rotation preventive fitting 157. The third anti-rotation device 147 also comprises stop and verification arm 99 with narrow width, a pair of rotation preventive plates 101, 101 of rectangular shape and a pair of abutment fingers 103, 103. The stop and verification arm 99 is formed integrally on the abutment plate 151 so as to extend somewhat long from an outer periphery of the abutment plate 151 in one axial direction. The rotation preventive plates 101, 101 are formed integrally on the fit-on portion 153 so as to extend radially outwardly from diametrically symmetrical positions on an outer peripheral surface of the fit-on portion 153 respectively. The abutment fingers 103, 103 are formed also integrally on the fit-on portion 153 so as to extend from one axial end thereof in one axial direction. The abutment plate 151 has configuration identical to the abutment plate 95 except that the abutment plate 151 does not have the narrow slot 115 and the elastic material layer 111, while the fit-on portion 153 has configuration identical to the clip portion 97 except that the fit-on portion 153 does not have the slit 113 and the elastic material layer 111. Therefore, this construction does not facilitate the fit-on portion 153 and the abutment plate 151 to be deformed so as to effectively clip and press or clamp the first pipe 65, when the rotation preventive plate 101 seats in the rotation preventive engagement recess 55 in an inner peripheral surface of the retainer holding portion 25.

The receiving frame 155 comprises three individual frame members 159 of triangle in cross-section extending relatively short from an opposite axial side surface of the abutment plate 151 in an opposite axial direction, and a C-shaped ring 161 integrally connected to the frame members 159 on an opposite axial ends thereof. Two frame members 159, 159 are disposed as abutment members 159a, 159a in opposed relation each other, with inner surfaces thereof along the portions adjacent to the fit-on recess 107 in the opening portion 105 of the abutment plate 151. On the other hand, the rest frame member 159 is disposed as fit-in member 159b with inner surface thereof along a portion of the fit-on recess 107 opposed to the opening portion 105. The C-shaped ring 161 has an inner peripheral surface shaped of about three-quarter arc with diameter generally identical to that of the fit-on recess 107, and opening portion 163 identical to the opening portion 105 of the abutment plate 151 in width.

The anti-rotation fitting 157 is configured as a spring body formed in C-shape in cross-section with length generally identical to the frame member 159. The anti-rotation fitting 157 includes a projecting part 165 formed so as to project radially outwardly in triangle shape in cross-section in a position opposed to the opening portion 167. The opening portion 167 is bent radially outwardly at each side thereof so as to correspond to abutment surfaces of the frame members 159a facing toward the frame member 159b. The anti-rotation fitting 157 further includes press-contact portions 169 between the projecting part 165 and the opening portion 167 respectively, which clip and press or clamp the first pipe 65 by press-contact with an outer peripheral surface thereof when the anti-rotation fitting 157 are fitted on the first pipe 65.

The third anti-rotation device 147 is mounted or fitted on an assembled unit of the first quick connector 1 and the first pipe 65 in a following manner as shown in FIG. 19. First, the abutment plate 151, the fit-on portion 153, and the C-shaped ring 161 or the receiving frame 155 are fitted via the opening portions 105, 109 and 163 on an outer periphery of the straight tubular inserting side portion 87 of the first pipe 65 which extends axially outwardly or in an opposite axial direction from an opposite axial end of the first quick connector 1 so that the inserting side portion 87 of the first pipe 65 is fitted in the fit-on recess 107 of the abutment plate 151, the fit-on portion 153 and the C-shaped ring 161 (refer to FIG. 19a). Although width of the opening portion 105 of the abutment plate 151 is configured slightly smaller than an outer diameter of the first pipe 65, the notch-like recesses 117, 117 formed in the abutment plate 151 assist the abutment plate 151 to relatively readily deform so as to open when the third anti-rotation device 147 is fitted to the first pipe 65. After the abutment plate 151, the fit-on portion 153 and the receiving frame 155 are fitted on an outer periphery of the inserting side portion 87 of the first pipe 65, the third anti-rotation device 147 is slid or moved over the inserting side portion 87 of the first pipe 65 in one axial direction toward the first quick connector 1 until one axial side surface of the abutment plate 151 abuts an opposite axial end of the first quick connector 1 or the connector housing 3 (refer to FIG. 19b). As the abutment plate 151, the fit-on portion 153 and the receiving frame 155 progress, the fit-on portion 153 and the abutment fingers 103, 103 are to be received or inserted in the retainer holding portion 25 of the connector housing 3 accordingly. In preparation for the fit-on portion 153 to be received, the fit-on portion 153 is adjusted relative to the retainer holding portion 25 so that the rotation preventive plates 101, 101 correspond in position to the rotation preventive engagement recesses 55, 55 formed in an inner peripheral surface of the retainer holding portion 25.

Then one axial side surface of the abutment plate 151 is abutted an opposite axial end of the connector housing 3, the hook portion 119 of the stop and verification arm 99 is engaged with an opposite axial end of the engagement window 49. In this state, the anti-rotation fitting 157 is fitted on the inserting side portion 87 of the first pipe 65 between the abutment plate 151 and the C-shaped ring 161 so that the frame member or the fit-in member 159b fits in the projecting part 165 (refer to FIG. 19b). Then the press-contact portions 169 of the anti-rotation fitting 157 clip and press or clamp the inserting side portion 87 of the first pipe 65, while the opening portion 167 of the anti-rotation fitting 157 abuts or is moved near abutment surfaces of the frame member or abutment member 159a. Therefore, the anti-rotation fitting 157 is joined to the first pipe 65 in anti-rotating relation, and engages with the receiving frame 155 also in anti-rotating relation. In this manner, the third anti-rotation device 147 permits the first quick connector 1 to connect with the first pipe 65 in co-rotatable relation with one another.

In the event of removing the third anti-rotation device 147 from the assembled unit, first, the anti-rotation fitting 157 is pulled out of the first pipe 65 and the receiving frame 155, engagement between the hook portion 119 of the stop and verification arm 99 and the engagement window 49 is released, and then the third anti-rotation device 147 is pulled out of the retainer holding portion 25 of the connector housing 3. The third anti-rotation device 147 which is removed can be again fitted on the assembled unit of the first quick connector 1 and the first pipe 65. The third anti-rotation device 147 has functions to assist and verify complete connection like the first anti-rotation device 91 except not to exert relatively large fastening force on the first pipe 65.

A fourth anti-rotation structure for a pipe and a connector according to the present invention is explained with reference to FIGS. 22 and 23. The fourth anti-rotation structure is configured by modifying the first quick connector 1 and the third anti-rotation device 147 in the third anti-rotation structure. Therefore, as to portions of configuration and functions identical to the first quick connector 1 and the third anti-rotation device 147, identical numeral references are almost given and explanations are almost omitted herein.

Figure 22:
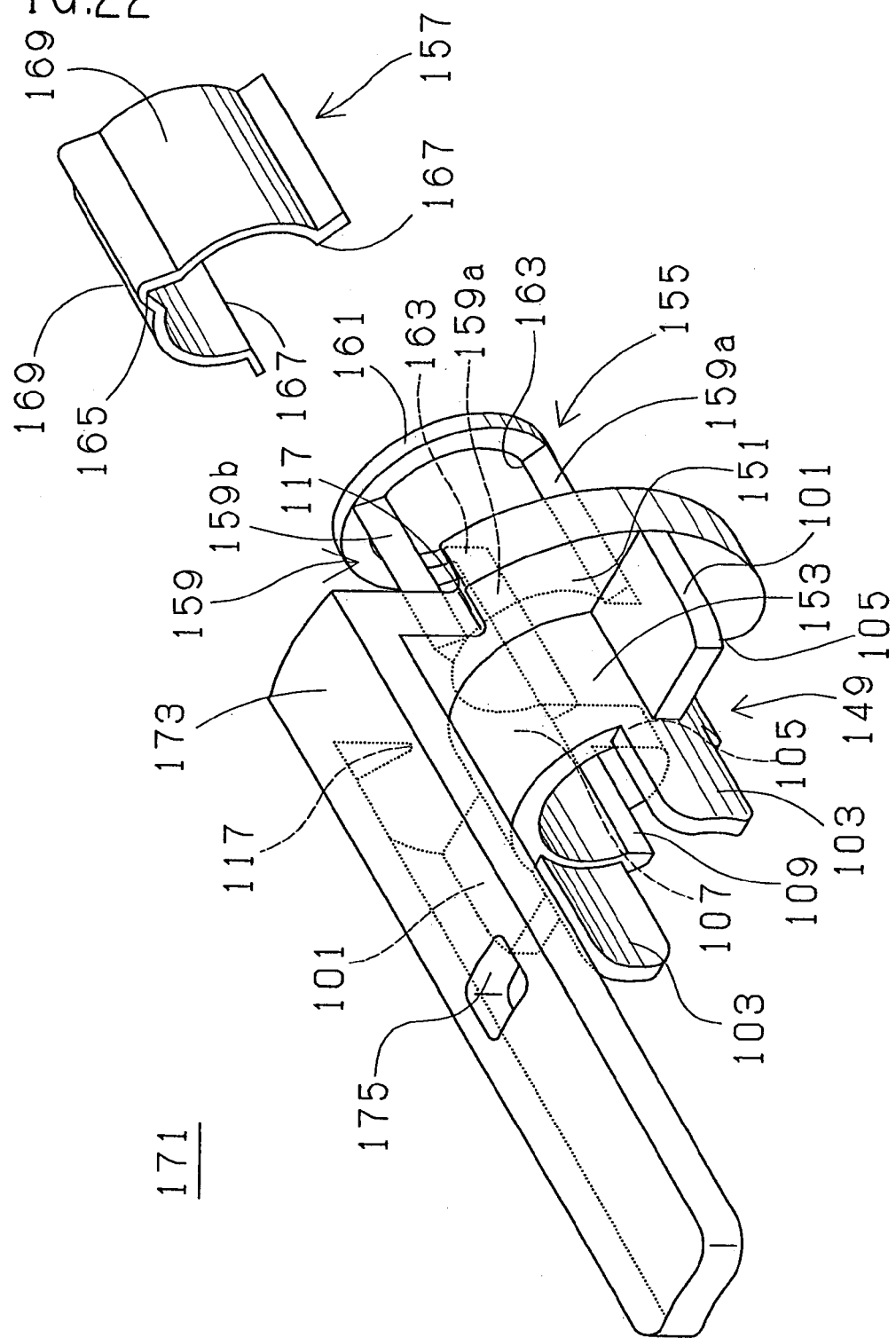
FIG. 22 is a perspective view of a fourth anti-rotation device for a pipe and a connector adapted in a fourth anti-rotation structure for a pipe and a connector according to the present invention.
Figure 23:
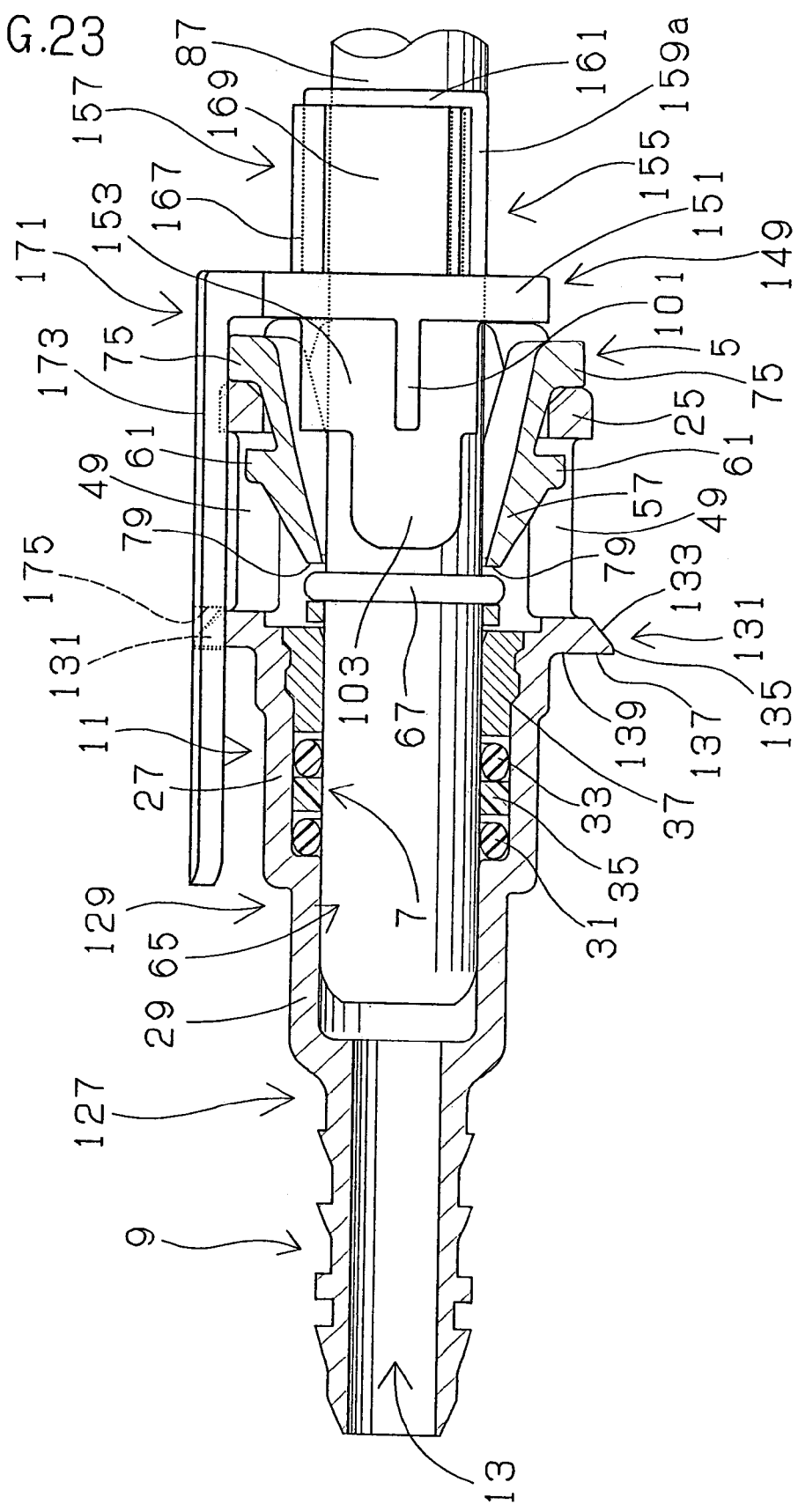
FIG. 23 is a sectional view of the fourth anti-rotation structure.

As shown in FIGS. 22 and 23, a fourth anti-rotation device for a pipe and a connector 171, which is adapted for the fourth anti-rotation structure, is configured by modifying the stop and verification arm 99 of the third anti-rotation device 147. The fourth anti-rotation device 171 comprises a stop and verification arm 173 extending relatively long in one axial direction from an outer periphery of the abutment plate 151 and having an engageable hole 175 bored through radially on an axial center portion thereof. An axial distance from one axial side surface of the abutment plate 151 to one axial end of the engageable hole 175 is designed generally identical to an axial distance from an opposite axial end of the connector housing 129 to the engagement outer surface 137 of the engagement protrusion 131. A radially inner surface of the stop and verification arm 173 is formed in arc recessed or concaved radially outwardly in cross-section taken perpendicular to an axis so as to correspond to a radially outer surface of the engagement protrusion 131 and an outer peripheral surface of the retainer holding portion 25. If the engageable hole 175 and the engagement protrusion 131 are sized in width corresponding to each other, the stop and verification arm 173 defines a connector connecting portion similarly to the stop and verification arm 99.

The fourth anti-rotation device 171 is fitted on an assembled unit of the second quick connector 127 and the first pipe 65 in a following manner. Just like the third anti-rotation device 147, the abutment plate 151 and the fit-on portion 153, and the C-shaped ring 161 or the receiving frame 155 are fitted on an outer periphery of the straight tubular inserting side portion 87 of the first pipe 65, then, the fourth anti-rotation device 171 is slid and moved over the inserting side portion 87 of the first pipe 65 in one axial direction toward the second quick connector 127 until one axial side surface of the abutment plate 151 abuts an opposite axial end of the second quick connector 127 or the connector housing 129 so that the engagement protrusion 131 is engaged in the engageable hole 175 of the stop and verification arm 173. Similarly to the stop and verification arm 99, the stop and verification arm 173 has functions to prevent escape of a pipe and verify the complete connection. However, as the stop and verification arm 173 is configured so that one axial end thereof extends long beyond the engagement protrusion 131, engagement between the engageable hole 175 and the engagement protrusion 131 is easily released by moving the stop and verification arm 173 so as to lift up one axial end portion thereof radially outwardly. And, similarly to the third anti-rotation device 147, the fourth anti-rotation device 171 has functions to assist and verify the complete connection.

Figure 24:
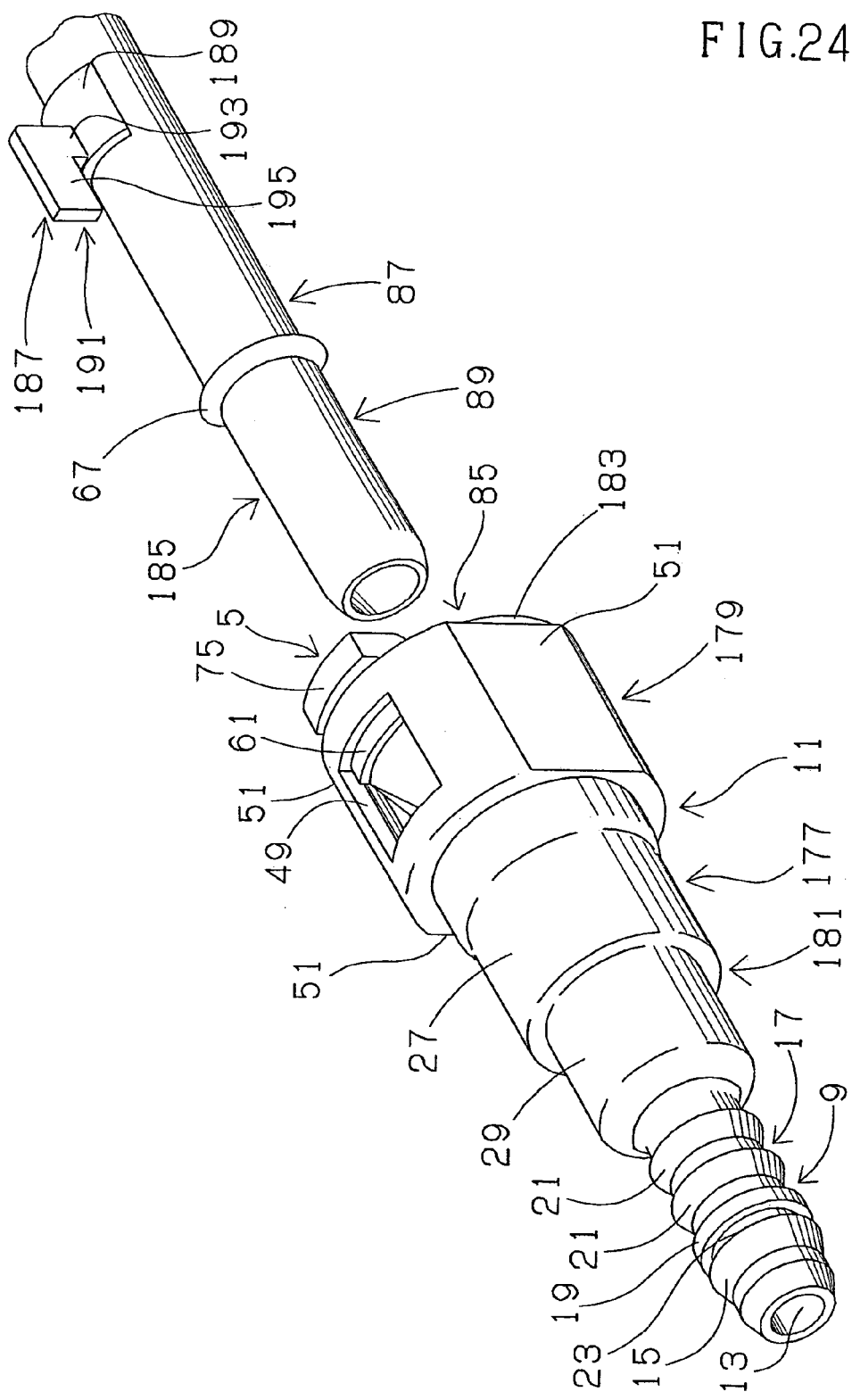
FIG. 24 is a perspective view of a third quick connector and a second pipe adapted in a fifth anti-rotation structure for a pipe and a connector according to the present invention.

A fifth anti-rotation structure for a pipe and a connector according to the present invention is explained with reference to FIGS. 24 to 30. A third quick connector 177 which is adapted in the fifth anti-rotation structure is configured by modifying the connector housing 3 of the first quick connector 1. Therefore, as to portions of configuration and functions identical to the first quick connector 1, identical numeral references are almost given and explanations are almost omitted herein. As shown in FIG. 24, a retainer holding portion 179 of a connector housing 181 is provided with flat regions 51, 51 on an outer peripheral surface thereof just like the first quick connector 1. However, in the third quick connector 177, the flat region 51 is formed in a flat surface without the raised portion 53 and any other raised or recessed portions such as the elongate rib 125. And the retainer holding portion 179 of the connector housing 181 is not provided with the receiving recessed portions 81, 81 on an opposite axial end thereof but with swelled portions 183, 183 on an opposite axial flat end or an opposite axial flat end surface thereof in diametrically symmetrical positions, in order to prevent incorrect fitting of the retainer 5. That is, the retainer 5 is fitted in the retainer holding portion 179 so that the latching ends 75, 75 are located between the swelled portions 183, 183. As the rotation preventive engagement recess 55 is not provided in the retainer holding portion 179, the retainer 5 is not provided with the engagement rib 77 correspondingly.

A second pipe 185 which is adapted in the fifth anti-rotation structure is configured by fixedly mounting a anti-rotation metal stay 187 on an outer peripheral surface of the inserting side portion 87 of the first pipe 65, for example, by welding. The metal stay 187 is mounted on the other axial end from the annular engagement projection 67. As well shown in FIG. 24, the metal stay 187 comprises a mounting piece 189 shaped of square and a lug 191. The mounting piece 189 is curved at curvature widthwise or circumferentially identical to that of an outer peripheral surface of the inserting side portion 87, and is fixed on the outer peripheral surface of the inserting side portion 87 of the second pipe 185. The lug 191 is thin widthwise, and is welded on the mounting piece 189 at a front side or one axial end and widthwise center of the mounting piece 189, so as to project radially outwardly from an outer peripheral surface thereof. The lug 191 includes a foot portion 193 standing at the mounting piece 189 and an anti-rotation engaging piece portion 195 formed integrally on the foot portion 193 on a radial outer end thereof. One axial end portion of the anti-rotation engagement piece portion 195 extends in one axial direction beyond the foot portion 193 and the mounting piece 189, and thereby the lug 191 is formed in L-shape. As well shown in FIG. 26, the metal stay 187 is arranged to be located on the other axial end from the connector housing 181 or the retainer holding portion 179 when the second pipe 185 is fully inserted.

For a fifth anti-rotation device for a pipe and a connector 197 which is adapted in a fifth anti-rotation structure, thermoplastic resin is widely used. If heat resistant property is required, polyamide type resin such as PA11, PA12 PA66 or the like or nylon is adapted. Polypropylene type resin such as PP or the like or polyester type resin may be adapted to achieve cost reduction.

Figure 25:
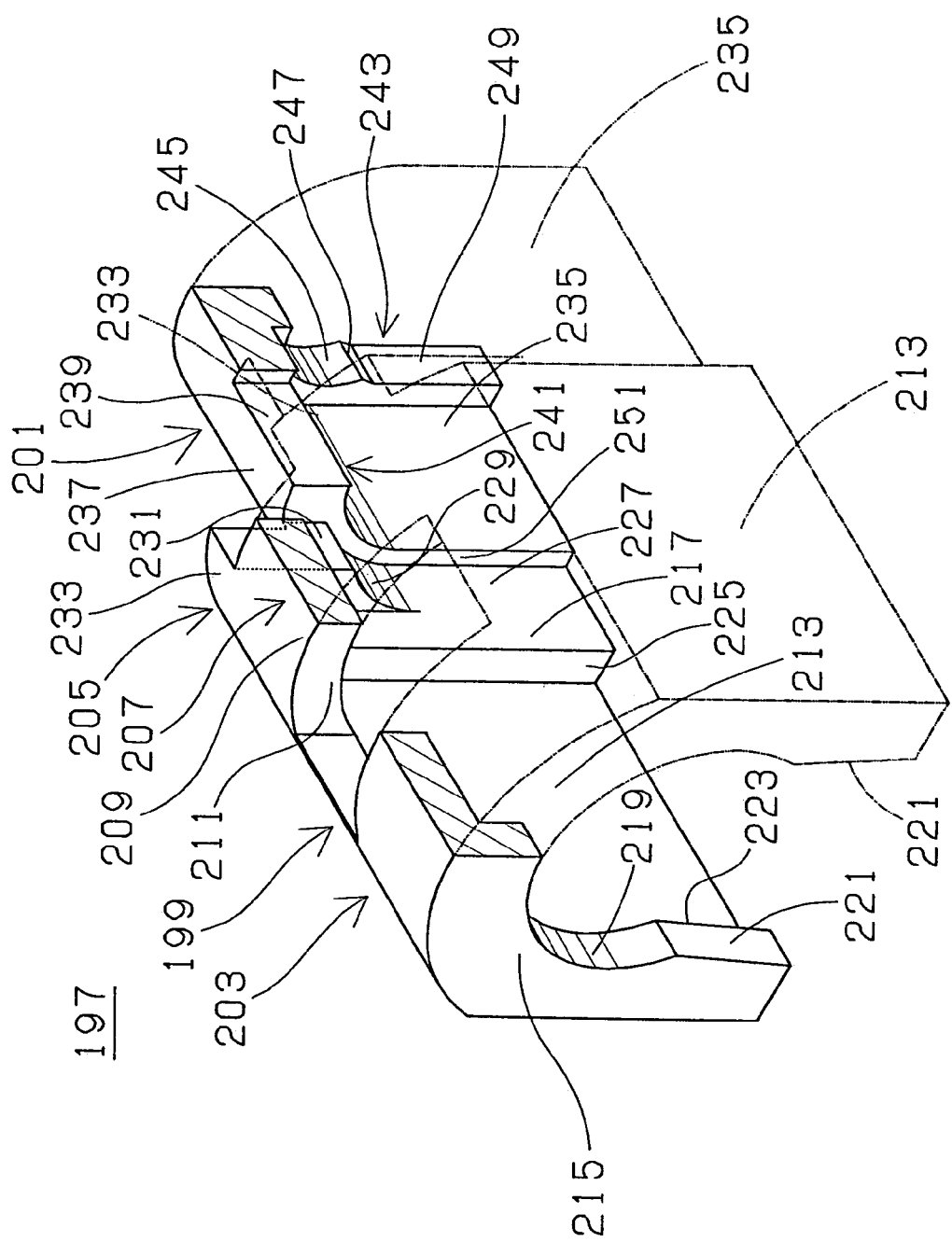
FIG. 25 is a perspective view of a fifth anti-rotation device for a pipe and a connector adapted in the fifth anti-rotation structure.
Figure 26:
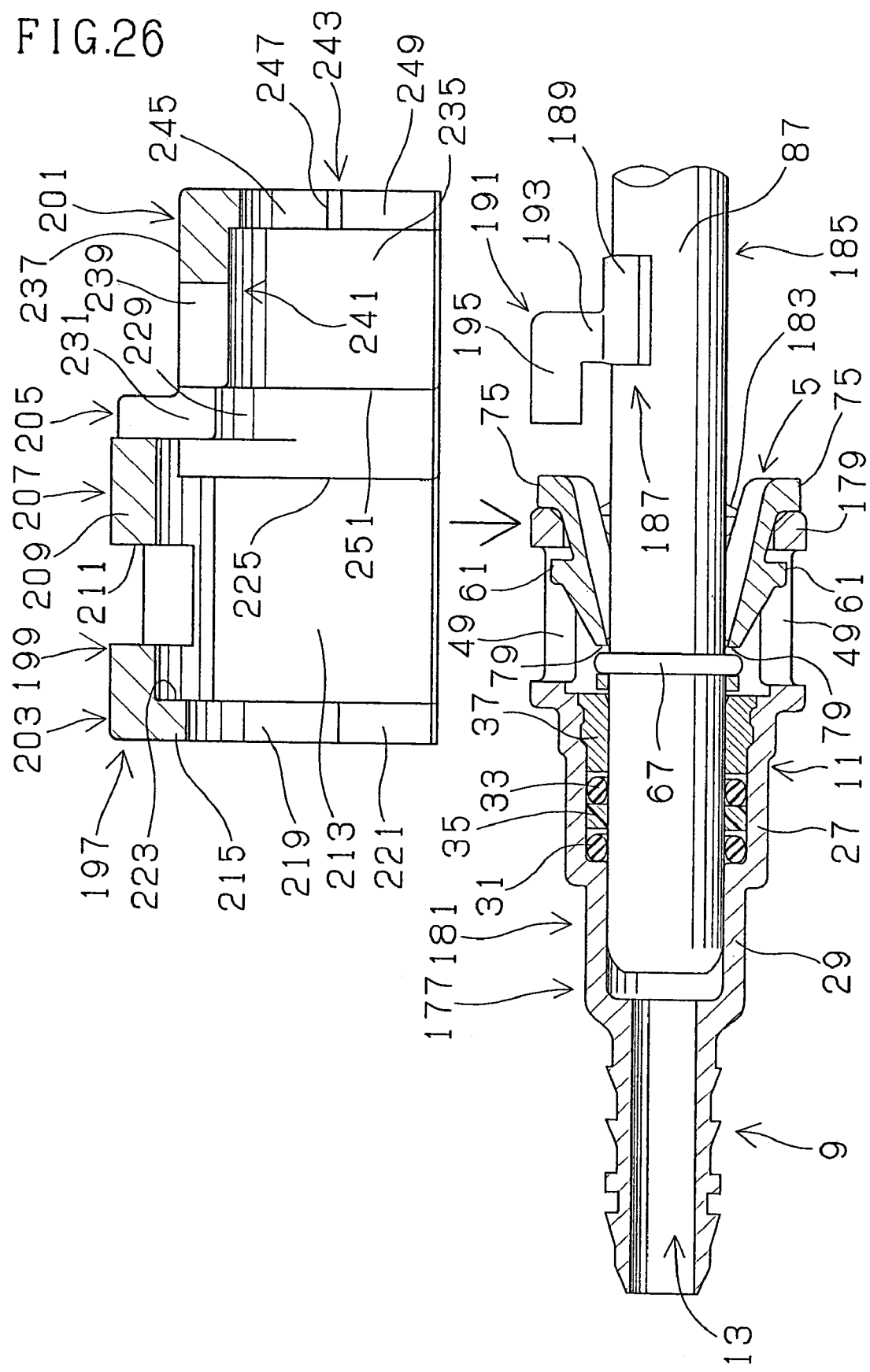
FIG. 26 is a view showing that the fifth anti-rotation device is mounted on an assembled unit of the third quick connector and the second pipe.

As well shown in FIGS. 25 and 26, the fifth anti-rotation device 197 to be adapted for an assembled unit of the third quick connector 177 and the second pipe 185 is constructed overall in a cap or clip form of U-shape in cross-section so as to be fitted on the connector housing 181 and the second pipe 185 via an opening or a U-shape opening extending longitudinally or axially of the connector housing 181 and the second pipe 185. The fifth anti-rotation device 197 is formed integrally with a cap body 199 (connector cap portion) of U-shape in cross-section on one axial end, and an anti-rotation cap portion 201 (pipe cap portion) also of U-shape in cross-section on the other axial end thereof. The cap body 199 is intended to receive from the retainer holding portion 179 of the connector housing 181 or a stepped end surface of the retainer holding portion 179 on a side of the seal holding portion 27 to the latching end 75 of the retainer 5. The anti-rotation cap portion 201 is intended to fit on and receive a portion around the metal stay 187 of the second pipe 185.

As well shown in FIG. 25, the cap body 199 comprises a connector receiving portion 203 for receiving the retainer holding portion 179 and a junction part 205 connected integrally to an opposite axial end of the connector receiving portion 203. On the other hand, the anti-rotation cap portion 201 is connected integrally to an opposite axial end of the junction part 205.

As well shown in FIG. 25, the connector receiving portion 203 comprises a receiving body 207 including an arcuate wall 209 curved at an angle somewhat smaller than 180 degrees and formed with a drain opening 211 on a mid portion thereof and a pair of flat body side walls 213, 213 connected integrally to the arcuate wall 211 on widthwise opposite ends thereof. The connector receiving portion 203 also comprises an inwardly directed extending portion 215 and a pair of inwardly raised portions 217, 217 (only one inwardly raised portion is shown). The inwardly directed extending portion 215 is formed of U-shape and integrally on the receiving body 207 at one axial end thereof so as to extend slightly inwardly. The inwardly raised portions 217, 217 are formed integrally on the flat body side walls 213, 213 at opposite axial end portions thereof so as to be raised slightly inwardly and extend along opposite axial ends of the flat body side walls 213, 213 respectively. The arcuate wall 209 is formed to have an inner surface corresponding to an outer surface of the arcuate circumferential wall portion of the retainer holding portion 179. A pair of the flat body side walls 213, 213 is arranged parallel to each other and with a space generally equal to that between a pair of the flat regions 51, 51 of the retainer holding portion 179. A U-shaped inner edge of the inwardly directed extending portion 215 defines an arcuate fit-on portion 219 and a lead-in portion 221. The arcuate fit-on portion 219 is formed in an arc of a little more than 180 degrees, with an inner diameter equal to or generally equal to an outer diameter of the cylindrical seal holding portion 27 of the connector housing 181, and open on a U-shape opening side. The lead-in portion 221 is extending so as to be widened gradually from opening ends of the fit-on portion 219 to ends of the U-shape opening. Each of the inwardly raised portions 217, 217 is designed to be raised at height generally equal to or slightly larger than a wall thickness of the retainer holding portion 179 of the connector housing 181. A distance between a pair of the inwardly raised portions 217, 217 is designed slightly larger than a width of the latching end 75 of the retainer 5.

Referring to FIG. 26, a distance between an opposite axial side surface 223 of the inwardly directed extending portion 215 and one axial end surface 225 of the inwardly raised portion 217 is designed equal to or generally equal to an axial length of the retainer holding portion 179 of the connector housing 181, including the swelled portions 183, 183. The connector receiving portion 203 defines a connector receptacle portion of U-shape in cross-section to embrace and receive the retainer holding portion 179 from both axial ends thereof between the opposite axial side surface 223 of the inwardly directed extending portion 215 and one axial end surfaces 225, 225 of the inwardly raised portions 217, 217. The connector receiving portion 203 also defines a retainer receptacle portion of U-shape or U-shape in cross-section to receive the latching end 75 of the retainer 5 between a pair of the inwardly raised portions 217, 217.

Referring to FIG. 25, the junction part 205 comprises a pair of side wall portions 227, 227 (only one side wall portion is shown) and a pair of arcuate portions 229, 229 (only one arcuate portion is shown) connected integrally to respective side wall portion 227 on ends opposite thereof to U-shape opening and extending circumferentially slightly, and thereby the junction part 205 has internally a projection receptacle portion of U-shape cut at top or U-shape cut at top in cross-section. The side wall portions 227, 227 are connected integrally to the opposite axial side surfaces or ends of respective inwardly raised portions 217, 217, and is extending slightly in an opposite axial direction, and have inner surfaces co-planer with inner surfaces of the inwardly raised portions 217, 217. Each of the arcuate portions 229, 229 is formed coaxially with the arcuate wall 209. A distance between a pair of side wall portions 227, 227 is designed generally equal to an outer diameter of the annular engagement projection 67, an inner surface or a curved inner surface of the arcuate portion 229 is formed with radius identical to or generally identical to outer diameter or radius of the annular engagement projection 67. A drain hole 231 is defined between tip end portions of a pair of the arcuate portions 229, 229. That is, the projection receptacle portion is formed to receive the annular engagement projection 67 of the second pipe 185. Outer surfaces of the arcuate portions 229, 229 are formed integrally with ledge like portions 233, 233 which close up a gap defined between the arcuate portions 229, 229 and an opposite axial end of the arcuate wall 209. A distance between tip end portions of a pair of the arcuate portions 229, 229 and a pair of the ledge like portions 233, 233 is designed smaller than a width of the latching end 75 of the retainer 5.

As shown in FIG. 25, the anti-rotation cap portion 201 integrally comprises a pair of cap side walls 235, 235 and an arcuate wall portion 237. A pair of the cap side walls 235, 235 is connected integrally to an opposite axial end of each of the side wall portions 227, 227 in the junction part 205. The arcuate wall portion 237 is connected integrally to ends of the cap side walls 235, 235 opposite to the U-shape opening thereof so as to extend or bridge therebetween, coaxially with the arcuate wall 209 and the arcuate portion 229. The anti-rotation cap portion 201 has a receiving hollow of U-shape in cross-section defined to receive the inserting side portion 87 of the second pipe 185 projecting and extending from the retainer holding portion 179 or the latching end 75 of the retainer 5 in an opposite axial direction. The arcuate wall portion 237 is formed with a cutout 239 for anti-rotation purpose extending from one axial end facing the drain hole 231 to axially mid portion thereof. The cutout 239 is designed in length slightly shorter than the anti-rotation engagement piece portion 195 of the metal stay 187, and in width generally equal to a thickness of the foot portion 193 and the anti-rotation engagement piece portion 195.

A width of the receiving hollow or a distance between a pair of the cap side walls 235, 235 is designed generally equal to or slightly or somewhat larger than an outer diameter of the other axial end from the annular engagement projection 67 of the second pipe 185 or a main body thereof. The arcuate wall portion 237 includes an inner surface curved so as to have an inner diameter slightly larger than an outer diameter of the main body of the second pipe 185 or an inserting side portion 87 to define a fit-on position 241 of the receiving hollow. The receiving hollow or an inner surface of the anti-rotation cap portion 201 is formed integrally with a raised strip portion 243 of U-shape rising slightly inwardly on an opposite axial end portion thereof. An inner surface of the raised strip portion 243 of U-shape defines an embracing portion 245 of semicircle shape with opening side U-shape opening, a pair of snap ridges 247, 247 continuous with ends of an opening of the embracing portion 245 and a lead-in portion 249 extending from the snap ridges 247, 247 to ends of the U-shape opening generally at constant width. An inner diameter of the embracing portion 245 is designed equal or generally equal to an outer diameter of the main body of the second pipe 185.

The receiving hollow of the anti-rotation cap portion 201 is formed on an inner side from an inner surface of the junction part 205. Therefore, on one axial end of the anti-rotation cap portion 201, a U-shaped end surface 251 is defined so as to extend more inwardly than an inner surface of the junction part 205. And, an axial length of the anti-rotation cap portion 201 or the cap side wall 235 is designed equal to that between an inserting end of the second pipe 185 and an opposite axial end of the O-ring 33 located on the other axial end during complete connection.

Figure 27:
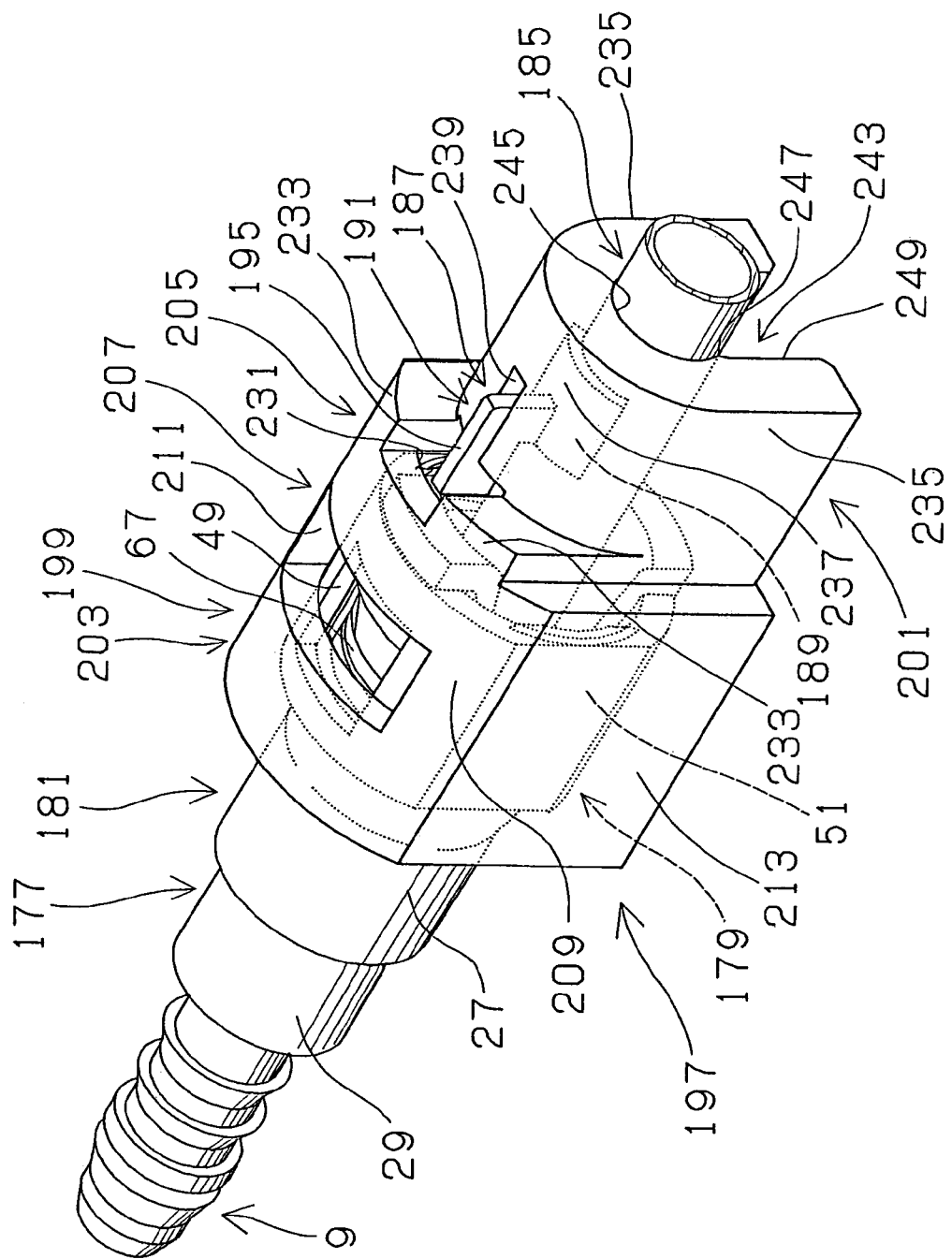
FIG. 27 is a perspective view of the fifth anti-rotation structure.
Figure 28:
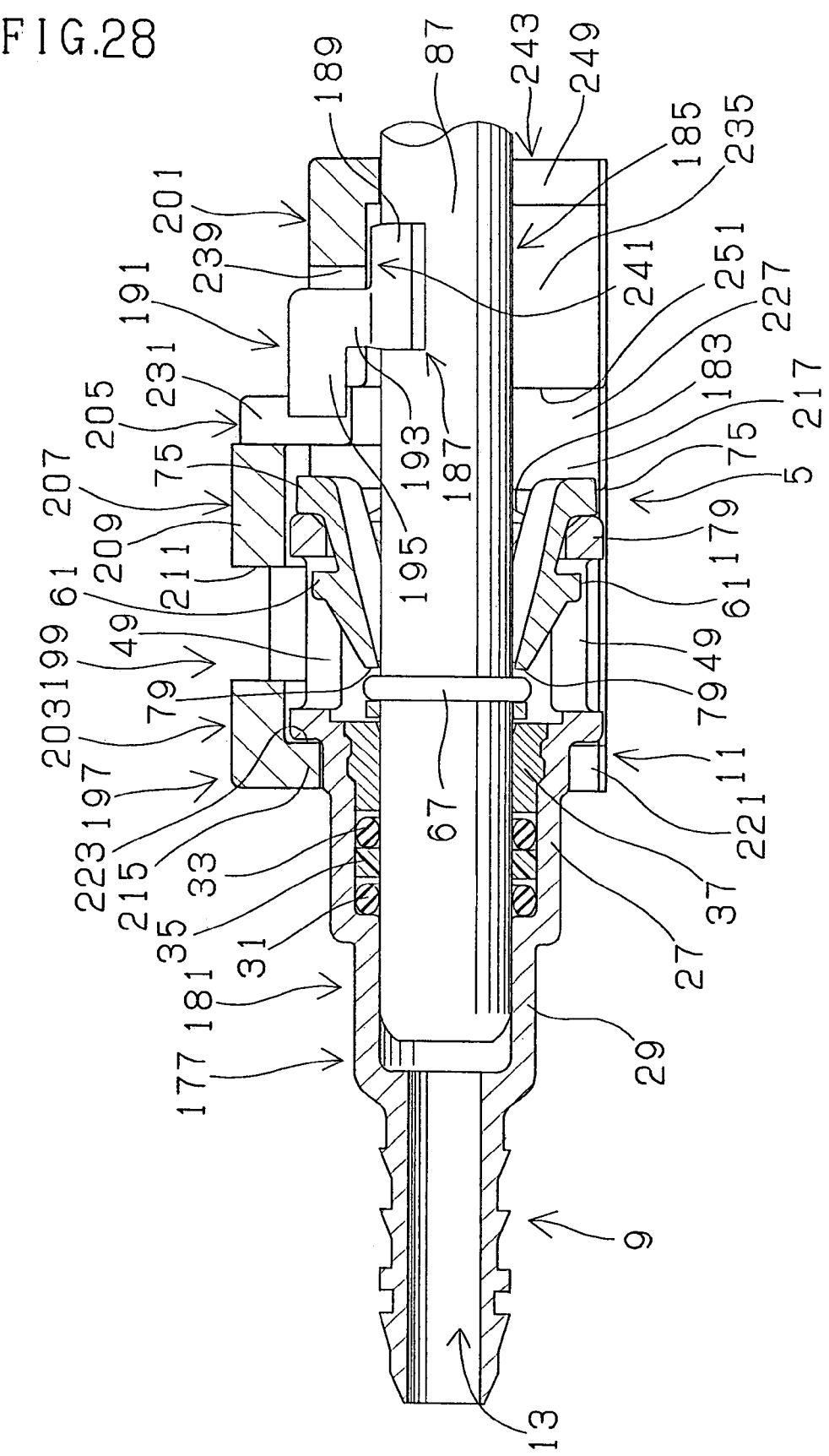
FIG. 28 is a sectional view of the fifth anti-rotation structure.

As well shown in FIGS. 26 to 28, the fifth anti-rotation device 197 is mounted on the third quick connector 177 and the second pipe 185 so as to locate a pair of the flat body side walls 213, 213 of the connector receiving portion 203 to correspond to the flat regions 51, 51 of the retainer holding portion 179 and the anti-rotation engagement piece portion 195 of the metal stay 187 to correspond to the cutout 239. Here, a portion of the seal holding portion 27, adjacent to the retainer holding portion 179, passes and moves through the lead-in portion 221 of the inwardly directed extending portion 215 and snap-fits in the fit-on portion 219. The retainer holding portion 179 is received in the connector receptacle portion of the connector receiving portion 203, and the latching end 75 of the retainer 5 is received in the retainer receptacle portion of the connector receiving portion 203. The inserting side portion 87 of the second pipe 185 passes and moves through between a pair of side wall portions 227, 227 of the junction part 205 and fits generally in the arcuate portion 229. The inserting side portion 87 also passes and moves through a pair of the cap side walls 235, 235 of the anti-rotation cap portion 201 and fits in the fit-on position 241. In the receiving hollow of the anti-rotation cap portion 201, the inserting side portion 87 of the second pipe 185 passes or moves through the lead-in portion 249 of the raised strip portion 243 and snap-fits in the fit-on portion 245 on an opposite axial end portion thereof. That is, the fifth anti-rotation device 197 is snap-fitted on the third quick connector 177 and the second pipe 185 so as to clip the third quick connector 177 and the second pipe 185 radially.

The foot portion 193 and the anti-rotation engagement piece portion 195 of the metal stay 187 enter the cutout for anti-rotation purpose 239. In this state, one axial end of the anti-rotation engagement piece portion 195 projects somewhat toward one axial direction from the cutout 239. By mounting of the fifth anti-rotation device 197, the metal stay 189 of the second pipe 185 is not allowed by a terminal end of the cutout 239 to move toward the other axial end. Thereby it is surely prevented that the second pipe 185 escapes from the third quick connector 177. In addition, as the flat regions 51, 51 of the retainer holding portion 179 are clipped by a pair of the flat body side walls 213, 213 of the connector receiving portion 203, the cap body 199 is connected to the third quick connector 177 in anti-rotating relation. And, as the anti-rotation engagement piece portion 195 of the metal stay 187 circumferentially engages with the cutout 239, the anti-rotation cap portion 201 is connected to the second pipe 185 also in anti-rotating relation. Therefore, the third quick connector 177 is connected to the second pipe 185 in co-rotatable relation by way of the fifth connector anti-rotating device 197.

Figure 29:
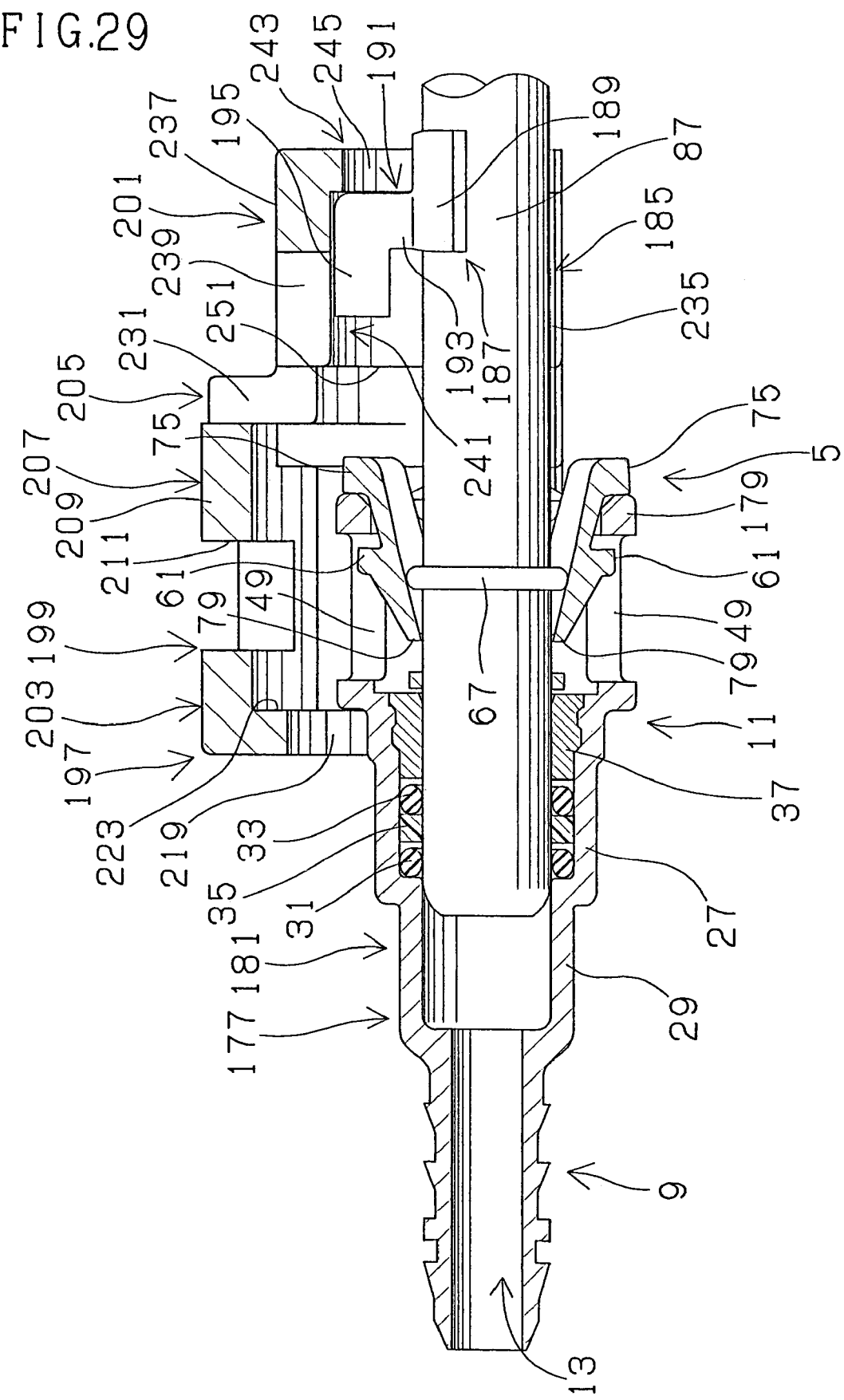
FIG. 29 is a view showing the fifth anti-rotation device is mounted when the third quick connector and the second pipe are in half-fitting relation.

As shown in FIG. 29, if the second pipe 185 is not sufficiently inserted in the third quick connector 177 or the retainer 5 and the annular engagement projection 67 does not engage in the engagement slit 79 of the retainer 5, the metal stay 187 is located further apart toward an opposite axial direction from an opposite axial end of the connector housing 181 or the retainer holding portion 179 compared to the case that the second pipe 185 is correctly connected to the third quick connector 177. Therefore, when the fifth anti-rotation device 197 is tried to be mounted on the third quick connector 177 and the second pipe 185 so that the retainer holding portion 179 is received in the connector receptacle portion of the connector receiving portion 203, the metal stay 187 or anti-rotation engagement piece portion 195 of the second pipe 185 is not located so as to seat in the cutout 239 but on the other axial end beyond the cutout 239. Then the anti-rotation engagement piece portion 195 of the metal stay 187 contacts with or abuts the arcuate wall portion 237 or the raised strip portion 243 of the anti-rotation cap portion 201, the fifth anti-rotation device 197 cannot be fitted on the third quick connector 177 and the second pipe 185 or the anti-rotation cap portion 201 cannot be fitted on the second pipe 185.

Figure 30:
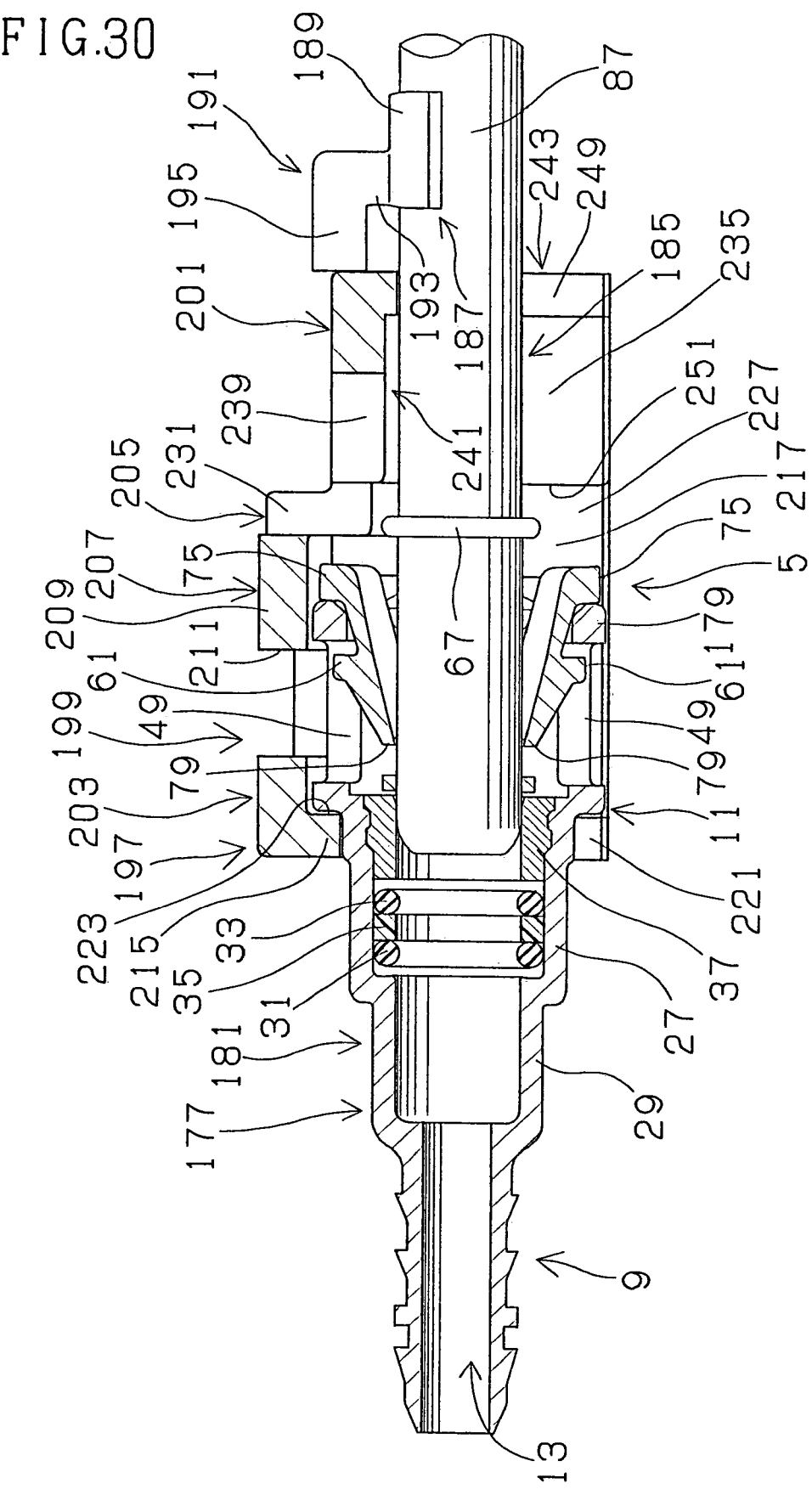
FIG. 30 is a view showing the fifth anti-rotation device is mounted when the third quick connector and the second pipe are in another half-fitting relation.

If the second pipe 185 is not at all sufficiently inserted in the third quick connector 177 or the retainer 5, and the metal stay 187 of the second pipe 185 is located far apart from an opposite axial end of the connector housing 181 or the retainer holding portion 179 toward an opposite axial direction, as an axial length of the anti-rotation cap portion 201 of the fifth anti-rotation device 197 is designed shorter than an axial distance between the annular engagement projection 67 of the second pipe 185 and the anti-rotation engagement piece portion 195 of the metal stay 187, as shown in FIG. 30, the fifth anti-rotation device 197 happens to be mounted on the third quick connector 177 and the second pipe 185. Here, the retainer holding portion 179 is received in the connector receptacle portion of the connector receiving portion 203, the annular engagement projection 67 of the second pipe 185 is received, for example, in the junction part 205, the anti-rotation engagement piece portion 195 of the metal stay 187 of the second pipe 185 is located on the other axial end from the anti-rotation cap portion 201, and a portion of the second pipe 185 between the annular engagement projection 67 and the metal stay 187, namely the inserting side portion 87 is received in the receiving hollow of the anti-rotation cap portion 201, namely in the fit-on position 241. However, if such case happens, as an axial length of the anti-rotation cap portion 201 is designed equal to an axial distance between an inserting end of the second pipe 185 and an opposite axial end of the O-ring 33 on the other axial end during complete connection, the metal stay 187 is located much toward opposite axial direction by a length longer than an axial distance between an inserting end of the second pipe 185 completely inserted and an opposite axial end of the O-ring 33 of the other axial end, compared to when the connection is completed. That is, an inserting end of the second pipe 185 is located rearwardly away from the O-ring 33 of the other axial end toward an opposite axial direction, and thereby no seal is provided between the connector housing 181 and the second pipe 185. In this state, if a test fluid is flowed in the second pipe 185, the test fluid leaks out between the second pipe 185 and the third quick connector 177, and thereby it is verified that the second pipe 185 is insufficiently or incompletely fitted in the third quick connector 177. If the fifth anti-rotation device 197 is fitted on the third quick connector 177 and the second pipe 185 with a U-shape opening upward, as a test fluid is discharged through the drain holes 211, 231, it can be easily verified that the second pipe 185 is incompletely mounted in or connected to the third quick connector 177.

Figure 31:
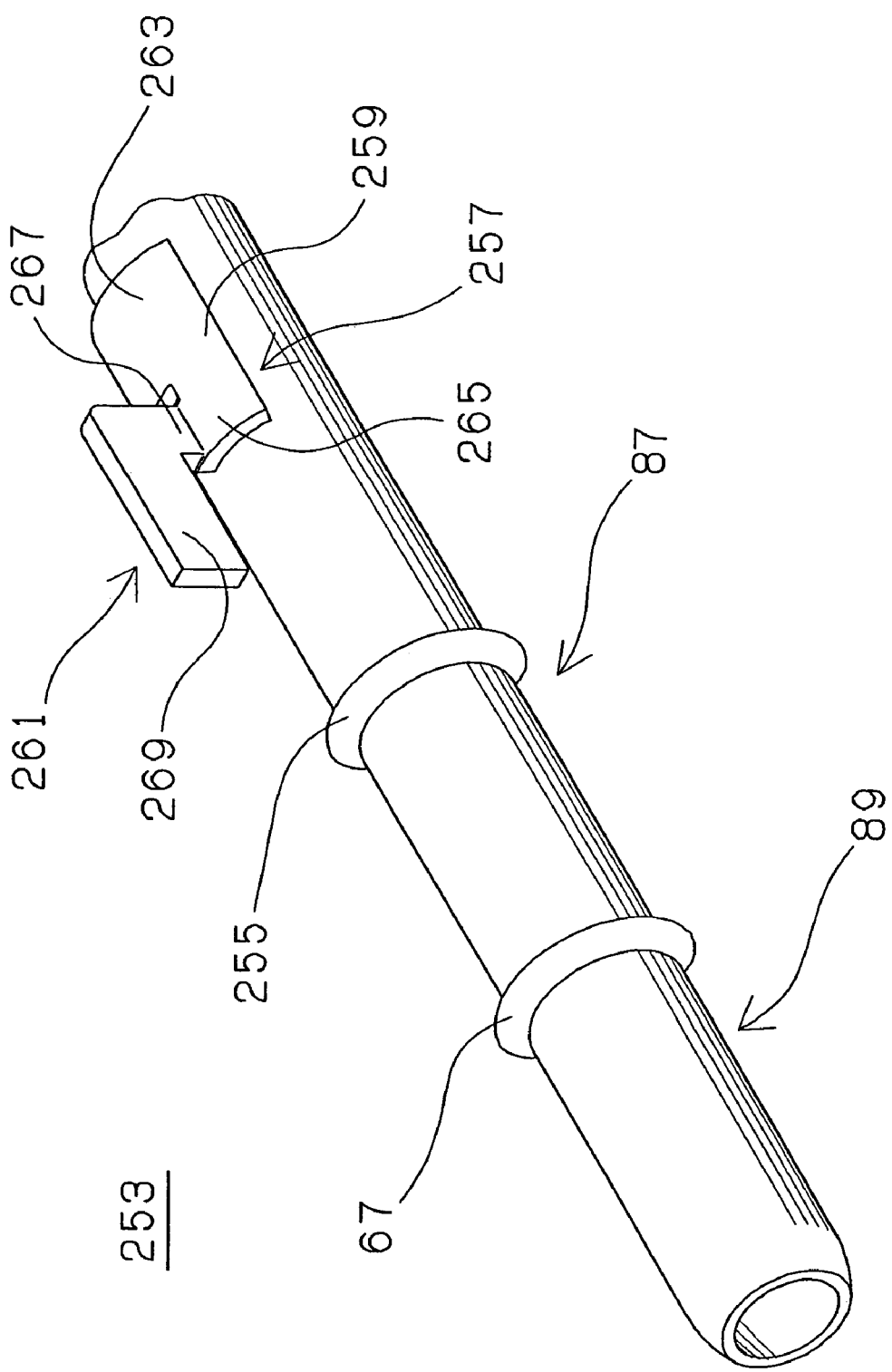
FIG. 31 is a perspective view of a third pipe adapted in a sixth anti-rotation structure for a pipe and a connector according to the present invention.
Figure 32:
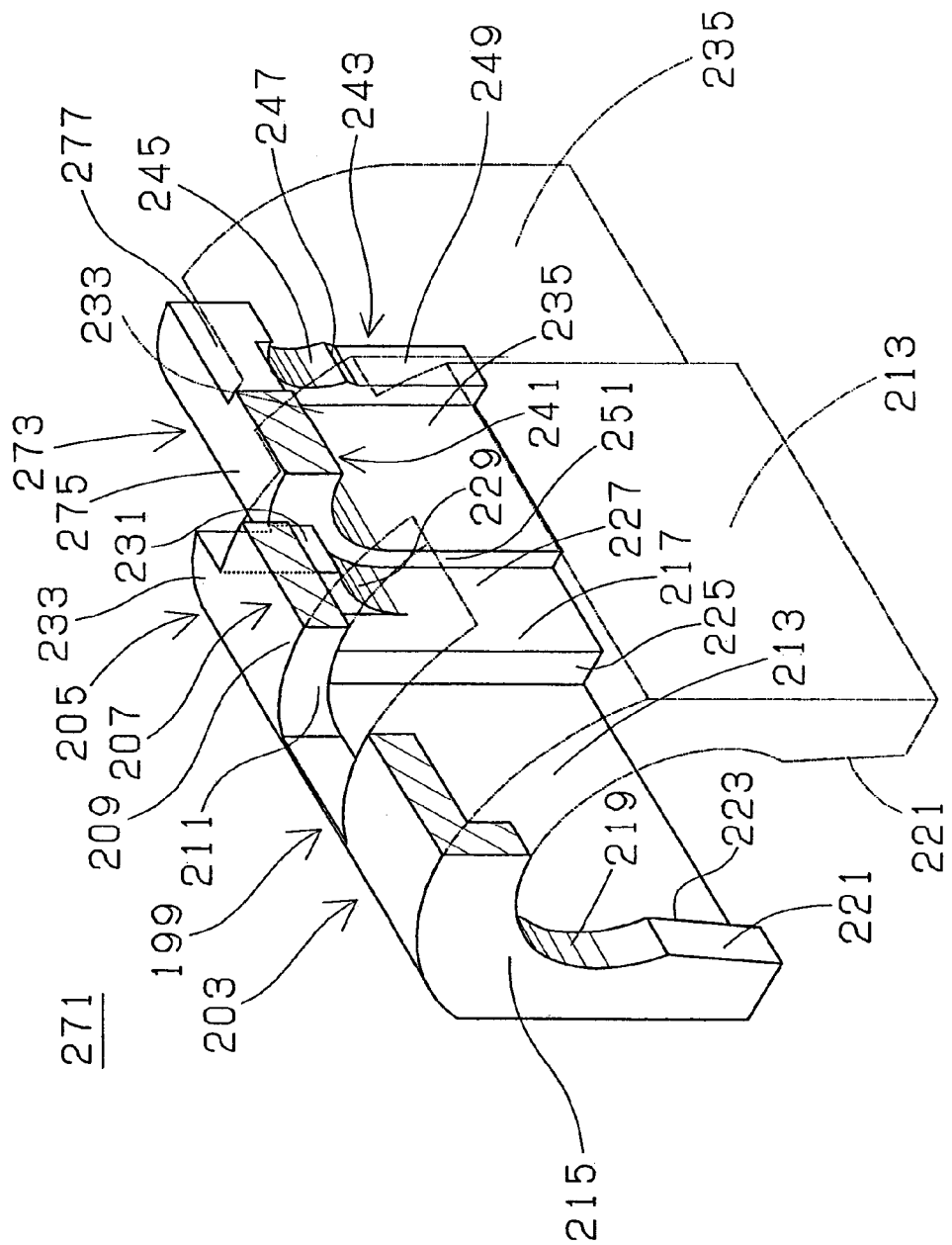
FIG. 32 is a perspective view of a sixth anti-rotation device for a pipe and a connector adapted in the sixth anti-rotation structure.

A sixth anti-rotation structure for a pipe and a connector according to the present invention is explained with reference to FIGS. 31 to 35. A third pipe 253 which is adapted in the sixth anti-rotation structure is configured by modifying the second pipe 185. The third pipe 253 is formed such that an annular verification projection 255 identical to the annular engagement projection 67 in shape is provided on the other axial end from the annular engagement projection 67 on an outer peripheral surface of the second pipe 185, and the anti-rotation metal stay 187 is replaced with another anti-rotation metal stay 257. The annular verification projection 255 and the metal stay 257 are arranged to be located on the other axial end from the connector housing 181 or the retainer holding portion 179. As shown in FIG. 31, the anti-rotation metal stay 257 comprises a mounting piece 259 and a lug 261. The mounting piece 259 is curved at curvature widthwise or circumferentially identical to an outer peripheral surface of the inserting side portion 87, and is fixed on the outer peripheral surface of the inserting side portion 87 of the third pipe 253, for example, by welding. The lug 261 is thin widthwise, formed integrally on the mounting piece 259 so as to project radially outwardly from an outer peripheral surface of the inserting side portion 87. The mounting piece 259 has a body portion 263 of square or rectangular shape on rear or the other axial end, and a support portion 265 generally of square shape, formed integrally on a front or one axial end of the body portion 263 on one widthwise side thereof. The lug 261 is formed by folding and lifting up an opposite widthwise side of the support portion 265. The lug 261 includes a foot portion 267 standing at the mounting piece 259 and an anti-rotation engaging piece portion 269 formed integrally on the foot portion 267 on a radial outer end thereof. One axial end of the anti-rotation engagement piece portion 269 extends or projects long in one axial direction from the foot portion 267 and the support portion 265, and thereby the lug 261 is formed in L-shape.

A sixth anti-rotation device 271 which is adapted for an assembled unit of the third quick connector 177 and the third pipe 253 is configured by modifying construction of the cutout 239 of the fifth anti-rotation device 197. Therefore, as to portions of configuration and functions identical to the fifth anti-rotation device 197, identical numeral references are almost given and explanations are almost omitted herein. As well shown in FIG. 32, an anti-rotation cap portion 273 of the sixth anti-rotation device 271 has an anti-rotation cutaway 277 extending from an opposite axial end of an arcuate wall 275 (with configuration like the arcuate wall 237) to an axial mid portion thereof instead of the cutout 239. A length of the cutaway 277 is designed slightly shorter than a projecting length of the anti-rotation engagement piece portion 269 from the foot portion 267 in one axial direction, while a width of the cutaway 277 is designed generally equal to a thickness of the foot portion 267 and the anti-rotation engagement piece portion 269.

Figure 33:
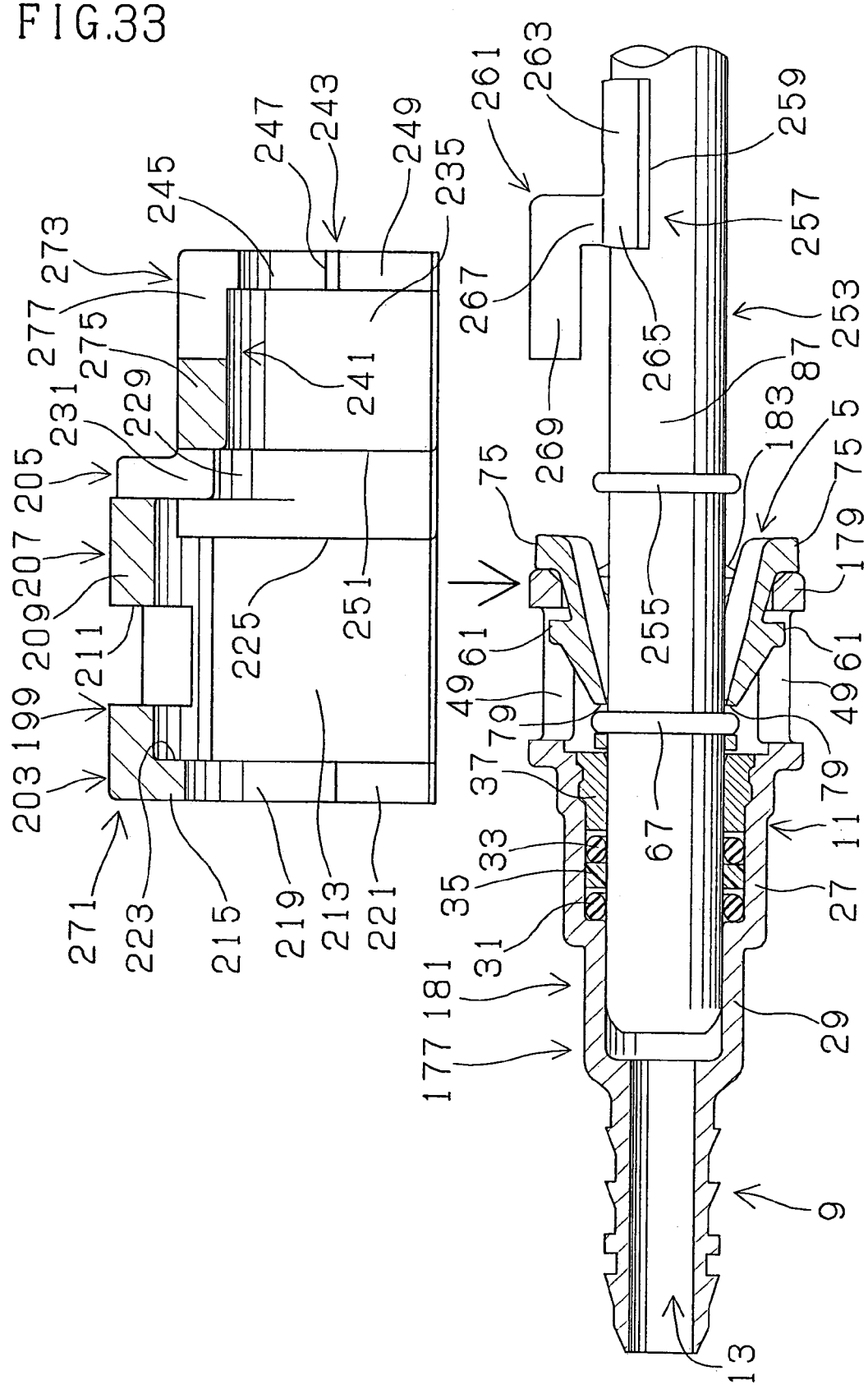
FIG. 33 is a view showing the sixth anti-rotation device is mounted on an assembled unit of the third quick connector and the third pipe.

As shown in FIG. 33, the sixth anti-rotation device 271 is snap-fitted on the third quick connector 177 and the third pipe 253 in the same manner as the fifth anti-rotation device 197 so as to clip the third quick connector 177 and the third pipe 253 radially inwardly. Mounting manner of the fifth anti-rotation device 197 is essentially applicable to that of the sixth anti-rotation device 271. The annular verification projection 255 of the third pipe 253 is to be received in the arcuate portion 229 of the junction part 205.

Figure 34:
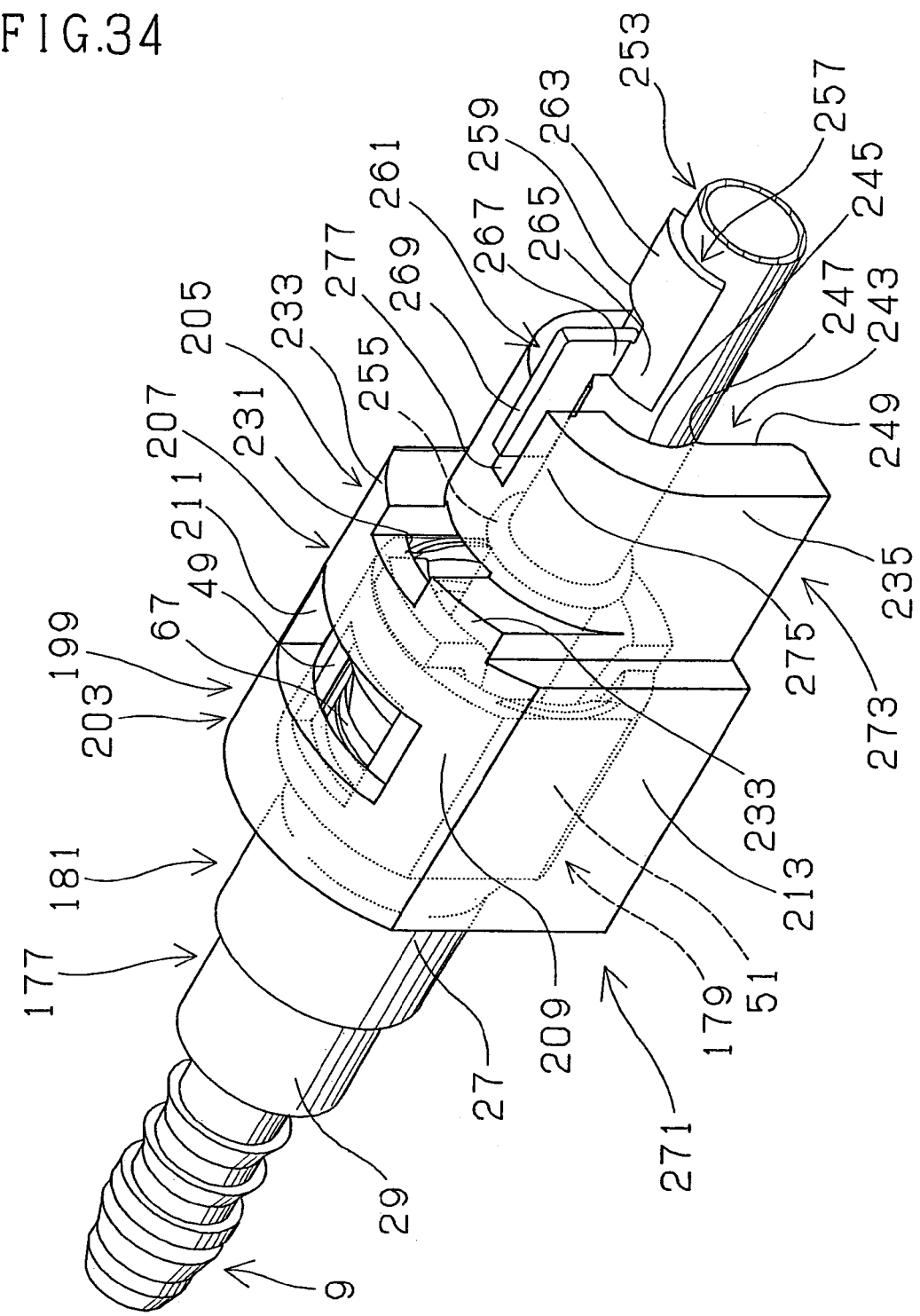
FIG. 34 is a perspective view of the sixth anti-rotation structure.
Figure 35:
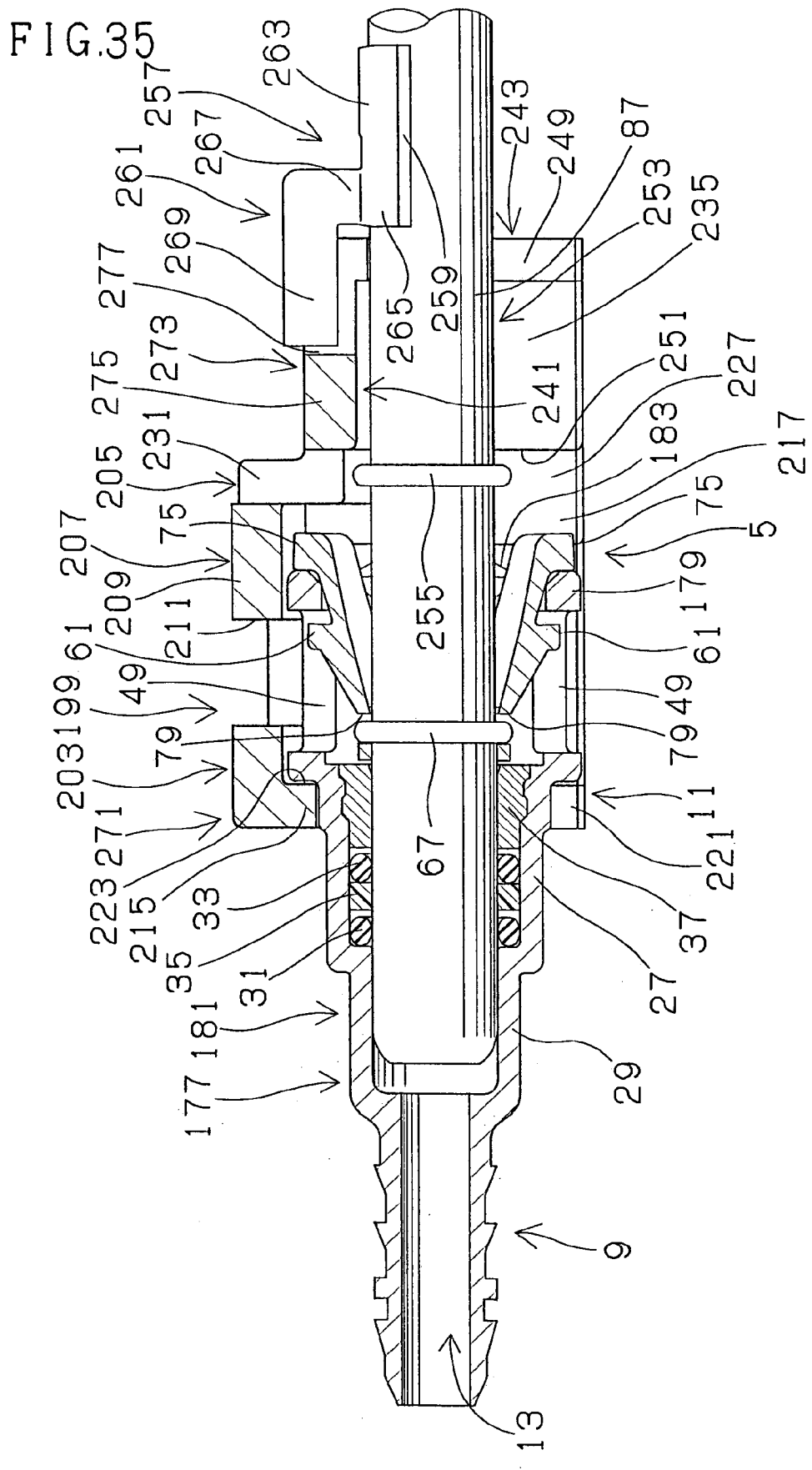
FIG. 35 is a sectional view of the sixth anti-rotation structure.

As shown in FIGS. 34 and 35, in this state, the anti-rotation engagement piece portion 269 of the metal stay 257 fits in the cutaway 277 in such manner as a portion of the anti-rotation engagement piece portion 269, projecting from the foot portion 267 in one axial direction for generally entire length thereof or a length of one axial end thereof seats in the cutaway 277, and the foot portion 267 is located on the other axial end from the cutaway 277. The cap body 199 is connected to the third quick connector 177 in anti-rotating relation. And, as the anti-rotation engagement piece portion 269 of the metal stay 257 engages circumferentially with the cutaway 277, the anti-rotation cap portion 273 is connected also to the third pipe 253 in anti-rotating relation. Therefore, the third quick connector 177 is connected to the third pipe 253 in co-rotatable relation by way of the sixth anti-rotating device 271.

Figure 36:
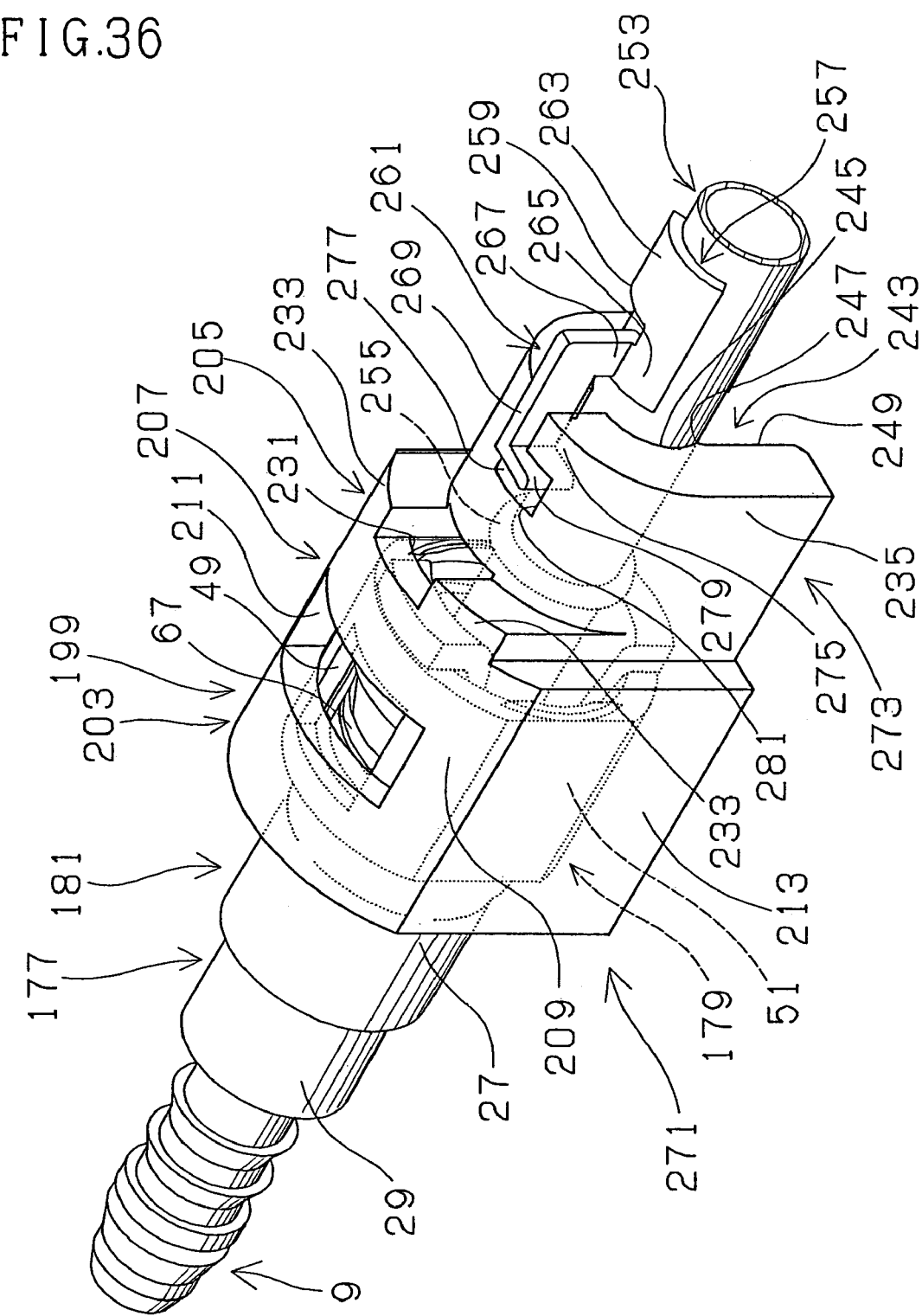
FIG. 36 is a view showing a modified stay and a modified cutaway.

Further, a bent section 279, bent at a right angle in this embodiment, may be formed on one axial end of the anti-rotation engagement piece portion 269 of the metal stay 257, while an angled cut section 281 may be formed on one axial end portion of the cutaway 277 for receiving the bent section 279 (refer to FIG. 36). In this construction, an axial engagement of the bent section 279 with the angled cut section 281 prevents escape of the third pipe 253 more securely.

Figure 37:
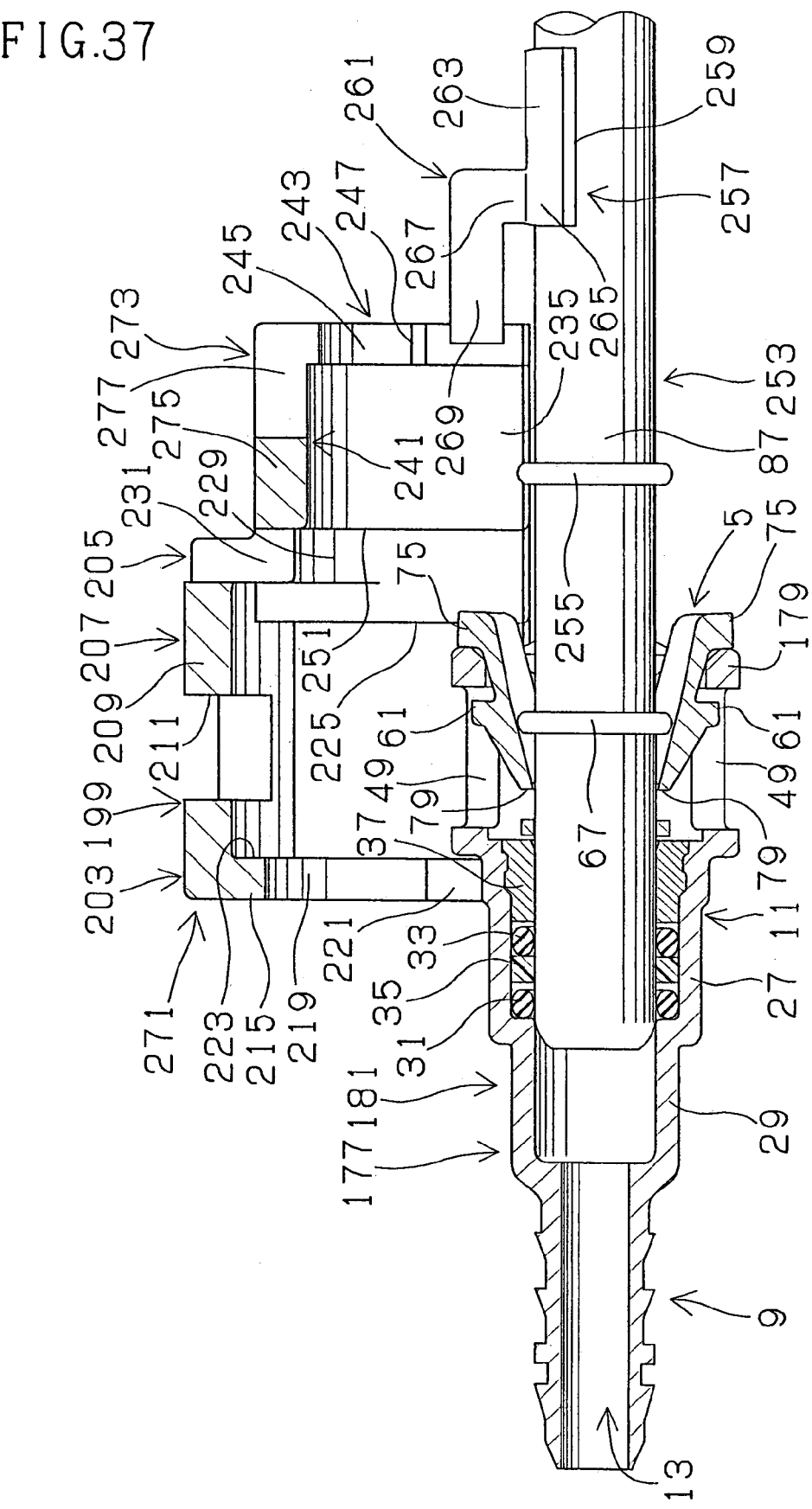
FIG. 37 is a view showing the sixth anti-rotation device is mounted when the third quick connector and the third pipe are in half-fitting relation.

As shown in FIG. 37, if the third pipe 253 is not sufficiently inserted in the third quick connector 177 or the retainer 5 and the annular engagement projection 67 of the third pipe 253 does not engage in the engagement slit 79 of the retainer 5, the annular verification projection 255 of the third pipe 253 is located further apart from an opposite axial end of the connector housing 181 or the retainer holding portion 181 toward an opposite axial direction compared to the case that the third pipe 253 is correctly connected to the third quick connector 177. Therefore, when the sixth anti-rotation device 271 is tried to be fitted on the third quick connector 177 and the third pipe 253 so that the retainer holding portion 179 is received in the connector receptacle portion of the connector receiving portion 203, the annular verification projection 255 of the third pipe 253 is not located so as to be received in the junction part 205 but located on a side of the anti-rotation cap portion 273. However, as a width of the receiving hollow of the anti-rotation cap portion 273 is smaller than an outer diameter of the annular verification projection 255 of the third pipe 253, the annular verification projection 255 contacts or abuts ends of a U-shape opening of the anti-rotation cap portion 273, and thereby the third pipe 253 is not received in the receiving hollow of the anti-rotation cap portion 273. Therefore, in this case the sixth anti-rotation device 271 cannot be mounted on the third quick connector 177 and the third pipe 253.

Figure 38:
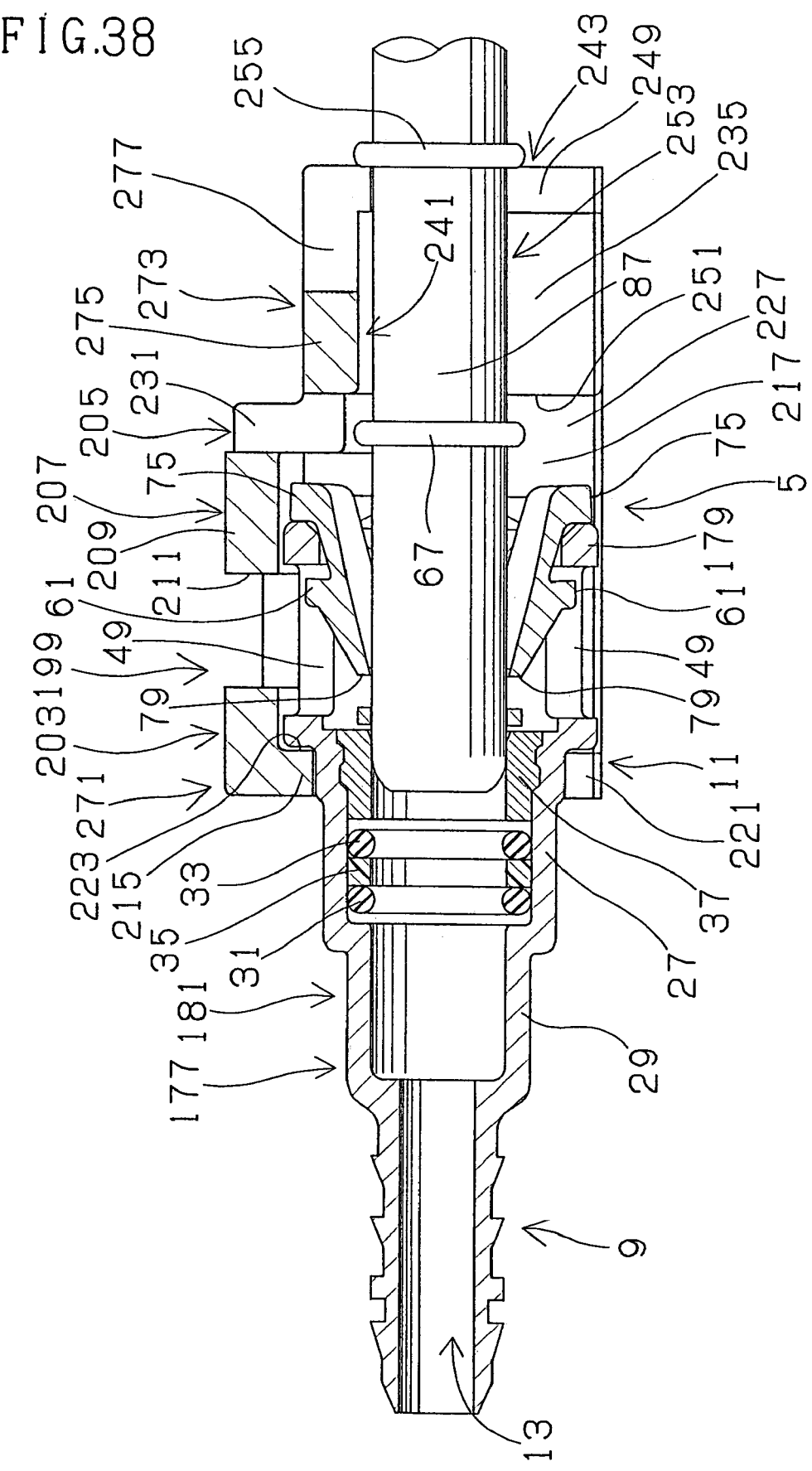
FIG. 38 is a view showing the sixth anti-rotation device is mounted when the third quick connector and the third pipe are in another half-fitting relation.

As shown in FIG. 38, if the third pipe 253 is not at all sufficiently inserted in the third quick connector 177 or the retainer 5 and the annular verification projection 255 of the third pipe 253 is located far apart from an opposite axial end of the connector housing 181 or the retainer holding portion 179 toward an opposite axial direction, as an axial length of the anti-rotation cap portion 273 of the sixth anti-rotation device 271 is designed shorter than an axial distance between the annular engagement projection 67 of the third pipe 253 and the annular verification projection 255, the sixth anti-rotation device 271 happens to be mounted on the third quick connector 177 and the third pipe 253. Here, the retainer holding portion 179 is received in the connector receptacle portion of the connector receiving portion 203, the annular engagement projection 67 of the third pipe 253 is received, for example, in the junction part 205, the annular verification projection 255 of the third pipe 253 is located on the other axial end from the anti-rotation cap portion 273, and a portion of the third pipe 253 between the annular engagement projection 67 and the annular verification projection 255, namely the inserting side portion 87 is received in the receiving hollow of the anti-rotation cap portion 273, namely in the fit-on position 241. However, if such case happens, as an axial length of the anti-rotation cap portion 273 is designed generally equal to an axial distance between an inserting end of the third pipe 253 and an opposite axial end of the O-ring 33 of the other axial end during complete connection, the annular verification projection 255 is located much toward an opposite axial direction by a length longer than an axial distance between an inserting end of the third pipe 253 completely inserted and an opposite axial end of the O-ring 33 of the other axial end, compared to when the connection is completed. That is, an inserting end of the third pipe 253 is located rearwardly away from the O-ring 33 of the other axial end toward the other axial end, and no seal is provided between the connector housing 181 and the third pipe 253. Then, it can be also verified that the third pipe 253 is incompletely fitted in the third quick connector 177 in the same manner as the fifth anti-rotation device 197 is applied.

Figure 39:
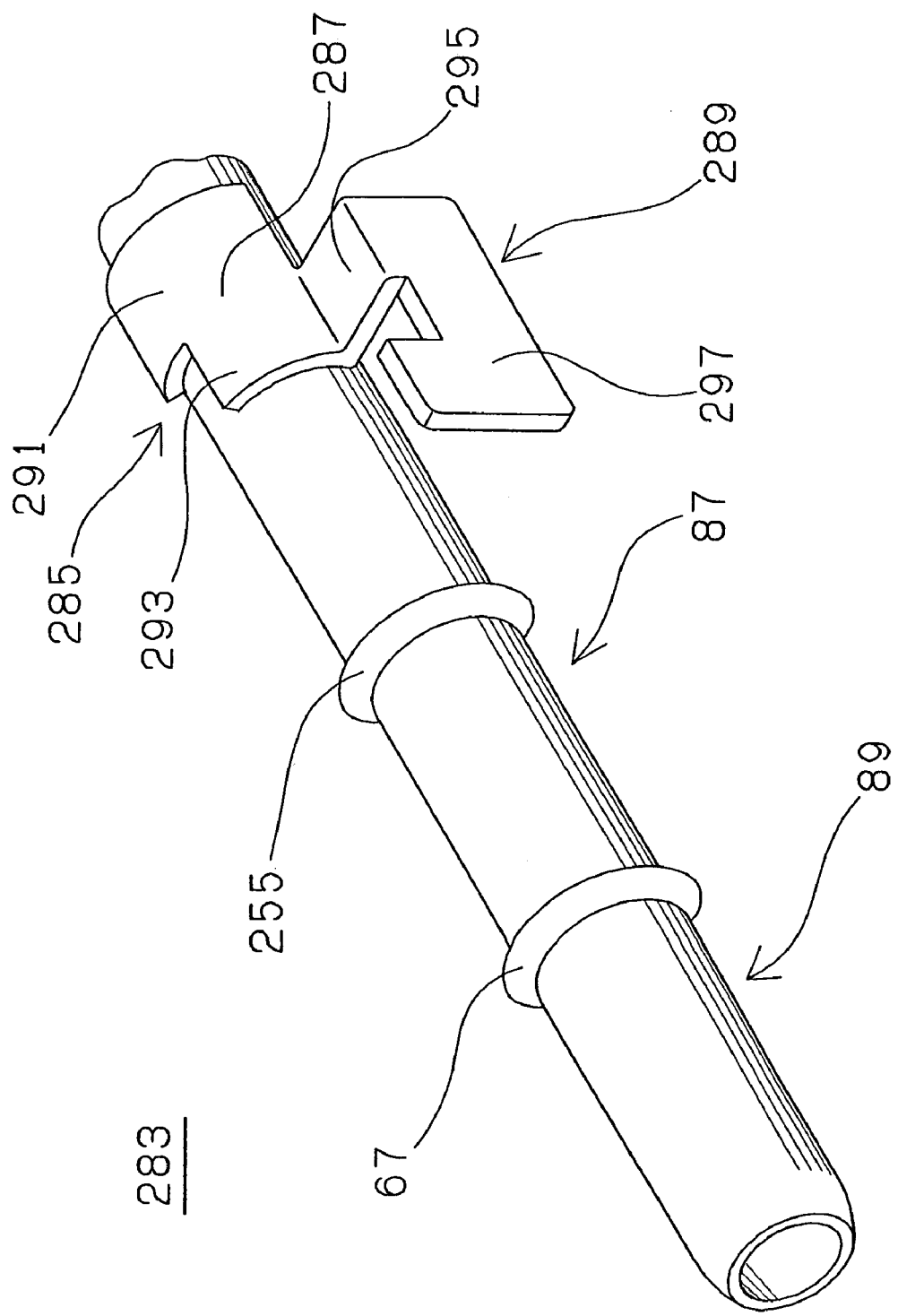
FIG. 39 is a perspective view of a fourth pipe adapted in a seventh anti-rotation structure for a pipe and a connector according to the present invention.

A seventh anti-rotation structure for a pipe and a connector according to the present invention is explained with reference to FIGS. 39 and 40. A fourth pipe 283 which is adapted in the seventh anti-rotation structure is configured by replacing the anti-rotation metal stay 257 for the third pipe 253 with another anti-rotation metal stay 285. As shown in FIG. 39, the anti-rotation metal stay 285 comprises a mounting piece 287 and a lug 289. The mounting piece 287 is curved at curvature widthwise or circumferentially identical to an outer peripheral surface of the inserting side portion 87, and is fixed on the outer peripheral surface of the inserting side portion 87 of the fourth pipe 283, for example, by welding. The lug 289 is thin widthwise, formed integrally on the mounting piece 287 so as to extend radially outwardly from an outer peripheral surface of the inserting side portion 87. The mounting piece 287 has a body portion 291 of square or rectangular shape on a rear or the other axial end, and a support portion 293 generally of square shape, formed integrally to a front or one axial end of the body portion 291 on one widthwise side thereof. The lug 289 includes a foot portion 295 and an anti-rotation engagement piece portion 297. The foot portion 295 is formed by bending one widthwise side of the support portion 293 upward, and the anti-rotation engagement portion 297 is formed by bending an outer side of the foot portion 295 at a right angle or generally right angle and downwardly or in an opposite direction of lifting up the foot portion 295. The metal stay 285 is arranged to be located on the other axial end from the connector housing 181 or the retainer holding portion 179.

A seventh anti-rotation device 299 which is adapted for an assembled unit of the third quick connector 177 and the fourth pipe 283 in the seventh anti-rotation structure is configured same as the sixth anti-rotation device 271 except that the seventh anti-rotation device 299 is not formed with cutaway 277 on an anti-rotation cap portion 301. The seventh anti-rotation device 299 is snap-fitted on the third quick connector 177 and the fourth pipe 283 so as to clip the third quick connector 177 and the fourth pipe 283 radially inwardly in the same manner as the sixth anti-rotation device

271. Mounting manner of the sixth anti-rotation device 271 is essentially applicable to that of the seventh anti-rotation device 299.

Figure 40:
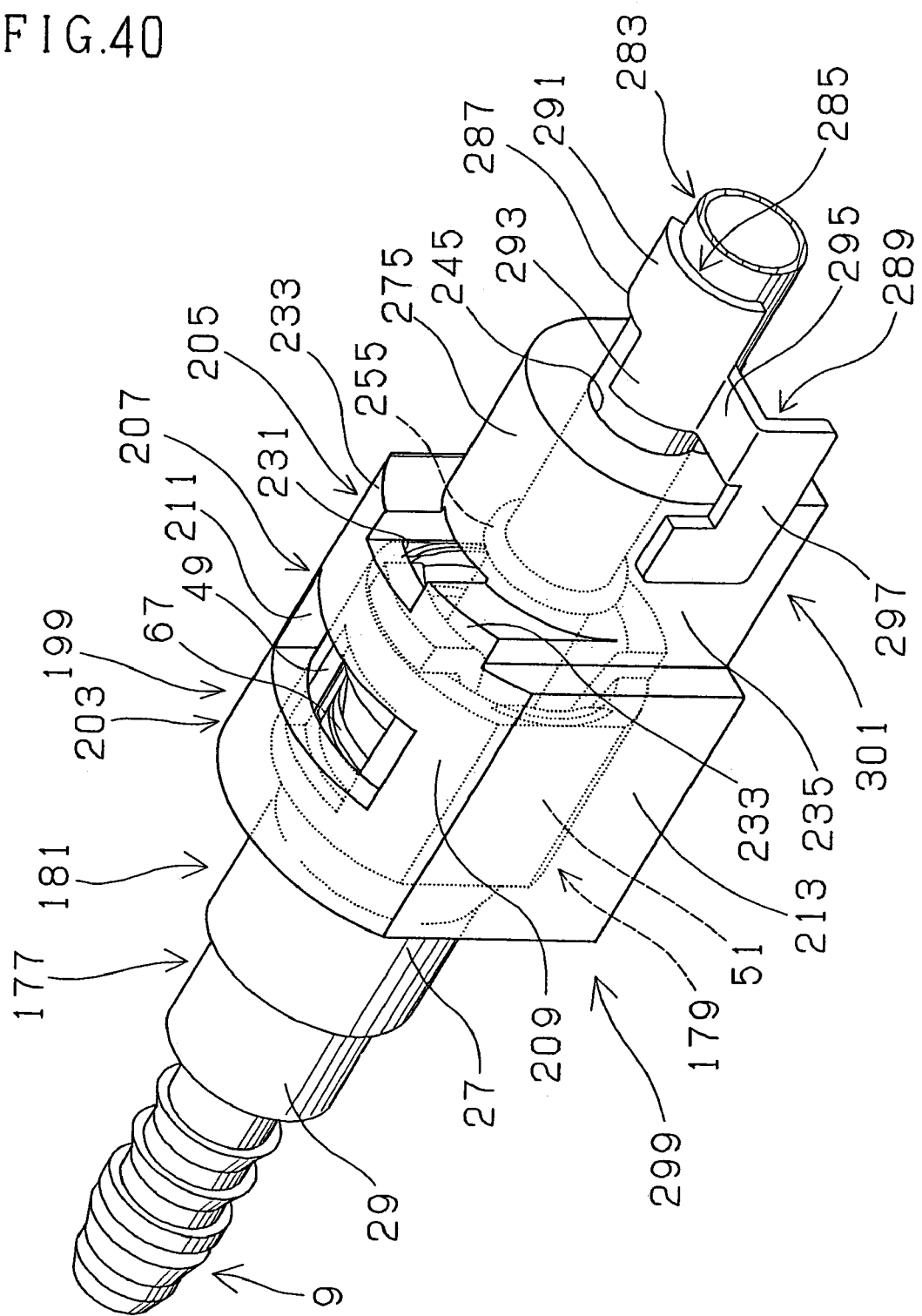
FIG. 40 is a perspective view of the seventh anti-rotation structure.

As shown in FIG. 40, in this state, as the anti-rotation engagement piece portion 297 formed in flat shape of the metal stay 285 engages circumferentially with the cap side walls 235, 235 of the anti-rotation cap portion 301 in contact relation or in face-to-face contact relation with flat outer surfaces thereof the anti-rotation cap portion 301 is connected to the fourth pipe 283 in anti-rotating relation. Therefore, the third quick connector 177 is connected to the fourth pipe 283 in co-rotatable relation by way of the seventh connector anti-rotating device 299.

Figure 41:
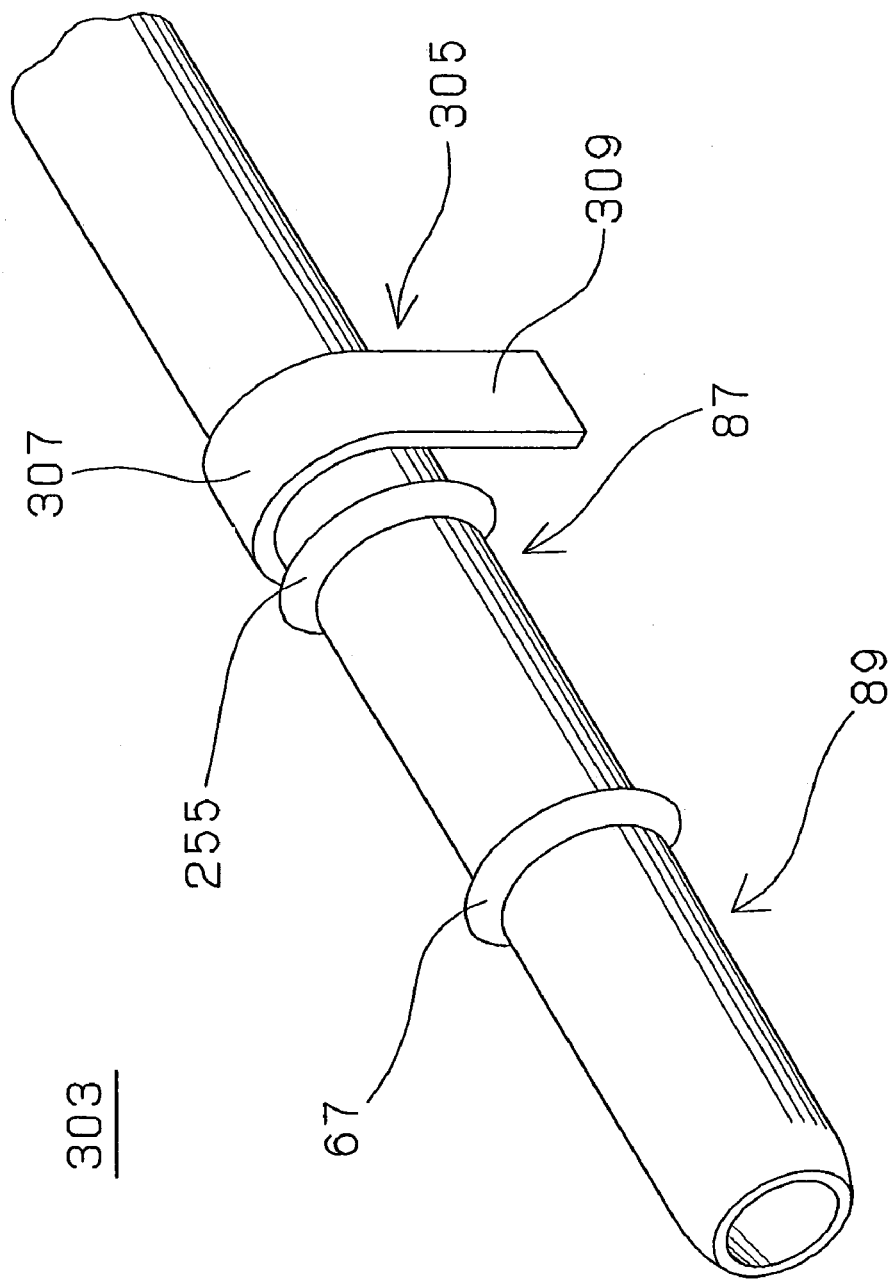
FIG. 41 is a perspective view of a fifth pipe adapted in an eighth anti-rotation structure for a pipe and a connector according to the present invention.

An eighth anti-rotation structure for a pipe and a connector according to the present invention is explained with reference to FIGS. 41 and 42. A fifth pipe 303 which is adapted in the eighth anti-rotation structure is configured by replacing the anti-rotation metal stay 257 for the third pipe 253 with another anti-rotation metal stay 305. As shown in FIG. 41, the metal stay 305 comprises an arcuate or semi circular portion 307 and a pair of engageable legs 309, 309 (only one engageable leg is shown) connected integrally to the semi-circular portion 307 at widthwise opposite ends thereof and thereby is formed in a strip of U-shape corresponding or generally corresponding to the receiving hollow of the anti-rotation cap portion 301. The metal stay 305 is fixed on the outer peripheral surface of the inserting side portion 87 of the fifth pipe 303 with an inner surface thereof for example, by welding. The metal stay 305 is arranged to be located on the other axial end from the connector housing 181 or the retainer 181.

The eighth anti-rotation structure is configured by applying the seventh anti-rotation device 299 to an assembled unit of the third quick connector 177 and the fifth pipe 303. The seventh anti-rotation device 299 is snap-fitted in the same manner as the seventh anti-rotation structure on the third quick connector 177 and the fifth pipe 303 so as to clip the third quick connector 177 and the fifth pipe 303 radially inwardly. That is, mounting manner of the seventh anti-rotation device 299 in the seventh anti-rotation structure is essentially applicable in the eighth anti-rotation structure.

Figure 42:
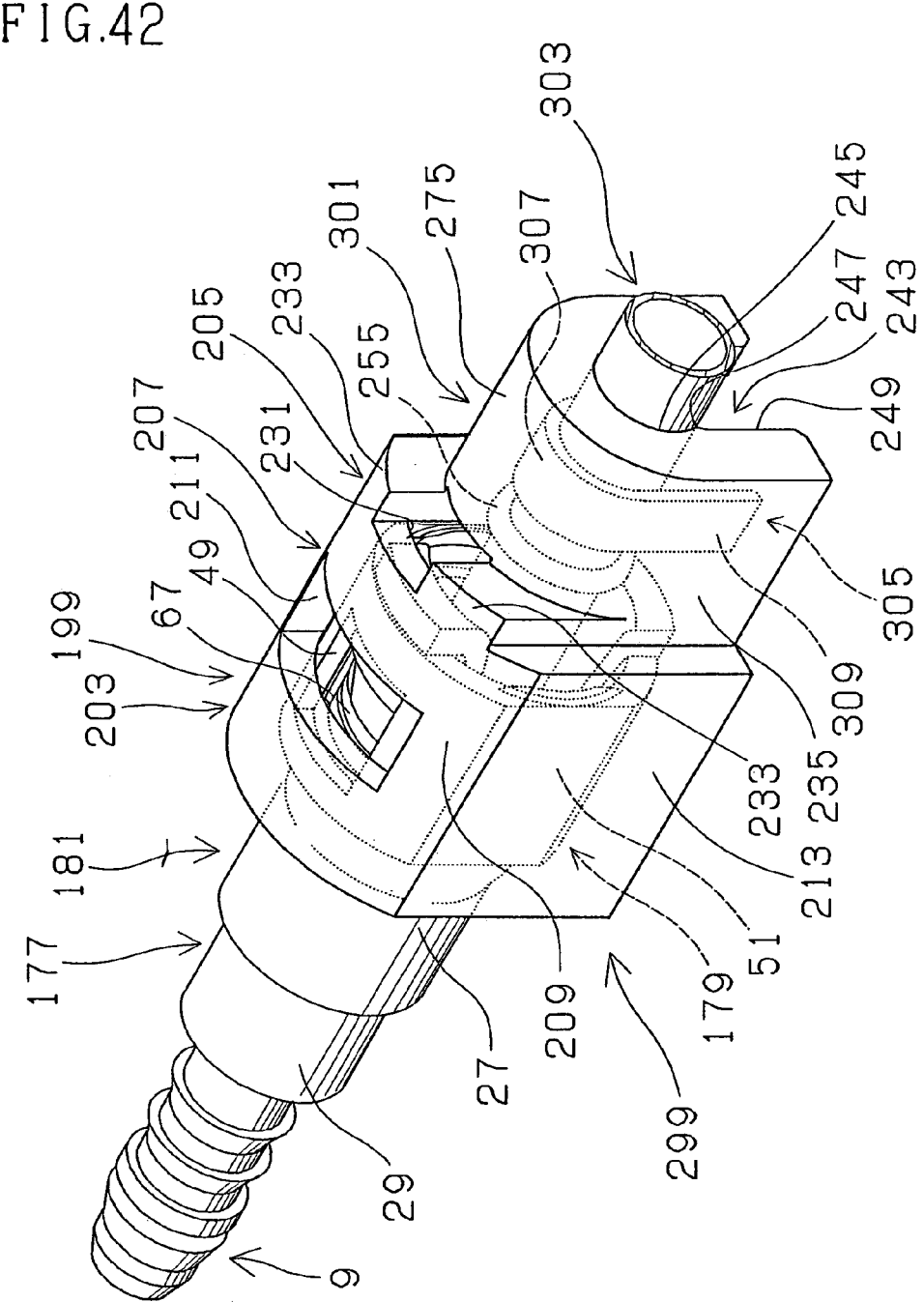
FIG. 42 is a perspective view of the eighth anti-rotation structure.

As shown in FIG. 42, in this state, as the metal stay 305 seats in the receiving hollow in the anti-rotation cap portion 301, the engageable legs 309, 309 engage circumferentially with the cap side walls 235, 235 of the anti-rotation cap portion 301 in contact relation with inner surfaces or flat inner surfaces thereof, the anti-rotation cap portion 301 is connected to the fifth pipe 303 in anti-rotating relation. Hence, a distance between outer surfaces of the engageable legs 309, 309 of the stay 305 is designed generally identical to a width of the receiving hollow in the anti-rotation cap portion 301. Therefore, the third quick connector 177 is connected to the fifth pipe 303 in co-rotatable relation by way of the seventh connector anti-rotating device 299.

Figure 43:
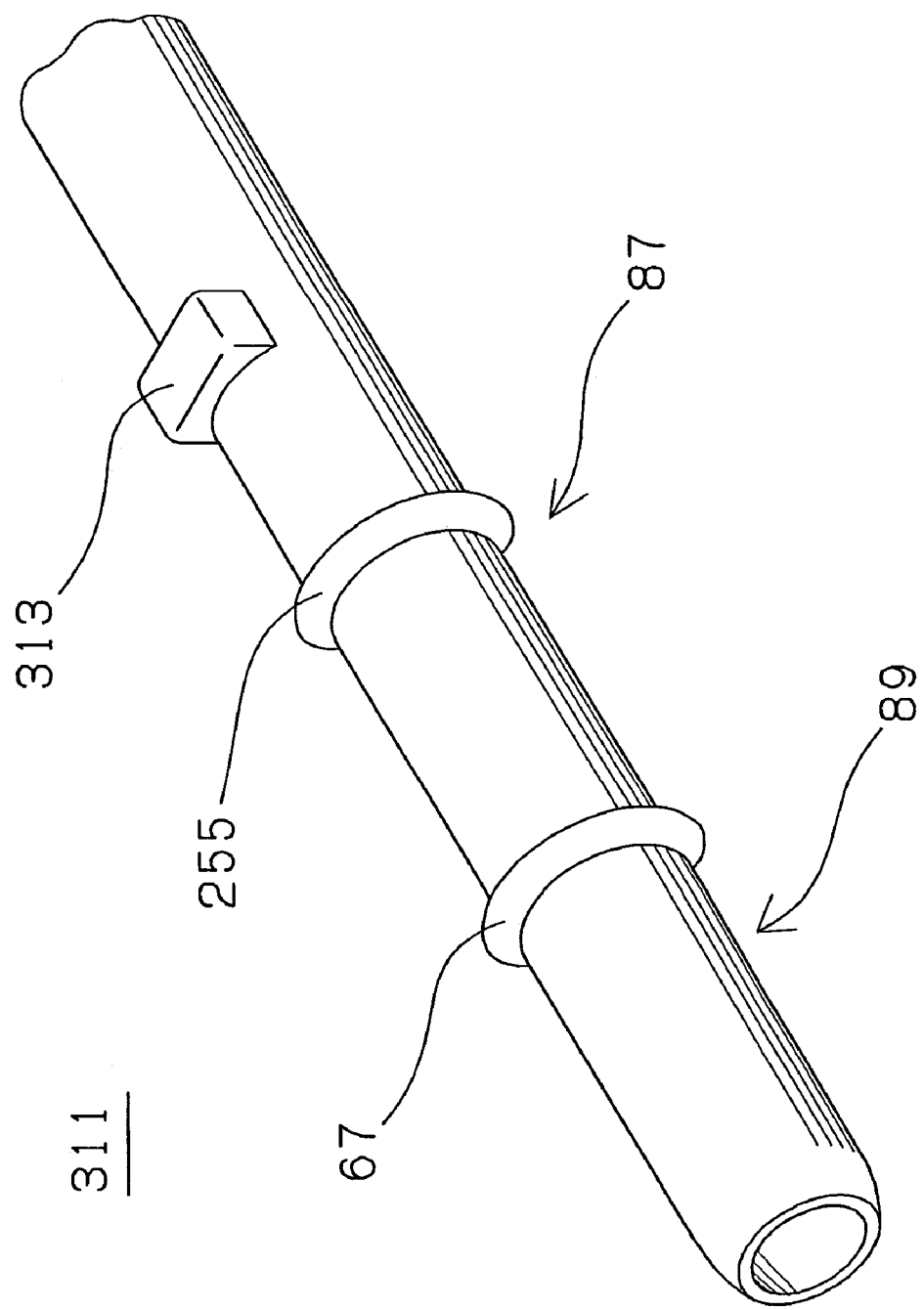
FIG. 43 is a perspective view of a sixth pipe adapted in a ninth anti-rotation structure for a pipe and a connector according to the present invention.

A ninth anti-rotation structure for a pipe and a connector according to the present invention is explained with reference to FIGS. 43 to 45. A sixth pipe 311 which is adapted in the ninth anti-rotation structure is configured by replacing the anti-rotation metal stay 257 for the third pipe 253 with another anti-rotation metal stay 313. As shown in FIG. 43, the anti-rotation metal stay 313 is formed like rectangular parallelepiped shape having a bottom surface curved at curvature widthwise or circumferentially identical to an outer peripheral surface of the inserting side portion 87, and is fixed on the outer peripheral surface of the inserting side portion 87 of the sixth pipe 311 with the bottom surface thereof, for example, by welding. The metal stay 313 is arranged to be located on the other axial end from the connector housing 181 or the retainer holding portion 179.

Figure 44:
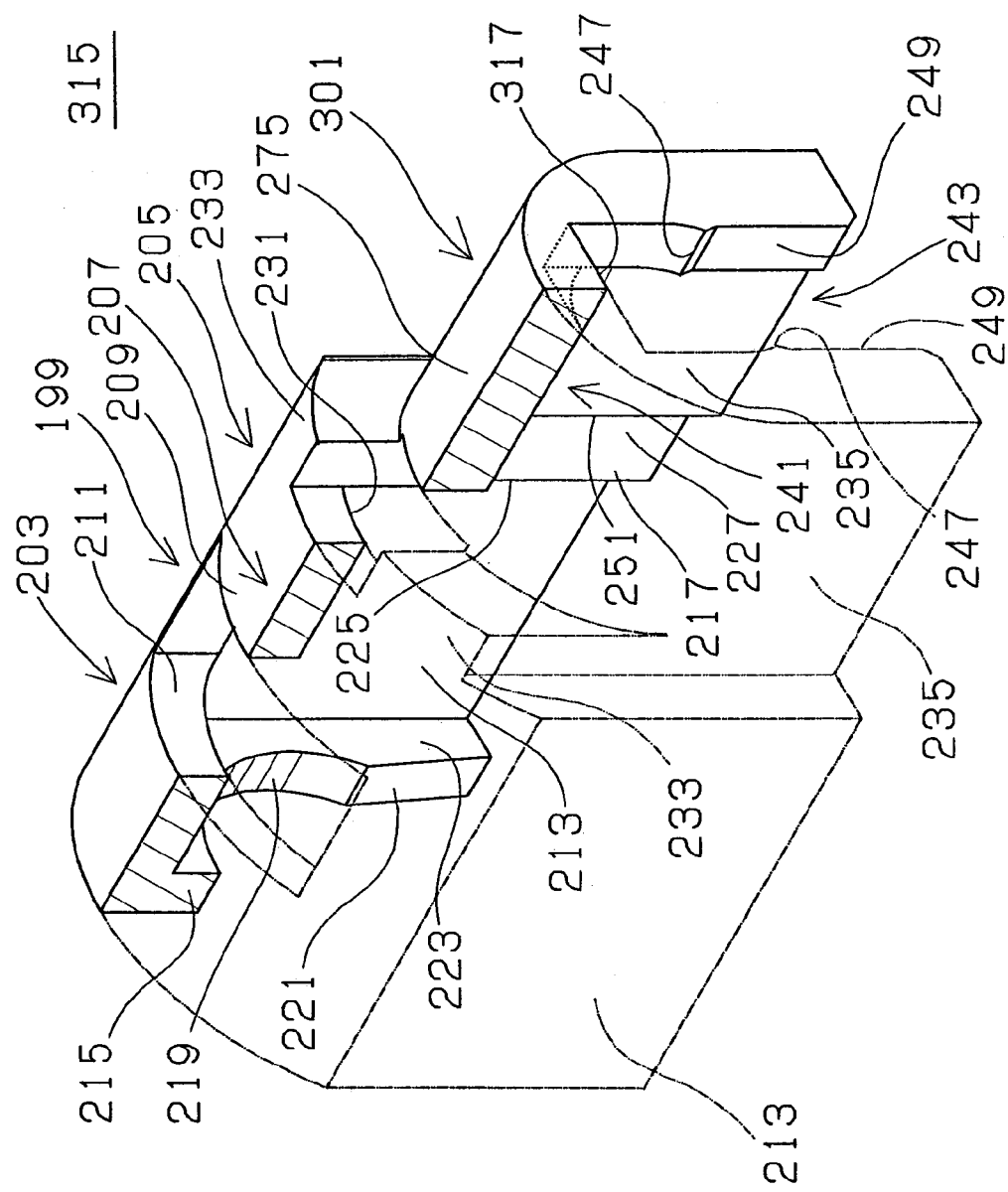
FIG. 44 is a perspective view of an eighth anti-rotation device for a pipe and a connector adapted in the ninth anti-rotation structure.

As well shown in FIG. 44, an eighth anti-rotation device 315 which is adapted for an assembled unit of the third quick connector 177 and the sixth pipe 311 in a ninth anti-rotation structure is configured same as the seventh anti-rotation device 299 except that an embracing portion 317 of the anti-rotation cap portion 301 is formed not of semi-circle shape but of rectangular or square shape corresponding to a body of the sixth pipe 311 and the metal stay 313 so that the metal stay 313 also fits therein. The eighth anti-rotation device 315 is snap-fitted on the third quick connector 177 and the sixth pipe 311 so as to clip the third quick connector 177 and the sixth pipe 311 radially inwardly in the same manner as the seventh anti-rotation device 299. Mounting manner of the seventh anti-rotation device 299 is essentially applicable to that of the eighth anti-rotation device 315. The fit-on portion 317 may be formed in a shape including arcuate portion for receiving the sixth pipe 311 and rectangular or square portion for receiving the stay 313.

Figure 45:
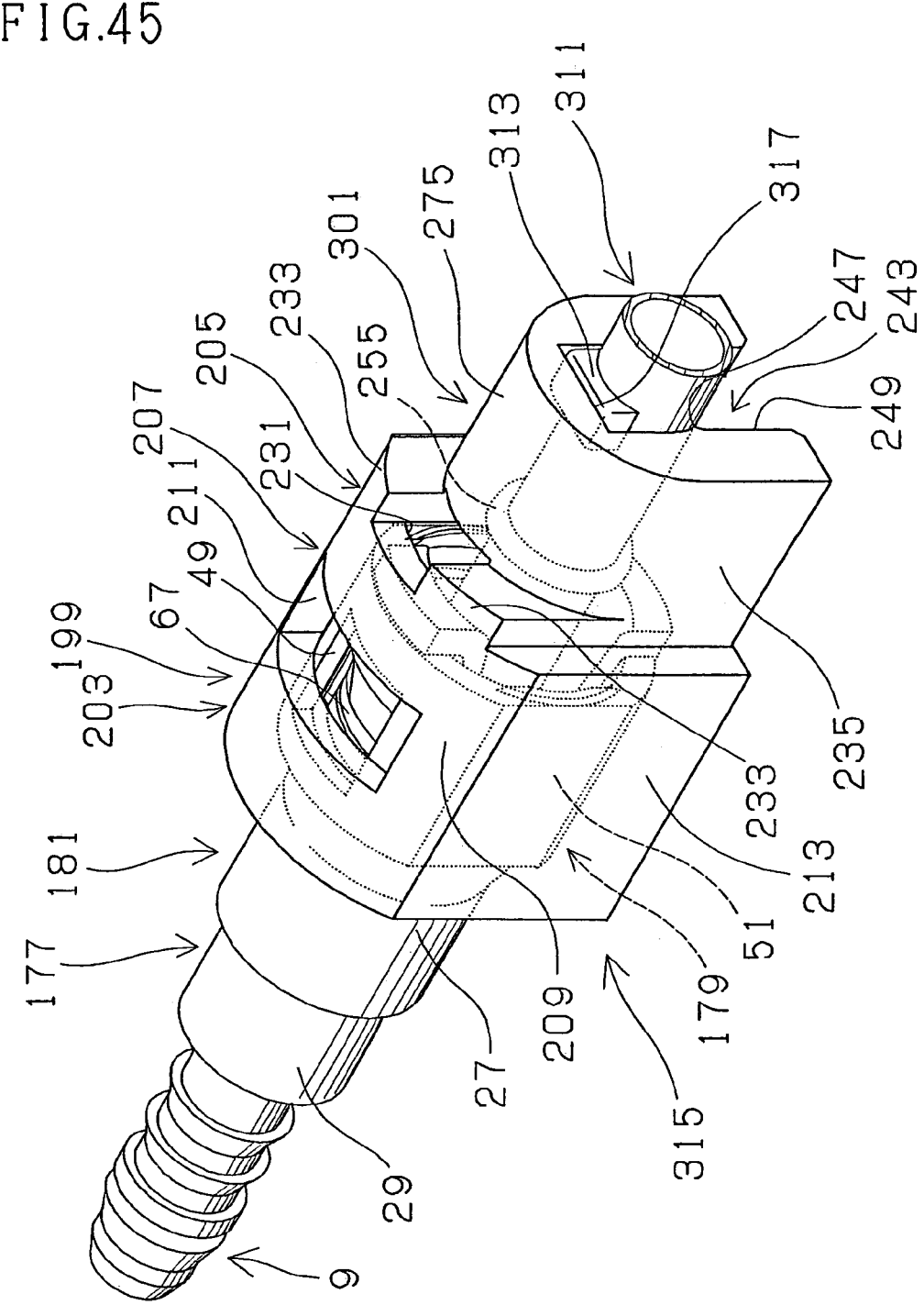
FIG. 45 is a perspective view of the ninth anti-rotation structure.

As shown in FIG. 45, in this state, as the metal stay 313 fits in the embracing portion 317 of the raised strip portion 243 of the anti-rotation cap portion 301, and circumferentially engages with the embracing portion 317 while at least a radially outer surface of the metal stay 313 contacts to or contacts in face to face relation to an inner surface thereof the anti-rotation cap portion 301 is connected to the sixth pipe 311 in anti-rotating relation. Therefore, the third quick connector 177 is connected to the sixth pipe 311 in co-rotatable relation by way of the eighth anti-rotating device 315. A width of the stay 313 may be designed generally identical to or smaller than an outer diameter of the sixth pipe 311.

The metal stay 313 may be formed instead of the annular verification projection 255 at a position or in proximity, for example, of the annular verification projection 255 on the sixth pipe 311. This configuration also enables to verify that the sixth pipe 311 is incompletely fitted in the third quick connector 177 in the same manner as in the fifth anti-rotation structure.

Figure 46:
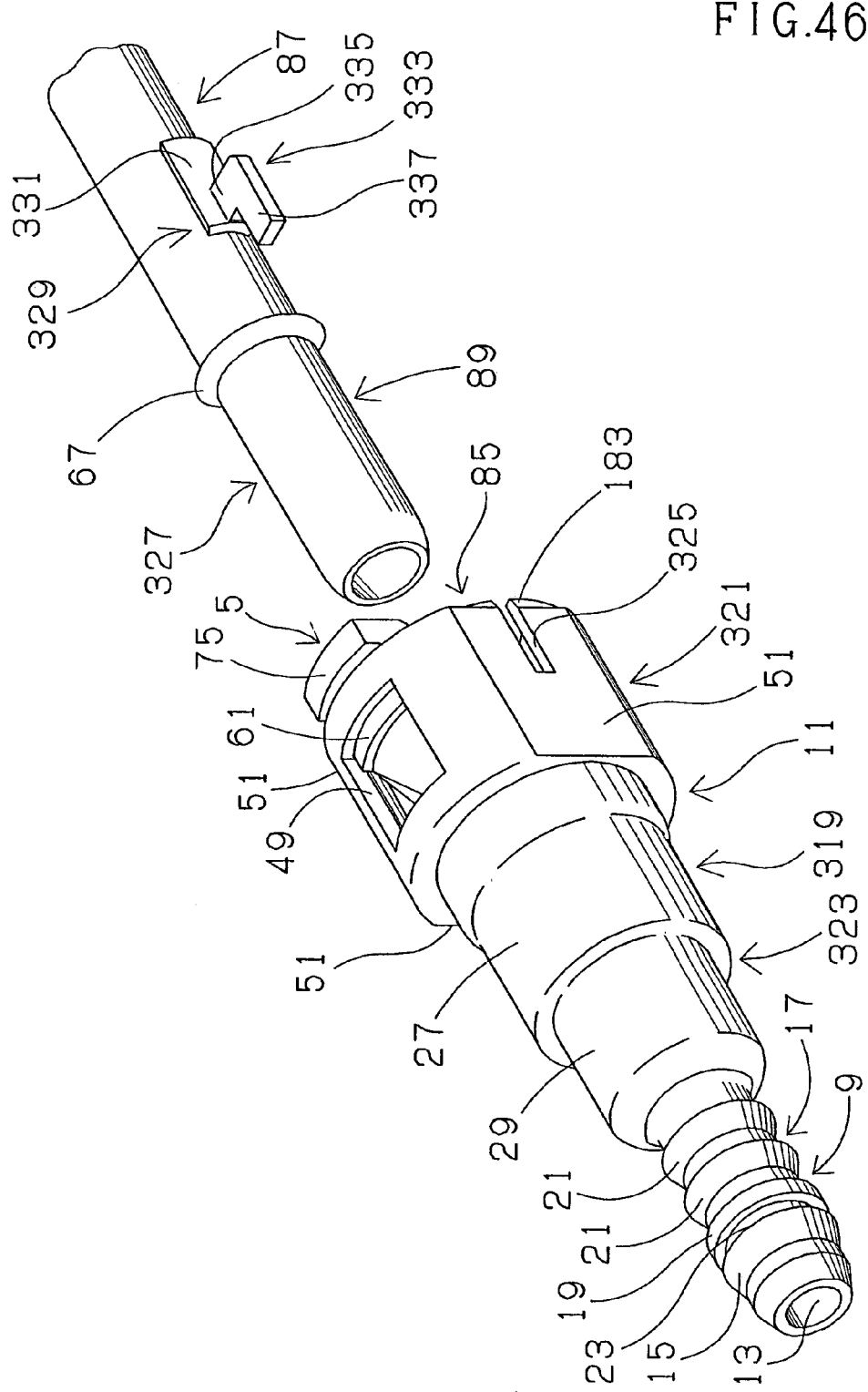
FIG. 46 is a perspective view of a fourth quick connector and a seventh pipe adapted in a tenth anti-rotation structure for a pipe and a connector according to the present invention.

A tenth anti-rotation structure for a pipe and a connector according to the present invention is explained with reference to FIGS. 46 to 48. A fourth quick connector 319 which is adapted in a tenth anti-rotation structure is configured by modifying the connector housing 181 of the third quick connector 177. Therefore, as to portions of configuration and functions identical to the third quick connector 177, identical numeral references are almost given and explanations are almost omitted herein. As shown in FIG. 46, in a retainer holding portion 321 of a connector housing 323, the flat region 51 is formed with an anti-rotation slit 325 on a widthwise mid portion thereof extending from an opposite axial end to one axial end, and the anti-rotation slit 325 reaches to a position short of an axial center of the retainer holding portion 321.

A seventh pipe 327, which is adapted in the tenth anti-rotation structure, is configured by modifying the second pipe 185. The seventh pipe 327 is configured by replacing the anti-rotation metal stay 187 fixed on an outer peripheral surface of an inserting side portion 87 of the second pipe 185 with another metal stay 329. As shown in FIG. 46, the anti-rotation metal stay 329 comprises a mounting piece 331 formed like square shape and a lug 333. The mounting piece 331 is curved at curvature widthwise or circumferentially identical to an outer peripheral surface of the inserting side portion 87, and is fixed on the outer peripheral surface of the inserting side portion 87 of the seventh pipe 327. The lug 333 is thin widthwise, fixed on the mounting piece 331 on a front or one axial end thereof at widthwise mid portion thereof by welding so as to extend radially outwardly from an outer peripheral surface of the inserting side portion 87. The lug 333 includes a foot portion 335 standing at the mounting piece 331 and an anti-rotation engaging piece portion 337 formed integrally on the foot portion 335 on a radial outer end thereof. One axial end of the anti-rotation engagement piece portion 337 extends or projects long in one axial direction beyond the foot portion 335 and the mounting piece 331, and thereby the lug 333 is formed in L-shape. The metal stay 329 is formed so as to project somewhat lower than the metal stay 187 and fixed toward one axial end compared to the metal stay 187. A distance between an radially outer end of the anti-rotation engagement piece portion 337 and a center of the seventh pipe 327 is designed longer than one-half of width of the retainer receptacle portion and the projection receptacle portion of the cap body 199.

The seventh pipe 327 is inserted in the connector housing 323 or the retainer holding portion 321 of the fourth quick connector 319 so that the anti-rotation engagement piece portion 337 of the metal stay 329 fits in the anti-rotation slit 325 of the fourth quick connector 319 so as to engage therein in anti-rotating relation. Therefore, the seventh pipe 327 is connected to the fourth quick connector 319 in anti-rotating relation by way of the metal stay 329 and the anti-rotation slit 325. An axial length or depth of the anti-rotation slit 325 is designed equal to or generally equal to an axial length of the anti-rotation engagement piece portion 337 of the metal stay 329. The anti-rotation engagement piece portion 337 of the metal stay 329 seats in the anti-rotation slit 325 not so as to project in an opposite axial direction from the anti-rotation slit 325.

Figure 47:
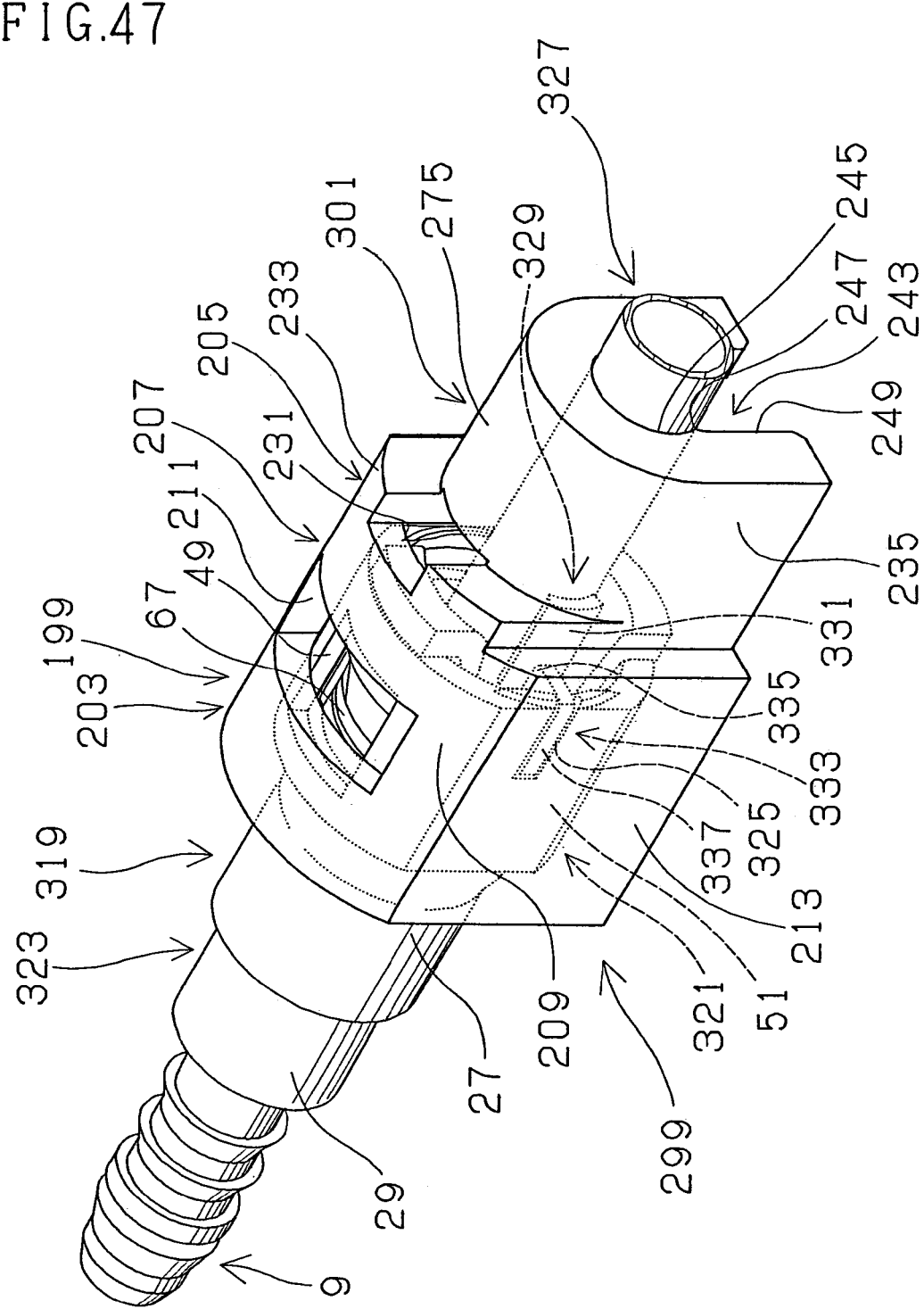
FIG. 47 is a perspective view of the tenth anti-rotation structure.

As shown in FIG. 47, the seventh anti-rotation device 299, which is adapted in the tenth anti-rotation structure, is mounted on an assembled unit of the fourth quick connector 319 and the seventh pipe 327. The seventh anti-rotation device 299 is snap-fitted on the fourth quick connector 319 and the seventh pipe 327 so as to clip the fourth quick connector 319 and the seventh pipe 327 radially inwardly in the same manner as in the seventh anti-rotation structure. However, the seventh anti-rotation device 299 does not have an anti-rotation function with respect to the fourth quick connector 319 and the seventh pipe 327.

Figure 48:
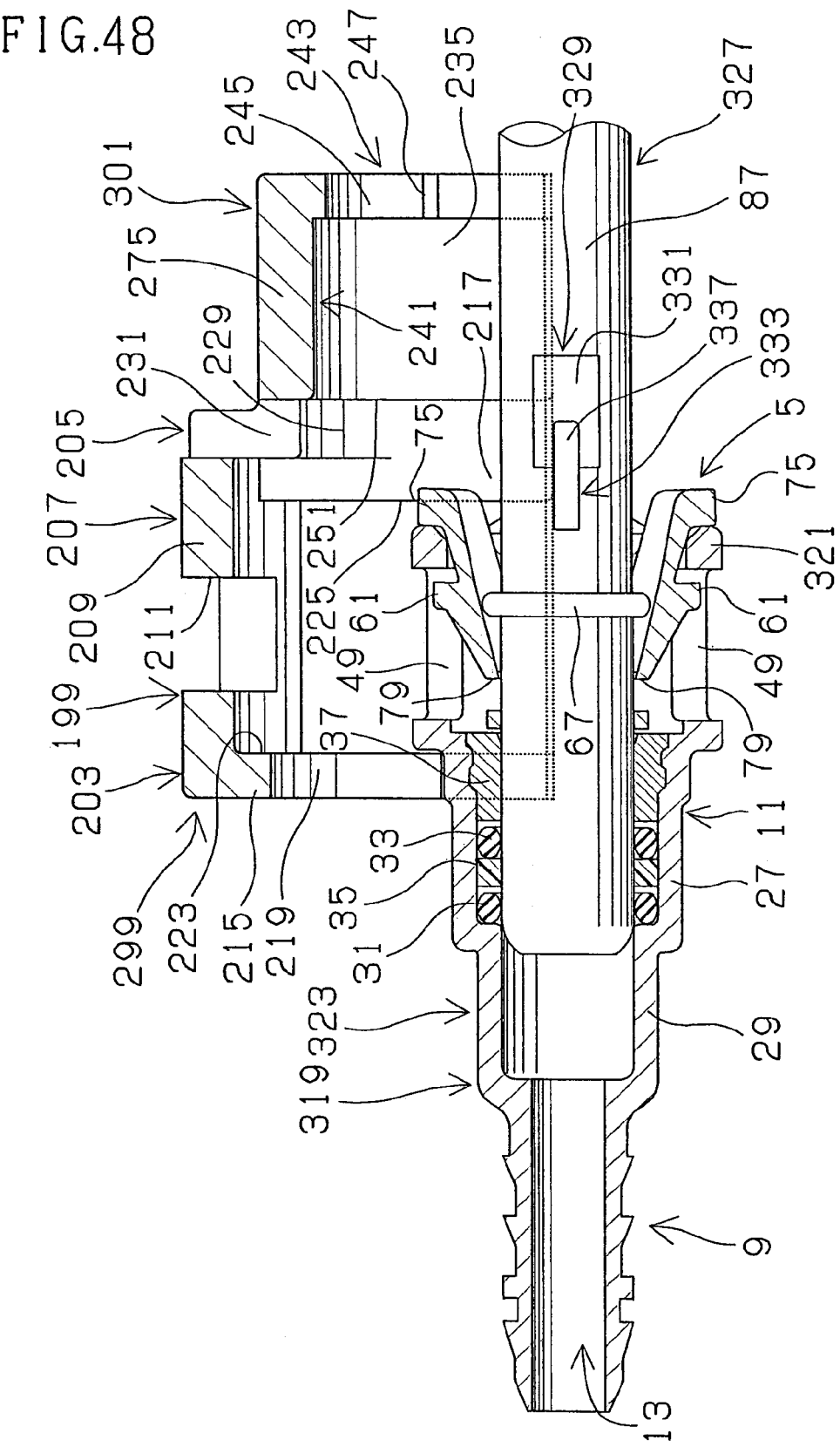
FIG. 48 is a view showing that a seventh anti-rotation device for a pipe and a connector is mounted when the fourth quick connector and the seventh pipe are in half-fitting relation.

As shown in FIG. 48, if the seventh pipe 327 is not sufficiently inserted in the fourth quick connector 319 or the retainer 5 and the annular engagement projection 67 of the seventh pipe 327 does not engage in the engagement slit 79 of the retainer 5, the anti-rotation engagement piece portion 337 of the metal stay 329 of the seventh pipe 327 projects from the anti-rotation slit 325 of the connector housing 323 or the retainer holding portion 321 in an opposite axial direction (for example, one axial end portion of the anti-rotation engagement piece portion 337 seats in the anti-rotation slit 325). Therefore, in this state, if the seventh anti-rotation device 299 is tried to be fitted on the fourth quick connector 319 and the seventh pipe 327 so that the retainer holding portion 321 is received in the connector receptacle portion of the connector receiving portion 203, the seventh pipe 327 is not received in the receiving hollow of the anti-rotation cap portion 301 as the anti-rotation engagement piece portion 337 of the metal stay 329 abuts or contact with the inwardly raised portion 217 or side wall portion 227 of the seventh anti-rotation device 299. Hence, the seventh anti-rotation device 299 cannot be mounted on the fourth quick connector 319 and the seventh pipe 327.

Then, it can be verified that the seventh pipe 327 is incompletely connected. That is, the seventh anti-rotation device 299 functions to verify complete connection.

We claim:

1. An anti-rotation structure, comprising:
   a connector, a pipe inserted in the connector, and an anti-rotation device to restrain relative rotational movement of the pipe and the connector, the connector having sealing means, retainer means and a connector housing provided with a connecting portion for a mating member in communication with the pipe on one axial end of the connector housing, the pipe including an inserting side portion of straight tubular shape inserted in and connected to the connector housing through an opening of the opposite axial end of the connector housing, the inserting side portion of the pipe being connected to the connector housing by engagement of an annular engagement projection formed on the inserting side portion with the retainer means, the sealing means forming a seal between the inserting side portion and the connector housing, wherein the anti-rotation device comprises:
   a pipe connecting portion connected to the inserting side portion of the pipe in anti-rotating relation, and
   a connector connecting portion connected to the connector in anti-rotating relation, the connector connecting portion being constructed on or constructed integrally with the pipe connecting portion.

2. The anti-rotation structure as set forth in claim 1, wherein the retainer means is a retainer held in a retainer holding portion formed on the opposite axial end of the connector housing in anti-rotating relation, and the connector connecting portion is connected to the connector in anti-rotating relation by engagement with the retainer.

3. An anti-rotation structure, comprising:
   a connector, a pipe inserted in the connector, and an anti-rotation device to restrain relative rotational movement of the pipe and the connector, the connector having a connector housing provided with a connecting portion for a mating member in communication with the pipe on one axial end of the connector housing and a retainer holding portion holding a retainer on the other axial end of the connector housing, the pipe including an inserting side portion of straight tubular shape inserted in and connected to the connector housing through an opening of the opposite axial end of the connector housing, the inserting side portion of the pipe being connected to the connector housing by engagement with the retainer, the retainer being held by the retainer holding portion via engagement with an engagement window formed on the retainer holding portion;
   wherein the anti-rotation device comprises
   a pipe connecting portion connected to the inserting side portion of the pipe in anti-rotating relation, and
   a connector connecting portion connected to the connector in anti-rotating relation by engagement with the engagement window of the retainer holding portion, wherein the connector connecting portion is constructed on or constructed integrally with the pipe connecting portion.

4. An anti-rotation structure, comprising:
   a connector, a pipe inserted in the connector, and an anti-rotation device to restrain relative rotational movement of the pipe and the connector, the connector having retainer means and a connector housing provided with a connecting portion for a mating member in communication with the pipe on one axial end of the connector housing, the pipe including an inserting side portion of straight tubular shape inserted in and connected to the connector housing through an opening of the opposite axial end of the connector housing, and the inserting side portion of the pipe being connected to the connector housing by engagement of an annular engagement projection formed on the inserting side portion with the retainer means, wherein the anti-rotation device comprises:

a pipe connecting portion connected to the inserting side portion of the pipe in anti-rotating relation, and a connector connecting portion connected to the connector in anti-rotating relation, wherein the connector connecting portion is constructed on or constructed integrally with the pipe connecting portion.

5. The anti-rotation structure as set forth in claim 4 wherein the connector connecting portion is connected to the connector in anti-rotating relation by engaging with a rotation preventive engagement recess formed on or in the connector housing.

* * * * *